(12) United States Patent
Filo

(10) Patent No.: US 6,462,498 B1
(45) Date of Patent: Oct. 8, 2002

(54) SELF-STABILIZING WALKING APPARATUS THAT IS CAPABLE OF BEING REPROGRAMMED OR PUPPETEERED

(75) Inventor: Andrew S. Filo, Cupertino, CA (US)

(73) Assignee: Andrew J. Filo, Cupertino, CA (US)

( * ) Notice: Subject to any disclaimer, the term of this patent is extended or adjusted under 35 U.S.C. 154(b) by 0 days.

(21) Appl. No.: 09/851,258

(22) Filed: May 8, 2001

Related U.S. Application Data

(60) Provisional application No. 60/203,042, filed on May 9, 2000.

(51) Int. Cl.⁷ .................................................. B25J 5/00
(52) U.S. Cl. ............................ 318/568.12; 318/568.11; 318/568.2; 446/355; 446/356; 700/245
(58) Field of Search ..................... 318/568.12, 568.2, 318/568.11; 446/355, 356; 700/245; 180/8.1, 8.2

(56) References Cited

U.S. PATENT DOCUMENTS

| | | | |
|---|---|---|---|
| 4,565,487 A | * 1/1986 | Kroczynski | 180/8.6 |
| 4,613,315 A | 9/1986 | Kataoka | 446/355 |
| 4,834,200 A | 5/1989 | Kajita | 180/8.1 |
| 4,977,971 A | * 12/1990 | Crane et al. | 180/8.3 |
| 5,040,626 A | 8/1991 | Paynter | 180/8.1 |
| 5,049,802 A | 9/1991 | Mintus et al. | 320/2 |
| 5,151,859 A | * 9/1992 | Yoshino et al. | 180/8.6 |
| 5,158,493 A | 10/1992 | Morgrey | 446/355 |
| 5,159,988 A | 11/1992 | Gomi et al. | 180/8.6 |
| 5,209,695 A | 5/1993 | Rothschild | 446/175 |
| 5,220,263 A | 6/1993 | Onishi et al. | 318/587 |
| 5,221,883 A | 6/1993 | Takenaka et al. | 318/568.12 |
| 5,250,886 A | 10/1993 | Yasuhara et al. | 318/567 |
| 5,252,901 A | * 10/1993 | Ozawa et al. | 180/8.1 |
| 5,255,753 A | 10/1993 | Nishikawa et al. | 180/8.6 |
| 5,295,893 A | 3/1994 | Chiu | 446/356 |
| 5,318,471 A | 6/1994 | Glovier | 446/268 |
| 5,337,235 A | 8/1994 | Takahashi et al. | 364/424.02 |
| 5,355,064 A | 10/1994 | Yoshino et al. | 318/568.12 |
| 5,426,586 A | 6/1995 | Ozawa | 364/424.02 |
| 5,455,497 A | 10/1995 | Hirose et al. | 318/568.12 |

(List continued on next page.)

FOREIGN PATENT DOCUMENTS

| | | |
|---|---|---|
| EP | 0 818 283 A1 | 1/1998 |
| EP | 0 898 237 A2 | 2/1999 |
| EP | 0 923 011 A2 | 6/1999 |
| EP | 0 924 034 A2 | 6/1999 |
| JP | 1050592 | 6/1999 |
| JP | 1038550 | 9/1999 |
| JP | 1050592-1 | 9/1999 |
| WO | WO 99/64208 | 12/1999 |
| WO | WO 99/67067 | 12/1999 |

Primary Examiner—Robert E. Nappi
Assistant Examiner—Rita Leykin
(74) Attorney, Agent, or Firm—Michael Best & Friedrich LLC

(57) ABSTRACT

An apparatus that is capable of achieving self-stabilization while walking comprises two front legs and two rear legs with each leg having three joints including a hip joint, an upper leg joint, and a lower leg joint. Each joint is powered by a motor and is monitored by an encoder, totaling twelve of each for the entire apparatus. Stability is maintained by adding weight to the two front legs and by positioning a separate weight toward the front and middle of the apparatus, thereby moving the center of balance of the apparatus further within the stability envelope of the apparatus. As a result, the apparatus maintains its stability by itself without the need for additional CPU's. The apparatus also includes an animation motor that is capable of causing the apparatus to make non-ambulatory movement and a cartridge slot which allows the user to download new programming which facilitates new behavior being exhibited by the apparatus.

19 Claims, 45 Drawing Sheets

U.S. PATENT DOCUMENTS

| | | | |
|---|---|---|---|
| 5,513,106 A | * 4/1996 | Yoshino et al. | 180/8.1 |
| 5,545,960 A | 8/1996 | Ishikawa | 318/587 |
| 5,545,967 A | 8/1996 | Osborne et al. | 320/2 |
| 5,739,655 A | * 4/1998 | Torii et al. | 180/8.6 |
| 5,842,533 A | * 12/1998 | Takeuchi | 180/8.1 |
| 5,870,527 A | 2/1999 | Fujikawa et al. | 395/80 |
| 5,892,346 A | 4/1999 | Moroto et al. | 318/587 |
| 5,929,585 A | * 7/1999 | Fujita | 318/568.11 |
| 5,963,663 A | 10/1999 | Tani | 382/153 |
| 5,963,712 A | 10/1999 | Fujita et al. | 395/99 |
| 6,301,524 B1 | * 10/2001 | Takenaka | 318/568.12 |
| 6,362,589 B1 | * 3/2002 | Inoue et al. | 318/568.1 |

* cited by examiner

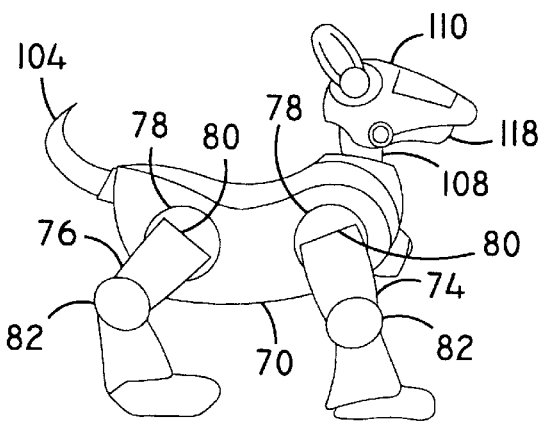
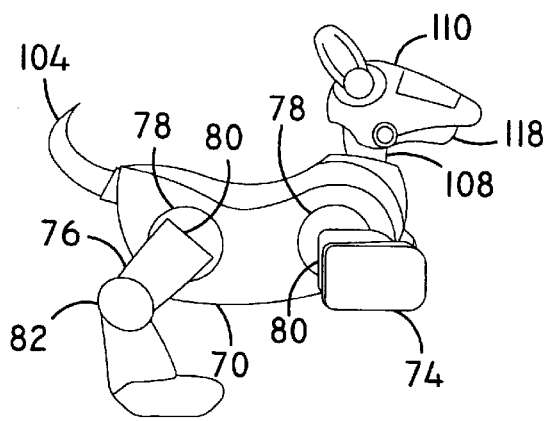
FIG. 6A  FIG. 6B
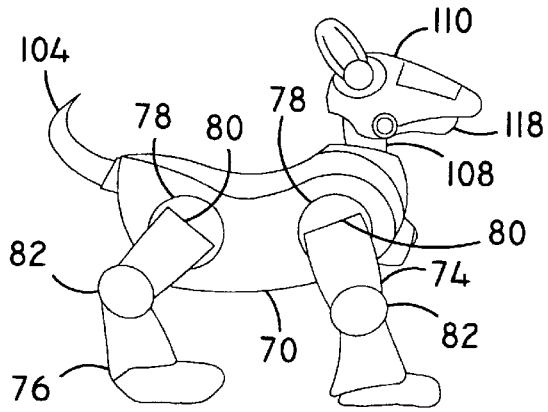
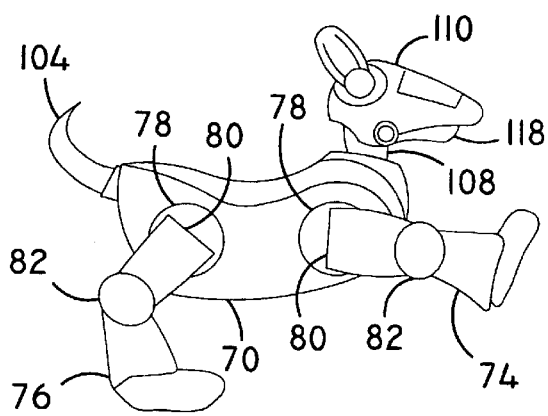
FIG. 6C  FIG. 6D
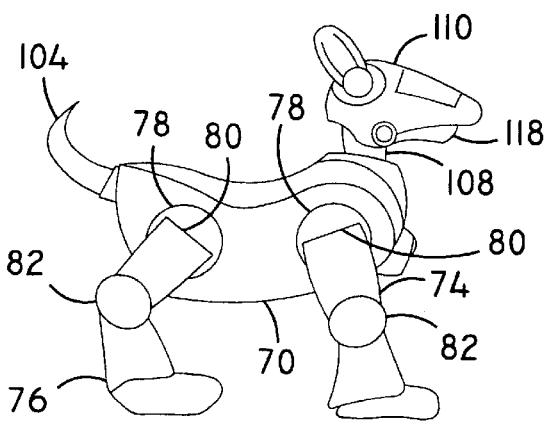
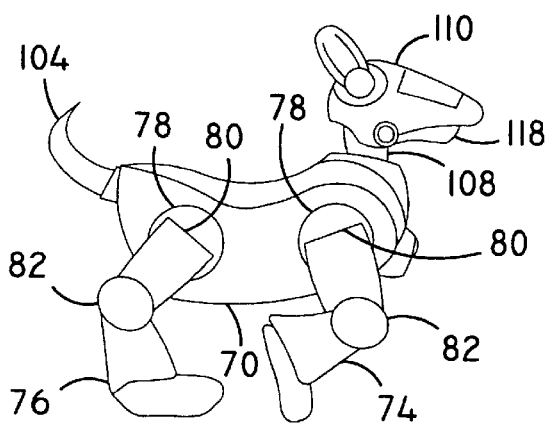
FIG. 6E  FIG. 6F

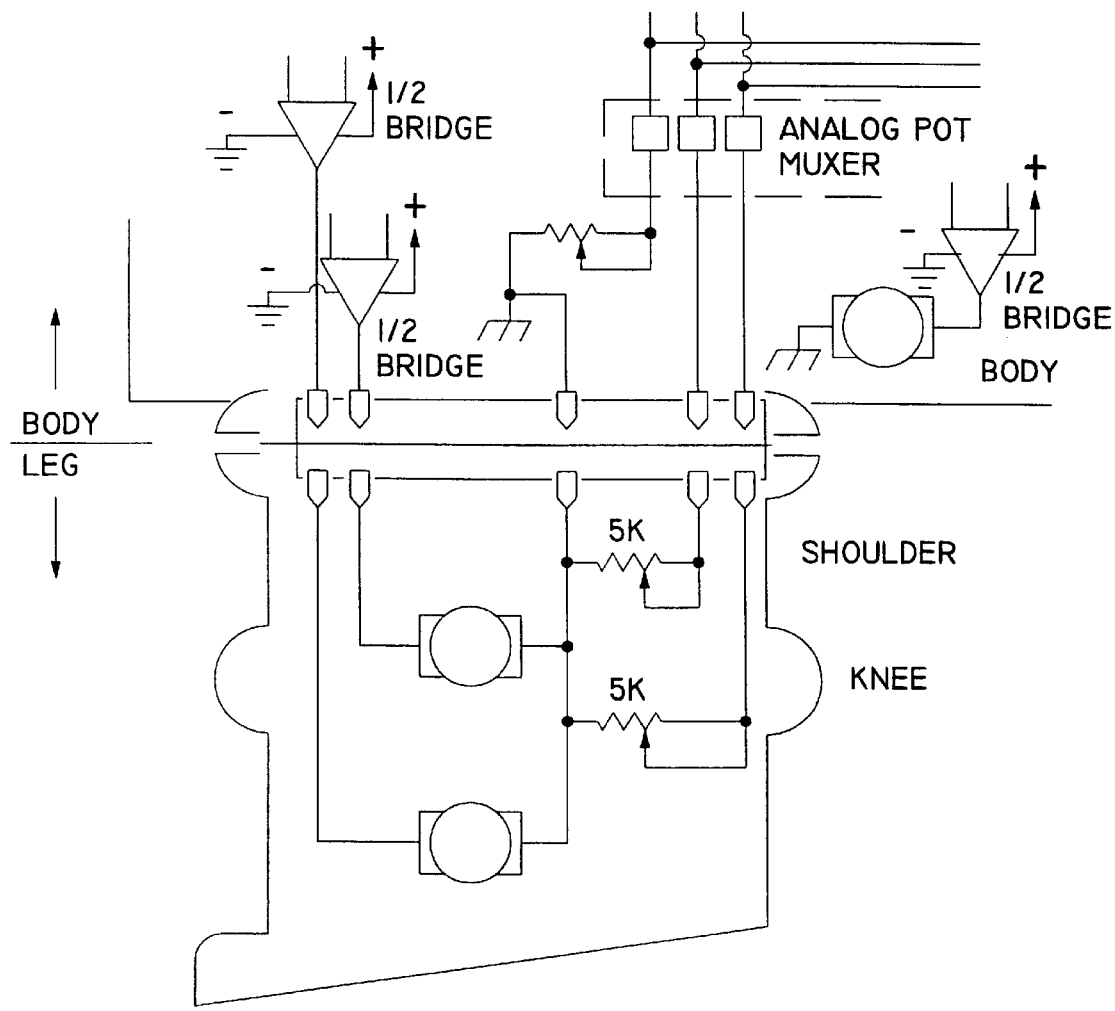
FIG. II

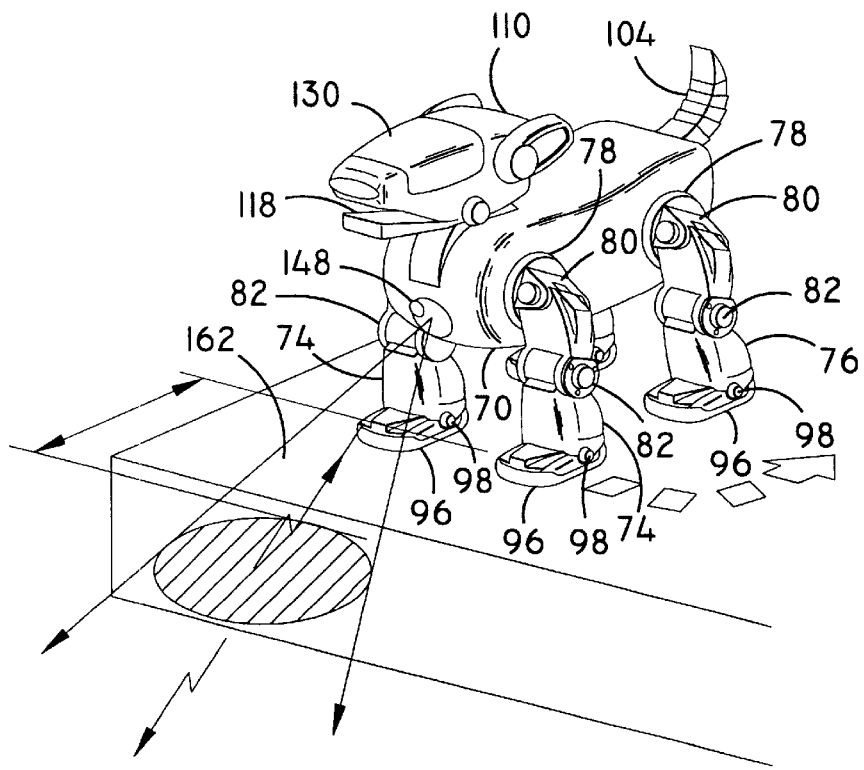
FIG. 23
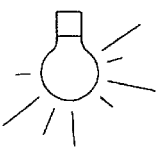
FIG. 26
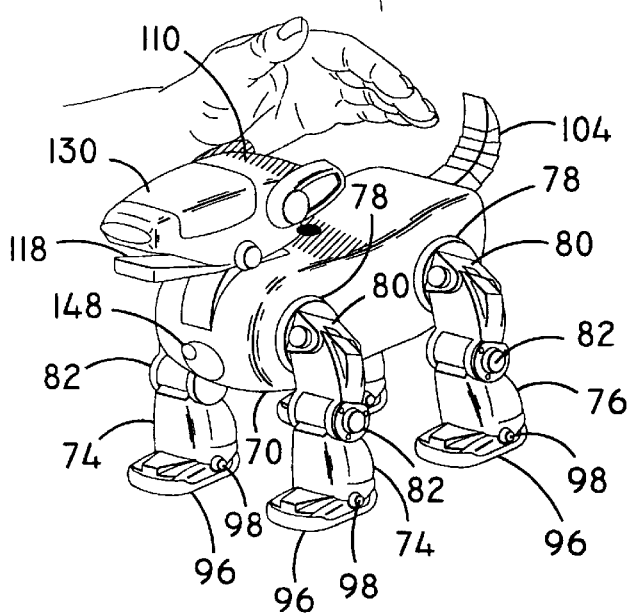

FIG. 31B

| INPUTS |
|---|
| VOICE |
| SOUND SOURCE |
| AMBIENT LIGHT |
| MOTOR CURRENT |
| TILT |
| FLOOR |
| WALL |
| PASSIVE / ACTIVE OBJECT |
| PET SUI |
| LIMB POSITION |
| LOW BATT / RECHARGE |

| PROCESS |
|---|
| INBORN BEHAVIOR |
| LEARNED BEHAVIOR |
| MATURATION (AGE) |
| ENVIRONMENTAL |

| OUTPUTS |
|---|
| WALKING |
| PHYSICAL DISPLAY |
| EYES |
| SPEECH |
| DATAXFER |

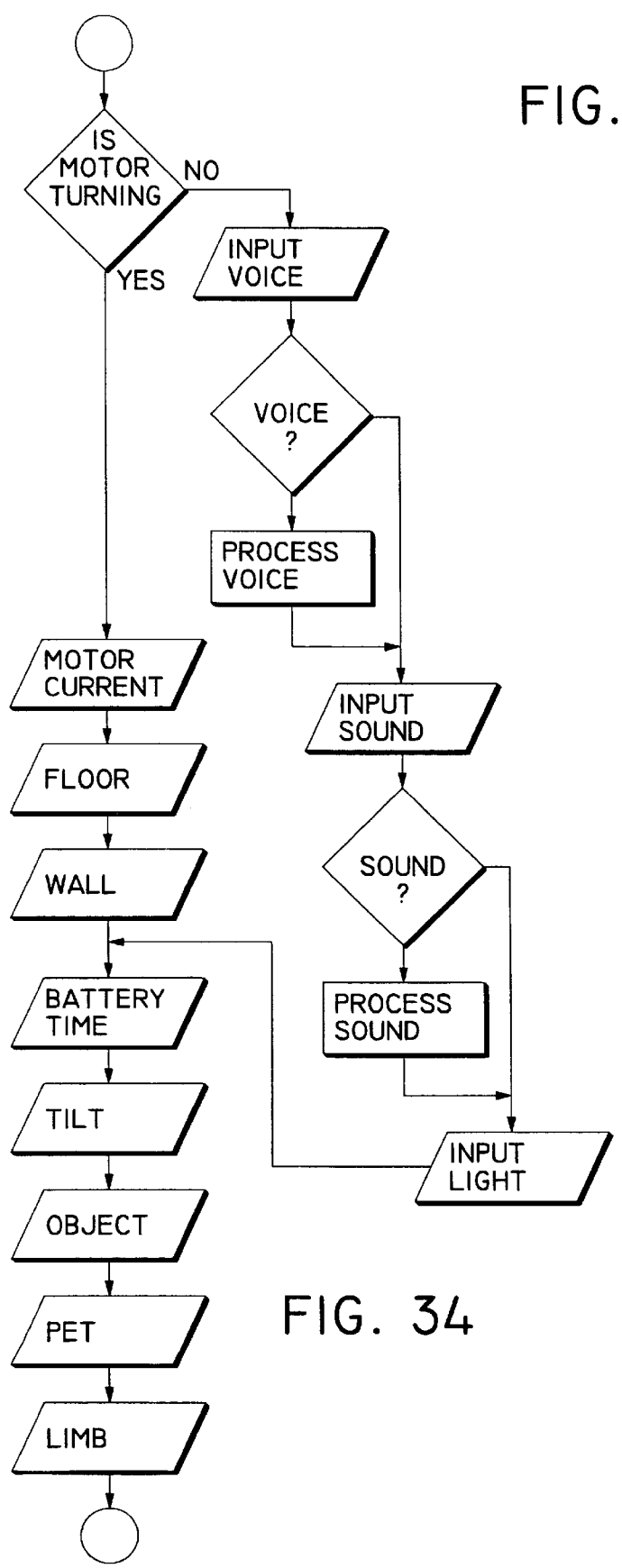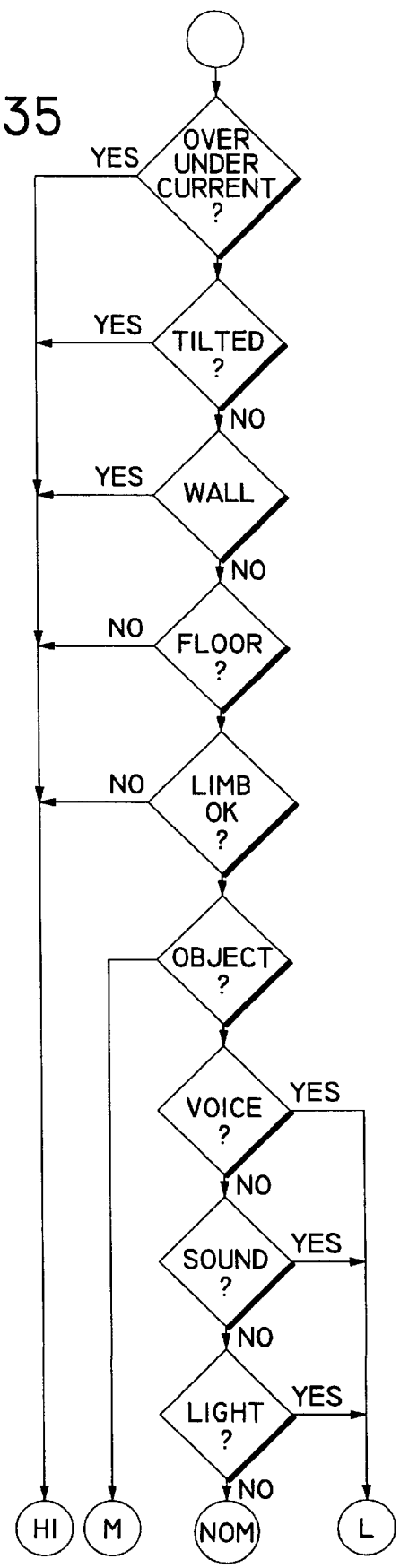
FIG. 34
FIG. 35

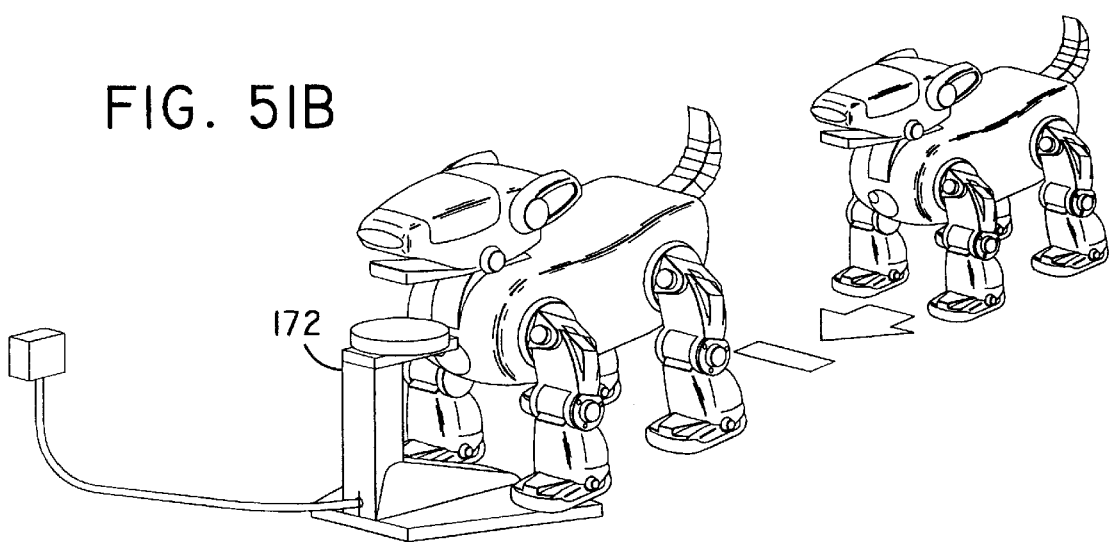
FIG. 51B
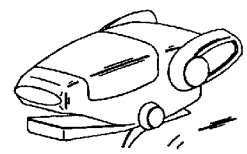
FIG. 56A
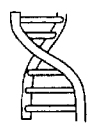
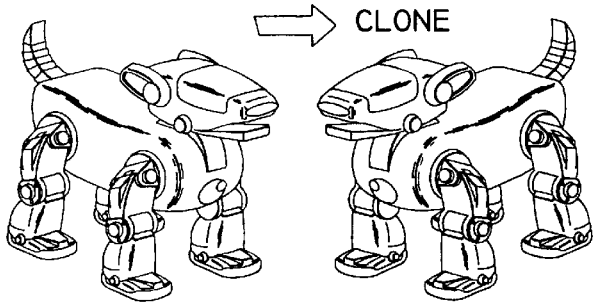
FIG. 56B
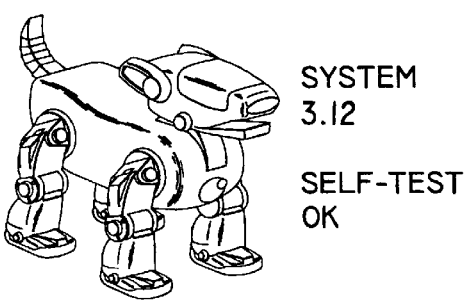
FIG. 56C

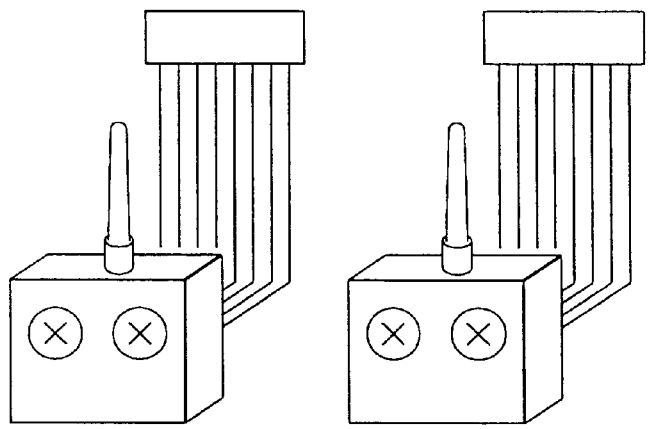
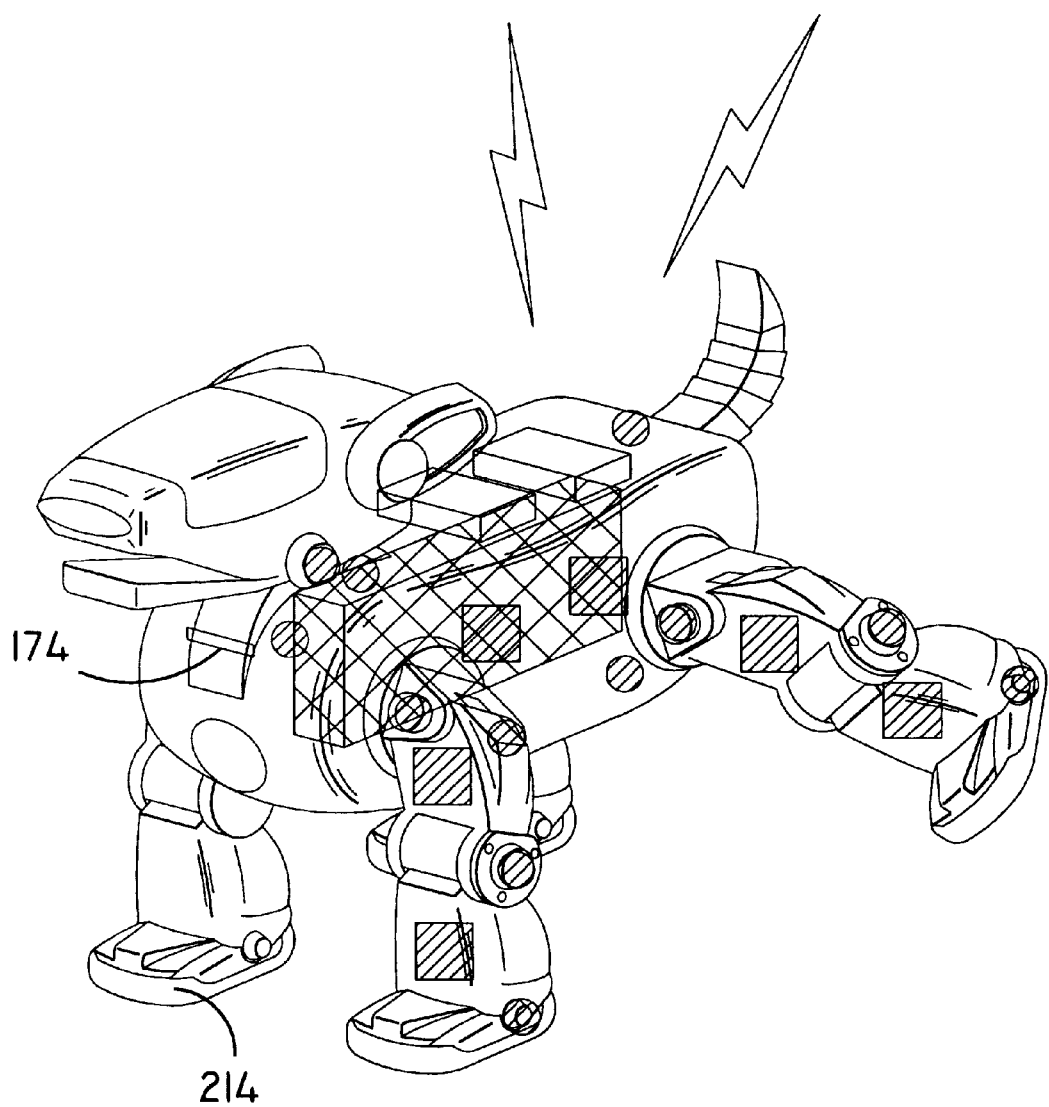
FIG. 58B

SELF-STABILIZING WALKING APPARATUS THAT IS CAPABLE OF BEING REPROGRAMMED OR PUPPETEERED

CROSS-REFERENCE TO RELATED APPLICATION

This application claims benefit of U.S. Provisional Application No. 60/203,042, filed May 9, 2000.

BACKGROUND OF THE INVENTION

1. Field of the Invention

The invention relates to self-stabilizing walking platforms that can be reprogrammed and, more particularly, to a self-stabilizing quadruped walking platform that can be controlled in a fashion allowing flexible user programming and operation.

2. Description of the Related Art

There are numerous examples in the prior art of walking quadruped devises that try to walk in a fashion that is similar to four-legged animals. Many of these devices use twelve motors with three used in conjunction with each limb and a gyroscope. The first of these motors controls the motion of the hip joint of the limb, the second motor controls the upper leg joint of the limb, while the third and final motor of the limb controls the knee joint. All four limbs and the motors associated therewith are controlled by a separate CPU and servo for each motor which communicate with each other and the gyroscope and adjust the movement and timing of the limbs so that these devises can walk. These devices can walk in a forward direction, in a reverse direction, or turn, all as determined by the coordination of the CPU's. As a result, such an apparatus can mimic some of the basic movements of a canine or other quadrupedal animal. However, prior art devices are still unsatisfactory for three reasons.

One problem is that these devices do not have enough stability that is incorporated into their structural elements to provide self-stabilization. In order to overcome this limitation, they rely on the communication and coordination of multiple CPU's that are capable of handling at least thirty-five million instructions per second, servos, and a gyroscope to maintain balance by making sure that their center of balance does not fall outside of their stability envelope while they are walking. The large number of CPU's with a high computing power, the gyroscope, and servos increase the overall cost of these devices significantly. This can be cost prohibitive in the robotics and toy fields where amateurs wish to have a walking device that can mimic the motion of animals but cannot afford to pay the price that is currently associated therewith. Accordingly, there exists a need for a walking apparatus that can maintain stability in a manner that does not require multiple CPU's and is more cost effective than found in the prior art.

Another problem with these devises is that they lack the ability to alter the way they move because they are rigidly preprogrammed to act a certain way. This leaves these devices incapable of adapting to their environment and altering their response to stimuli and obstacles found therein. This can be disadvantageous in toy applications where the user may grow tired of having the apparatus behave in an identical fashion every time the apparatus is used. This may also be disadvantageous in robotics applications where the user may need the apparatus to move and act in different ways in order to achieve some desired result such as solving a problem or gaining access to a remote area. Accordingly, there exists a need for a walking apparatus that can alter its behavior in a manner that is consistent with the needs and desires of the user while also maintaining its ability to adapt to its environment.

A third problem with these prior art devices is that they do not provide adequate means for the user to control them. Typically, these devices employ RF remote controllers as the sole method by which the user can tell the apparatus how to move. These remote controllers often require the user to move a joystick in order to indicate to the CPU what direction the user wishes the apparatus to move. Although this method is satisfactory for simple movements in horizontal directions, it can be unwieldy if not impossible to use such a remote controller to effectuate complex three dimensional movement that may not even be ambulatory in nature. Like-wise, some devices use on board CPU's solely for control of the apparatus which prevents the user from directly determining the movement of that apparatus. These types of control can be disadvantageous in toy and robotics applications where the user may wish to make the apparatus simulate unique and very precise movements in order to create some desired end result. Accordingly, there exists a further need for a walking apparatus that has a suitable means of control that can cause the apparatus to make precise three dimensional movements.

SUMMARY OF THE INVENTION

In accordance with the present invention, a walking apparatus is provided that includes the ability to maintain stability by itself, the ability to be reprogrammed, and the ability to reproduce precise three dimensional movements. The combination of these features render the apparatus more like animals and at a lower cost than those devices found in the prior art.

One embodiment of the invention that is capable of maintaining self-stabilization comprises at least one motor within the apparatus that has a drive shaft extending therefrom for powering the apparatus, two front legs that are in communication with the motor that also have a pair of weights attached thereto, two rear legs that are also in communication with the motor, and a separate weight that is positioned toward the front of the apparatus. As a result of the distribution of these weights, the center of balance of the apparatus is moved toward the front of the apparatus. Hence, as the apparatus walks and lifts a rear leg, the center of balance is maintained within the resulting triangular shaped stability envelope. Consequently, a described embodiment employs a single information processor with a relatively low computing power and an encoder to control the movement of the apparatus and no gyroscope unlike prior art devices which need multiple information processors with a high computing power to keep track of the movement of all the legs to make sure that the center of balance does not fall outside of the stability envelope. Furthermore, this embodiment may include at least one animation motor that is used by the apparatus to achieve non-ambulatory movement.

Another embodiment of the present invention that is capable of being reprogrammed includes a cartridge slot into which an intermediate flash cartridge can be inserted. This feature allows the user to download new programming which can alter the way the apparatus moves or behaves. Thus, the apparatus could for example act like a dog and then be reprogrammed to act like a cat. This feature solves the problem of the user getting tired of the apparatus exhibiting the same behavior repeatedly. In addition, games may be downloaded to the apparatus so that the user can play against the apparatus in games like tic, tac, toe. Finally, the cartridge slot can be used to download improvements and fix bugs concerning the programming of the apparatus. This embodiment is also capable of remote diagnostics so that someone other than the user who is more knowledgeable about the workings and programming of the apparatus can determine what is wrong with the apparatus and take the appropriate course of action.

Yet another embodiment of the present invention that is capable of reproducing precise three dimensional movements comprises an input apparatus which may be manipulated much as a puppeteer either manually or mechanically. The position of the legs as they are moved is detected by encoders that are located within the input apparatus and then is transmitted to the output apparatus whose information processor directs the legs of that apparatus to mimic the position of the legs of the input apparatus in real time. Alternatively, the puppeteer may choose to record the movements of the input apparatus via computer which is hard wired to the input apparatus. Then the movements and timing of the recording can be manipulated on the computer until the puppeteer is satisfied with the end result. Next, the altered program may be downloaded to the output apparatus via the intermediate flash cartridge that is inserted into the cartridge slot, which is part of the output apparatus, and executed just as any other program. These features provide a way to control the output apparatus so precisely that it can reproduce three dimensional movements that are not possible to execute using traditional methods of control such as a joystick remote control.

The various different embodiments that have been described may be powered electrically, chemically, by solar power, etc. to cause any of their motors to turn and move the apparatus. It is also readily apparent to those skilled in the art that these features can be applied to walking devises that have fewer and more than four legs as well. As can be seen, this invention provides a walking apparatus that can maintain self-stabilization, that can be reprogrammed, and that can reproduce precise three dimensional movements at a cost that is less than found in prior art devices.

BRIEF DESCRIPTION OF THE DRAWINGS

FIGS. 6A–6F are right elevational views of the apparatus showing the flexibility of the legs of the apparatus;

FIG. 11 is a wiring schematic of the connection between the microprocessor and the different encoders;

FIG. 23 is a perspective view of the floor detection capability of the apparatus;

FIG. 26 shows how the CDS pet switch of the apparatus works;

FIGS. 31A–31B are the top level flow charts for the apparatus;

FIG. 34 is the scan inputs phase of the top level flowchart;

FIG. 35 is the prioritize input data step of the top level flowchart for the apparatus;

FIGS. 51A–51B are perspective views of the apparatus as it approaches the charger station;

FIGS. 56A–56C are charts showing examples of different programs that can be downloaded to the apparatus;

FIGS. 58A–58B are perspective views of a puppeetering scheme that can control the apparatus in real time.

BRIEF DESCRIPTION OF THE PREFERRED EMBODIMENTS

Figure 1:
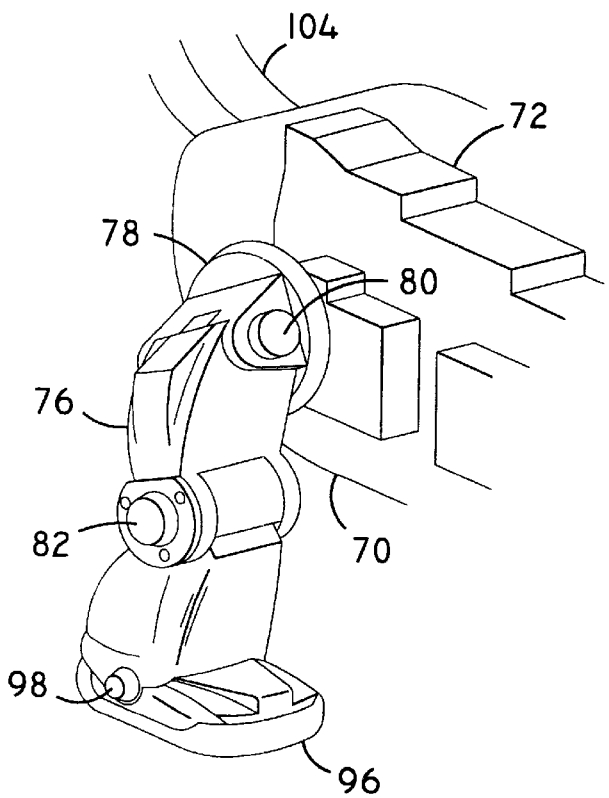
FIG. 1 is a perspective view of the rear portion of a quadrupedal and canine apparatus including the rump and right rear leg.
Figure 2:
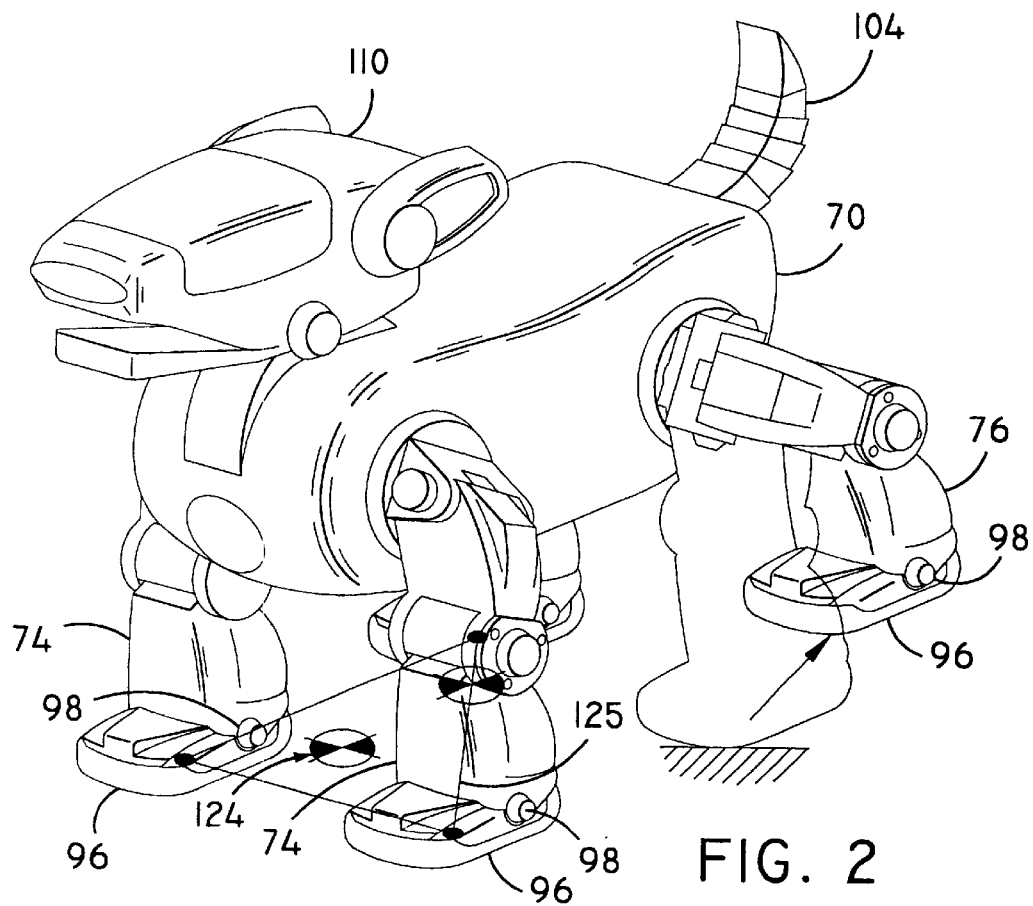
FIG. 2 is a perspective view of the quadrupedal apparatus showing the location of the adjusted center of balance of the apparatus.
Figure 3A:
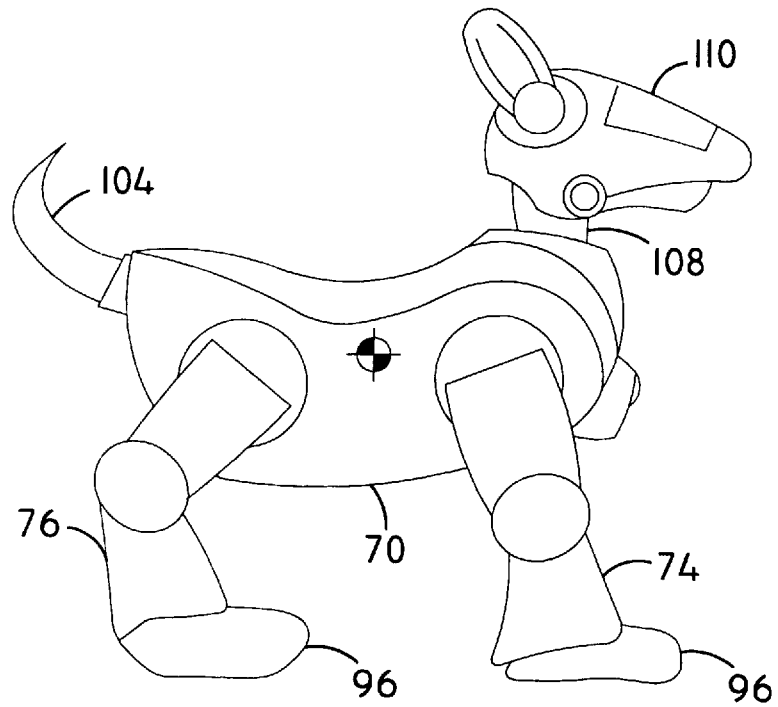
FIGS. 3A–3B are right elevational views of the apparatus illustrating the adjustment of the center of balance of the apparatus.
Figure 3B:
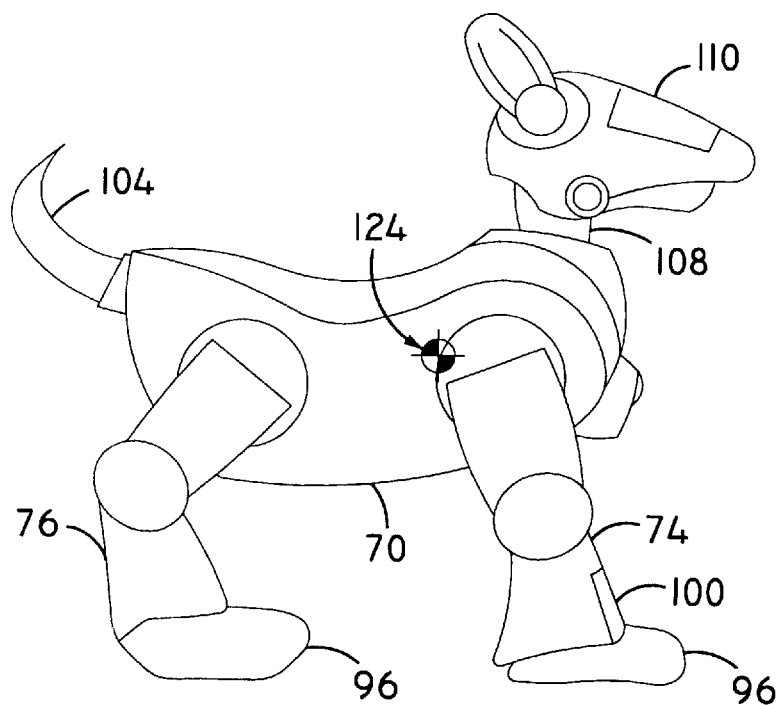
Figure 4:
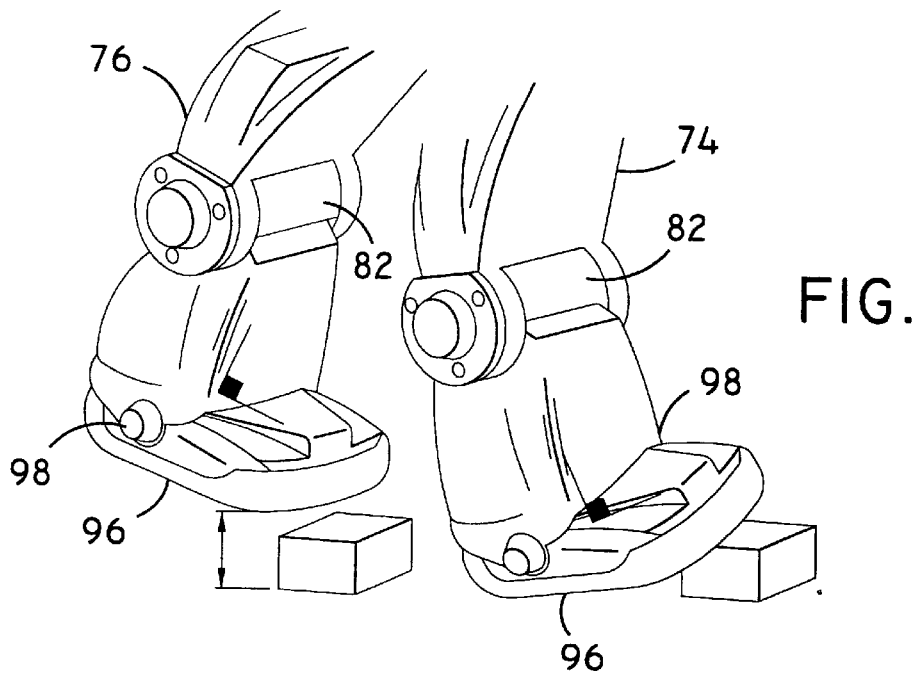
FIG. 4 is a perspective view of the fixed right angle ankle of a leg of the apparatus.
Figure 5:
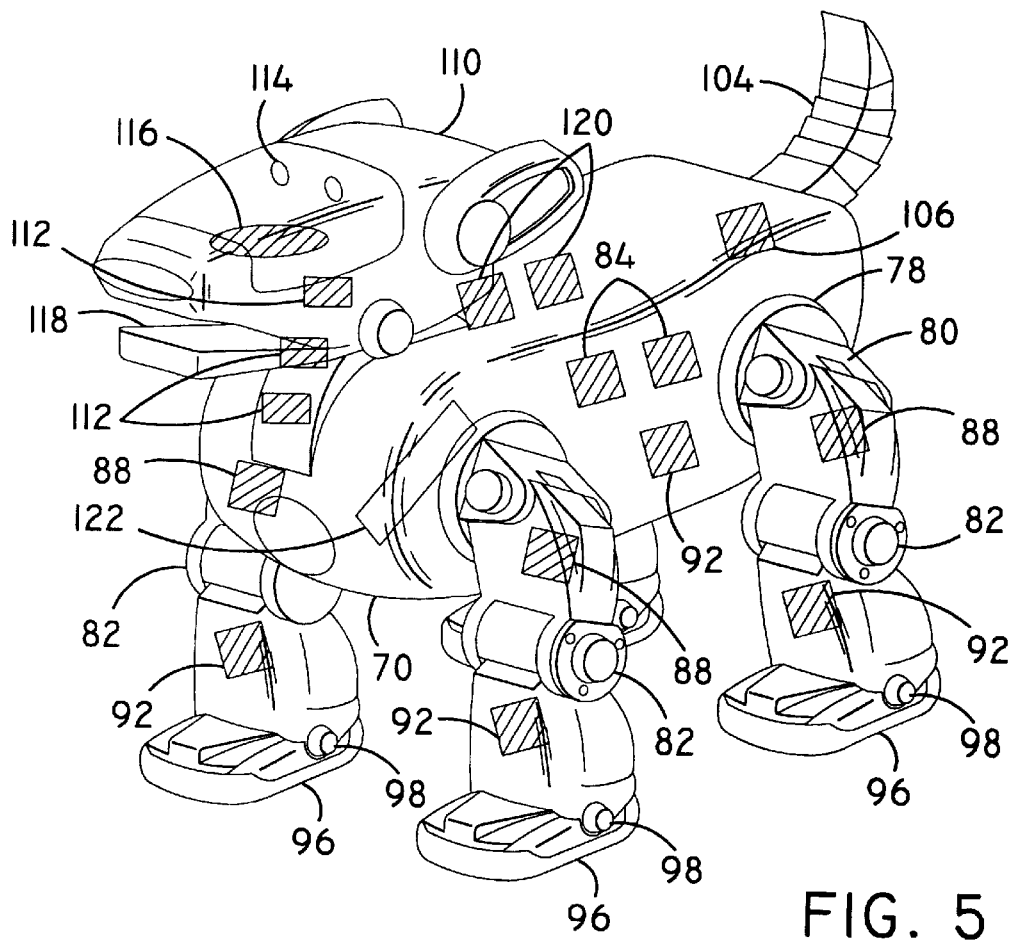
FIG. 5 is a perspective view of the apparatus showing the motors, LED eyes, and speaker of the apparatus.
Figure 7:
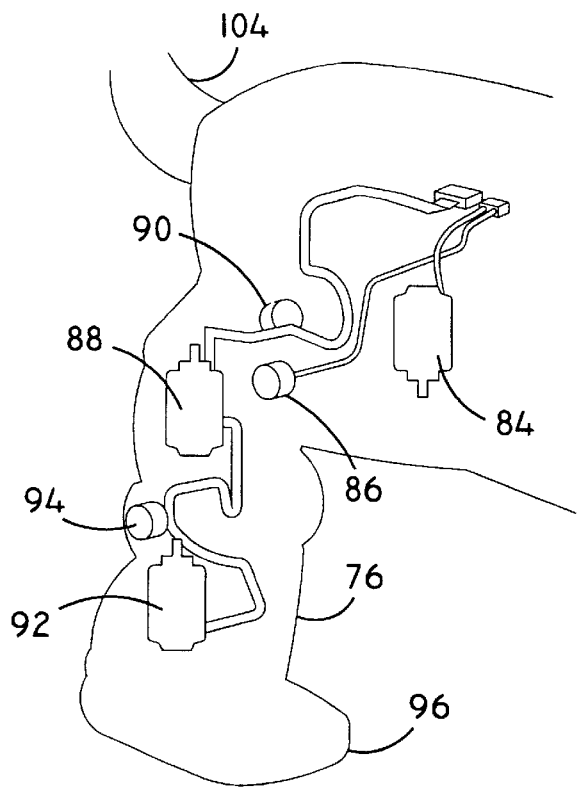
FIG. 7 is a perspective view of the apparatus showing the wiring between the motors and encoders of the right rear leg.
Figure 8:
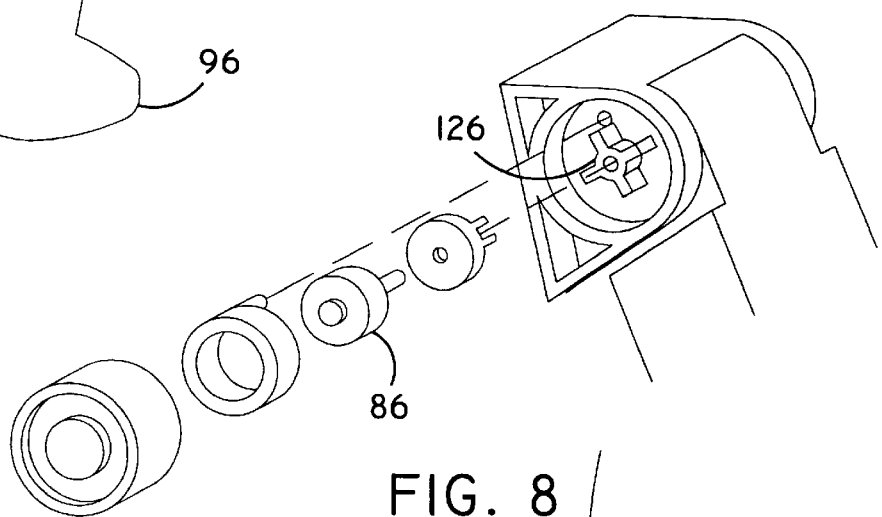
FIG. 8 is a shoulder joint encoder detail of the apparatus.
Figure 9:
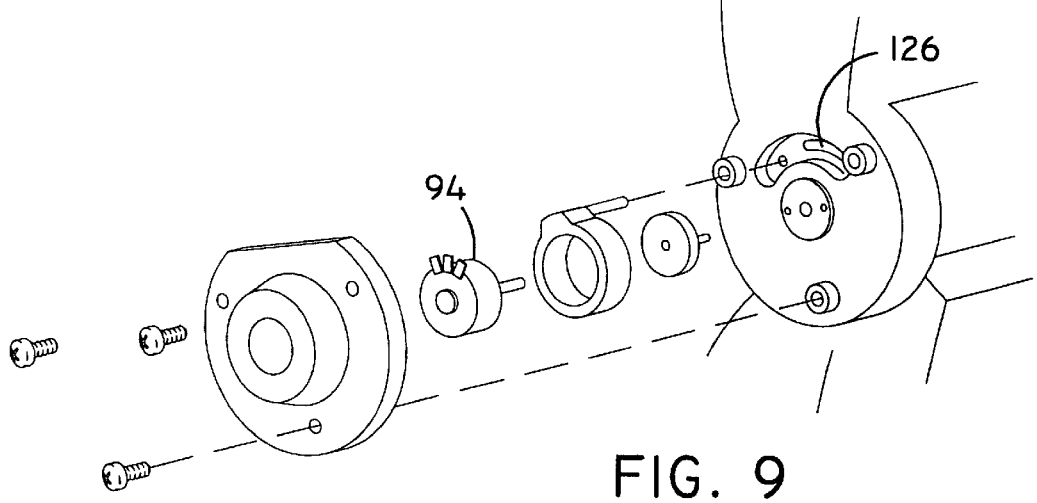
FIG. 9 is a knee joint encoder detail of the apparatus.
Figure 10:
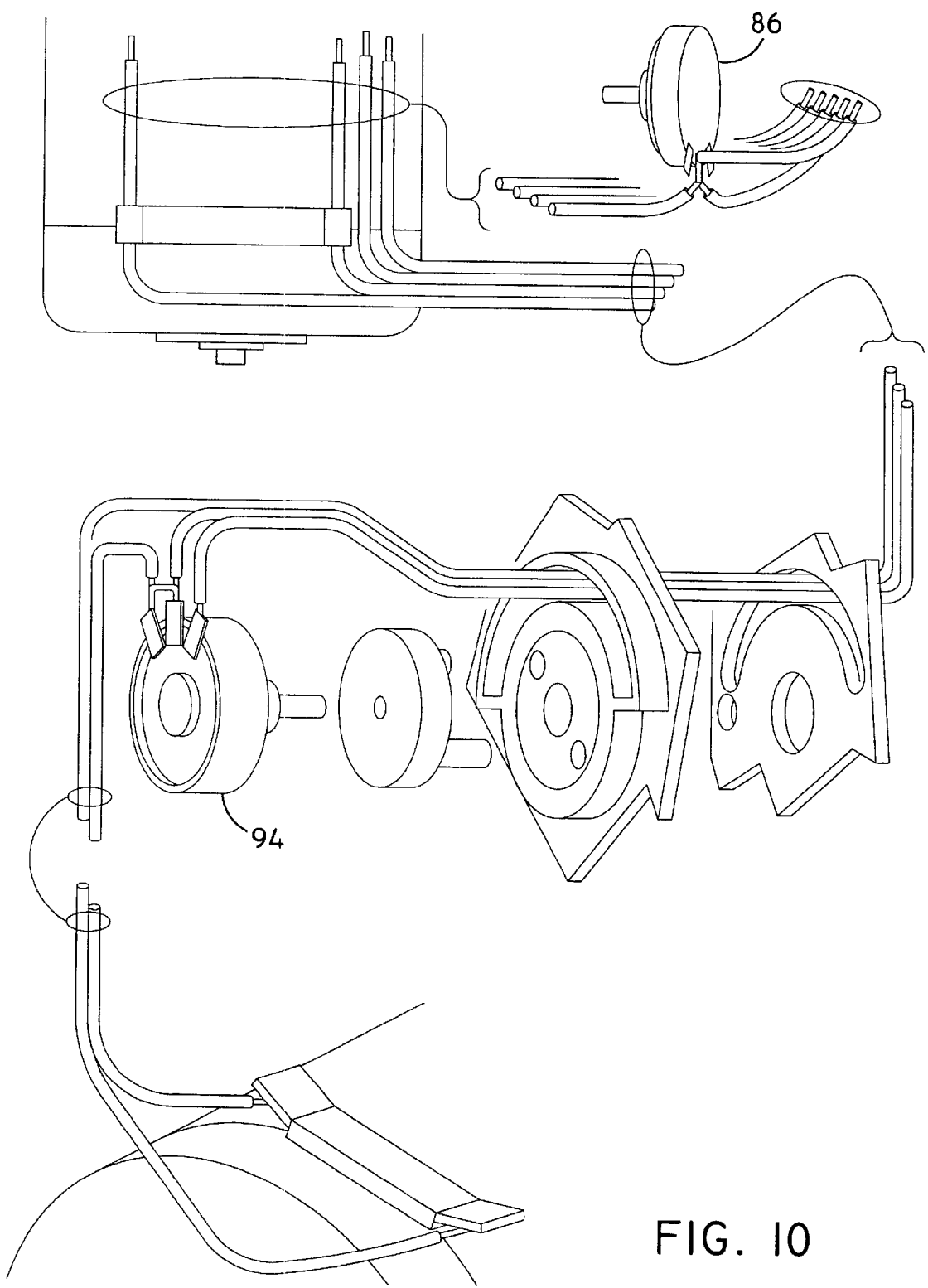
FIG. 10 is a wiring detail of the encoders of the apparatus.
Figure 12A:
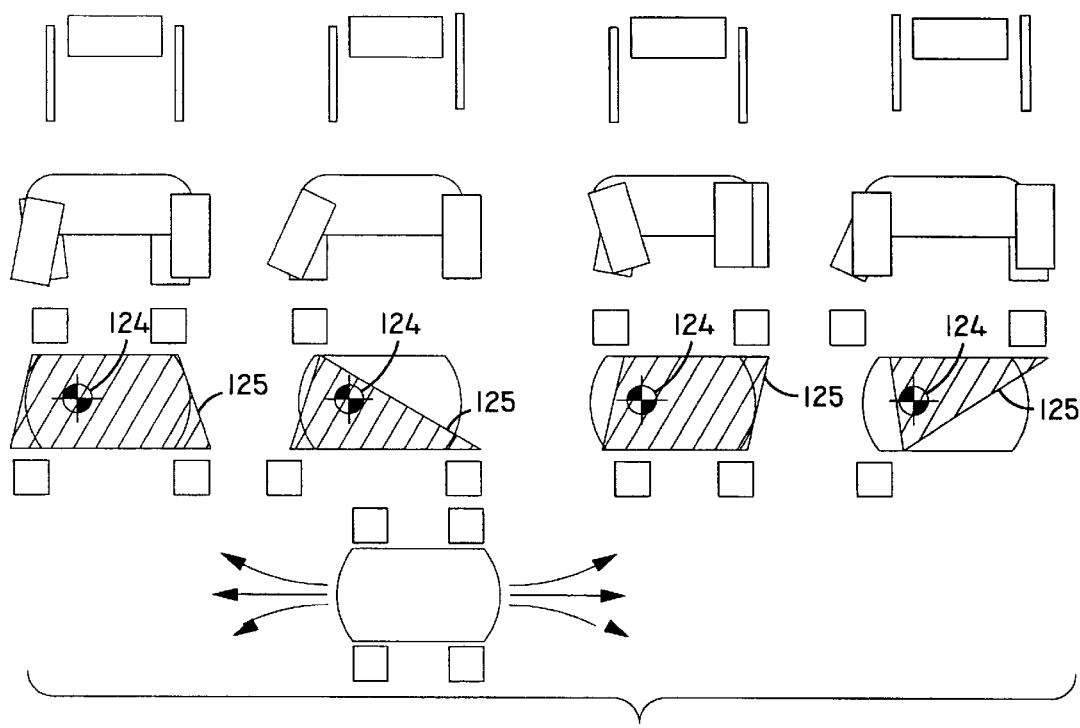
FIGS. 12A–12B are walking motion charts showing the phase and sequence of the legs during its turn on axis sequence.
Figure 12B:
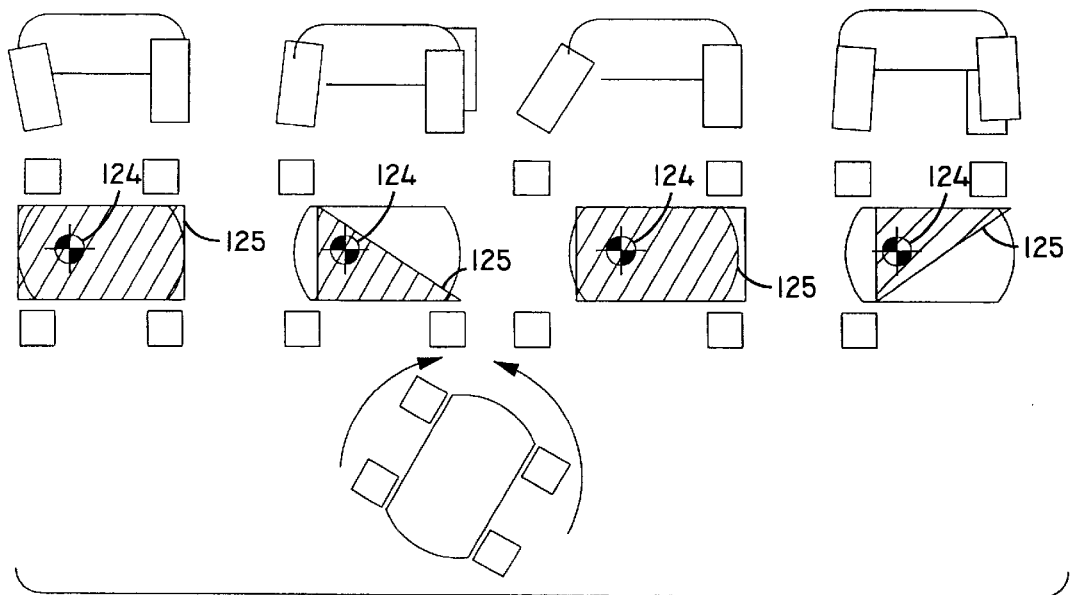
Figure 13A:
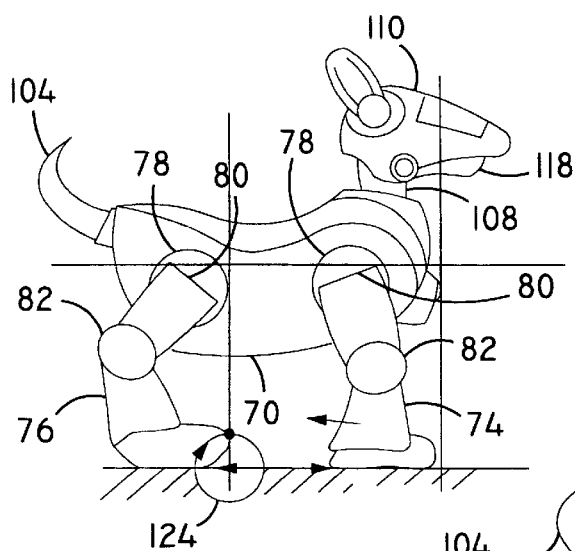
FIGS. 13A–13D are waking sequence charts of the apparatus.
Figure 13B:
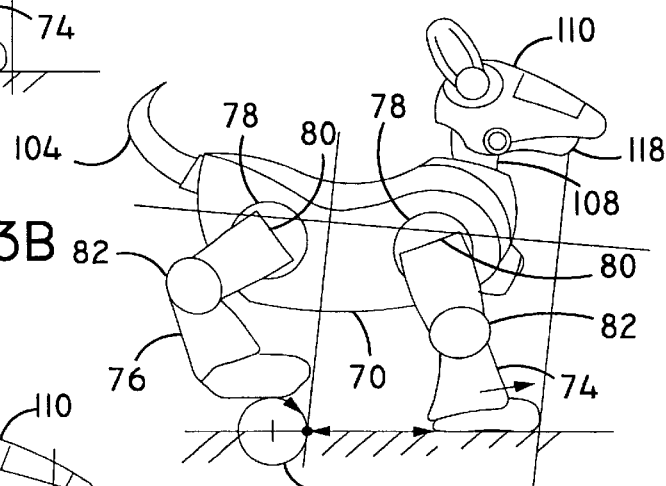
Figure 13C:
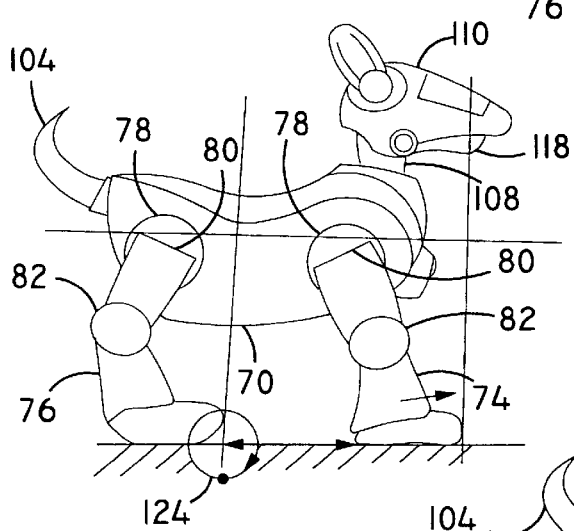
Figure 13D:
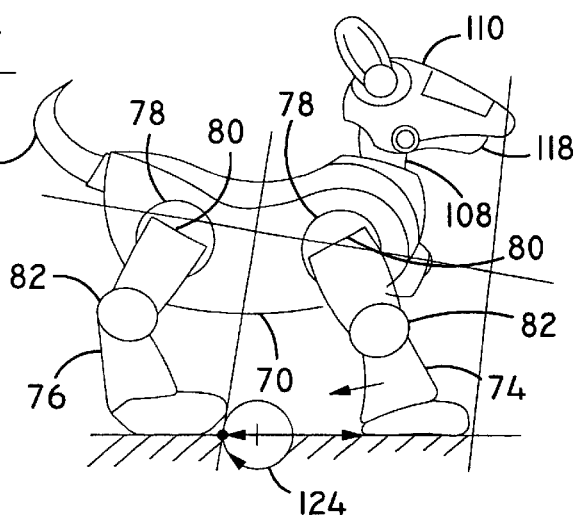
Figure 14A:
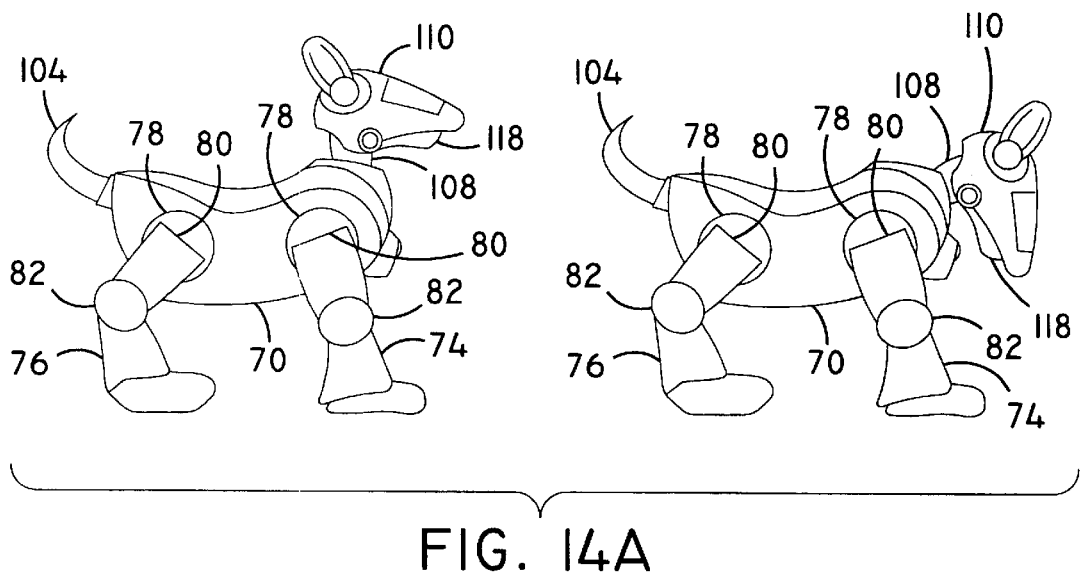
FIGS. 14A–14D are animation charts that display nonambulatory movement of the apparatus.
Figure 14B:
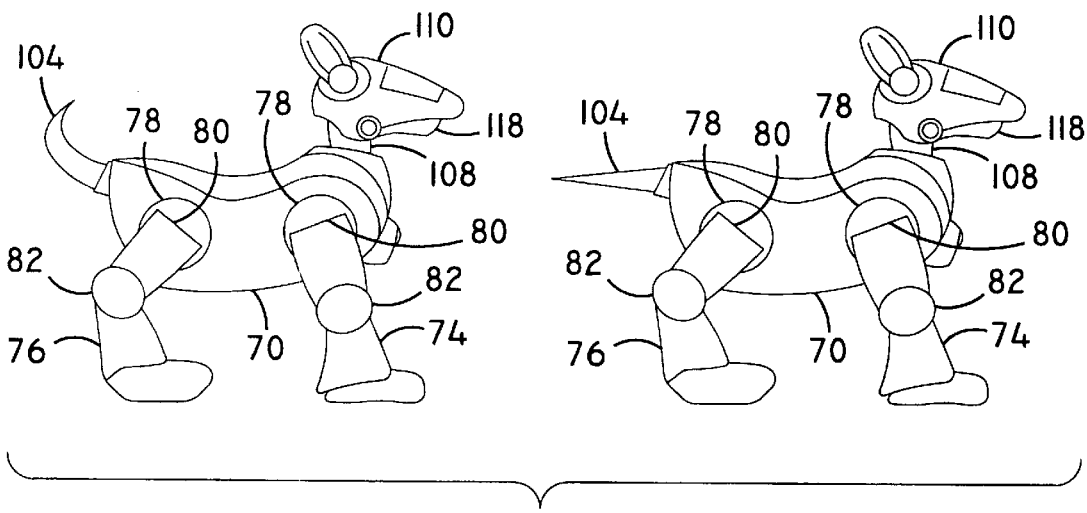
Figure 14C:
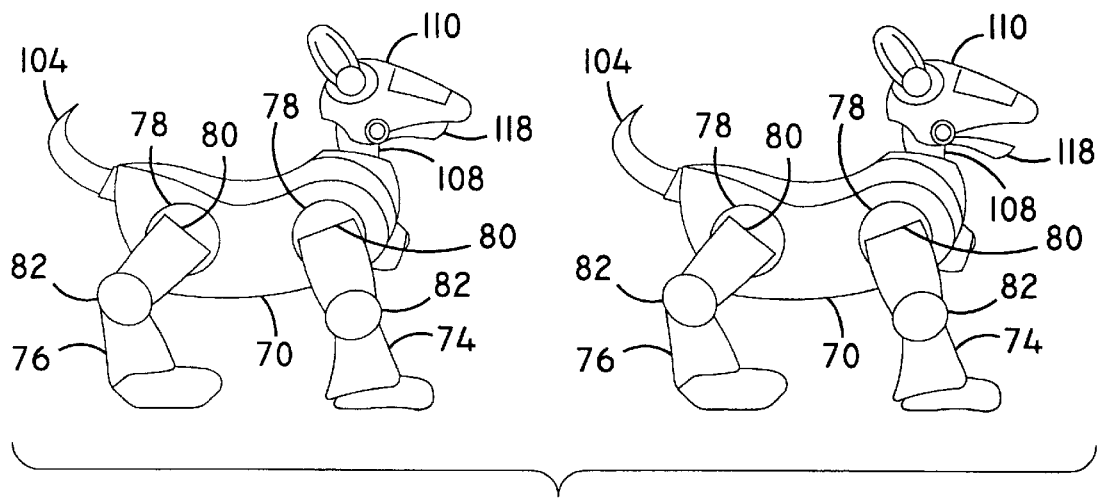
Figure 14D:
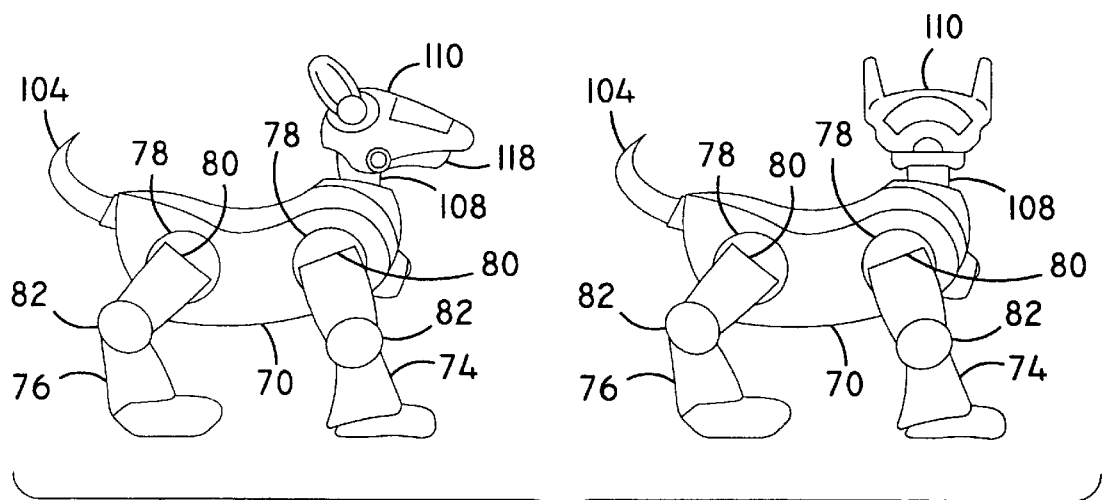

Referring to FIGS. 1–5 and 7, the preferred embodiment of the present invention is one that is quadrupedal and is fully canine. This embodiment comprises a body shell 70, a frame 72, two front legs 74 that are attached to the frame 72, and two rear legs 76 that are attached to the frame 72 with each leg having three movable joints including a hip joint 78, an upper leg joint 80, and a knee joint 82. Attached to each of these joints is a motor and an encoder such that each leg has a hip motor 84, a hip pot 86, an upper leg motor 88, an upper leg pot 90, a knee motor 92, and a knee pot 94. At the bottom of each leg is attached a foot 96 that forms a fixed right angle joint 98 with the lower leg. In addition, the front two legs 74 have a pair of leg weights 100 attached to them. This apparatus also includes a tail 104 that has a tail motor 106 attached thereto, a neck 108 that is attached to the front portion of the apparatus, and an enlarged head 110 that sits upon the neck 108 that has three head motors 112 attached thereto. The head 110 contains a pair of LED eyes 114 and a speaker 116 that is located near the rear of the mouth 118. This embodiment further comprises a microprocessor 120 that is contained within apparatus and is wired to all these motors. All the motors and other components of this apparatus that need power are connected to a 10 V battery pack 122 that is located within the body shell 70 of the apparatus and is rechargeable.

These structural elements work together in the following manner. The leg weights 100 and the enlarged head 110 of the apparatus work in conjunction to move the center of balance 124 of the apparatus toward the front of the apparatus by way of a counter balancing moment such that sixty percent of the weight of the apparatus is supported by the front legs 74 while only forty percent of the apparatus is supported by the rear legs 76. It is preferred to use an enlarged head 110 because it eliminates the use of another separate weight as it uses its distance from the body of the apparatus to provide stability. As a result, the apparatus only needs one microprocessor 120 that has a computing power of roughly ten million instructions per second to control its movement because numerous microprocessors with high computing power are not required to ensure that the center of balance 124 stays within the stability envelope of the apparatus 125. Consequently, as the apparatus walks the microprocessor 120 controls the motors which in turn control the motion of legs while at the same time the microprocessor 120 monitors the position of the legs via the signals sent to it by the encoders. The multiple joints allow the apparatus more flexibility than many prior art devices so that the legs move at the joints just like those of a canine or other quadrupedal animal (see FIGS. 6A–6F). As the apparatus walks it frequently will encounter a small obstacle. The fixed right angle ankle joints 98 allow the apparatus to step over these hurdles with no problem. Another unique feature of the preferred embodiment is that the gear trains that control the movement of the limbs are self-locking. Hence, no power is needed to keep the apparatus erect when the apparatus is not moving unlike prior art devises. This results in prolonged battery pack 122 life.

FIGS. 7–10 show further details on how the encoders of the apparatus work together. Each encoder provides a wire access slot 126 so that wires for encoders further down the leg can be connected. These wire access slots 126 are arcuate in shape and must have sufficient circumference to ensure that as the knee joint 82, upper leg joint 80, and hip joint 78 rotate, these wires are not severed. Another useful aspect of the design of these encoders is that they all use a one half bridge circuit with a common ground. As a result, each leg only requires seven wires to operate, reducing the space that the encoders take up in the leg allowing them to adequately fit. FIG. 11 shows how the microprocessor 120 can monitor multiple leg joint encoders virtually simultaneously using an analog potentiometer multiplexer.

This combination of features also makes the apparatus capable of walking, turning conventionally, and turning on axis. FIGS. 12A–12B and 13A–13D show the normal walking sequence of the apparatus and how the legs of the right side are out of phase with the legs of the left side with a differential of one hundred and eighty degrees. The entire time that the apparatus is walking the center of balance 124 is maintained within the stability of the envelope 125, even when that envelope is triangular shaped due to one rear leg being off the ground. In order to turn, all the microprocessor 120 needs to do is to change the phase differential from one side to the other by speeding one side up or slowing the other side down. Once a phase differential of one hundred and eighty degrees has been restored, the apparatus will once again walk in a straight line. In order for the apparatus to turn on its axis, all the microprocessor 120 needs to do is to create a ninety degree counter phase differential from the left to the right side. Once again, the apparatus will walk straight once a normal phase differential of one hundred and eighty degrees has been restored.

The purpose of the tail motor 106 is to make the apparatus capable of moving its tail 104, thereby allowing the apparatus to more closely mimic the behavior of a canine when it is excited or curious. Likewise, the three head motors 112 allow the dog to move its head 110 and open its mouth 118 (see FIGS. 14A–14D) in order to facilitate interaction between the apparatus and its surroundings while the LED eyes 114 and speaker 116 provide added realism to the apparatus by making the apparatus look and sound like a real canine (see FIG. 5). The movement of the head 110, mouth 118, tail 104, front legs 74, and rear legs 76 of the apparatus is powered by the rechargeable battery pack 122.

Figure 15:
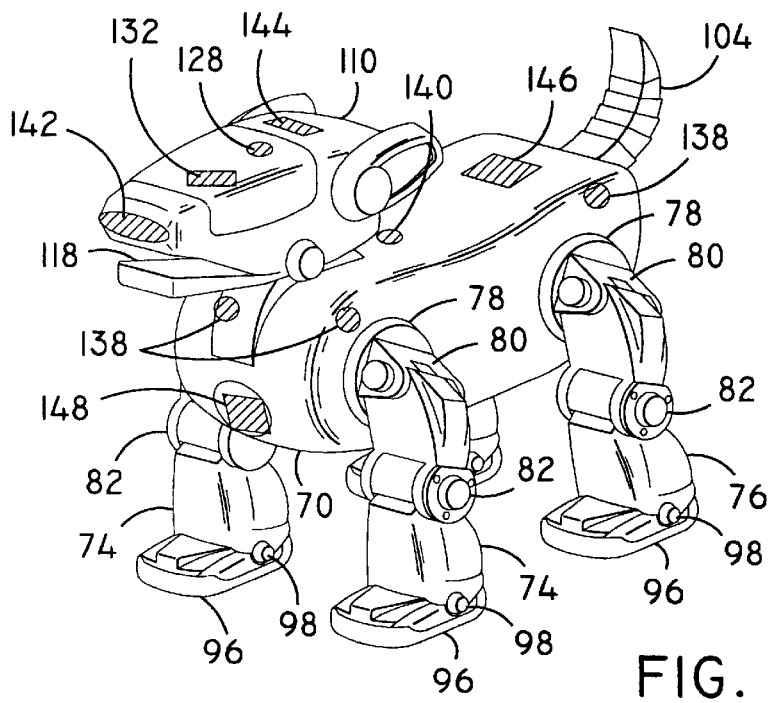
FIG. 15 is a perspective view of the external sensors of the apparatus.

FIG. 15 shows that the preferred embodiment includes a plethora of sensing devices to increase the apparatus' ability to monitor and react to its surroundings. One such device is the voice recognition microphone 128 located within the head 110 of the apparatus. Also located within the head 110 and facing toward the front of the apparatus and peering through the facial visor 130 is a passive light/motion sensor 132 that comprises a tube 134 and CDS cell 136 (see FIGS. 18A–18B). Yet another device consists of a series of three triangulation microphones 138 with one triangulation microphone 138 located near each front hip joint 78 and the third triangulation microphone 138 located near the tail 104 of the apparatus. In addition, a petting CDS 140 is located on the back of the apparatus just to the rear of the neck 108 while there is a nose touch switch 142, a head touch switch 144 positioned on the top rear of the head 110, and a rump touch switch 146 located on the back of the apparatus near the tail 104. Finally, there is a multiplexed IR sensor 148 located in the middle of the chest of the apparatus that is facing toward the front of the apparatus.

Figure 16:
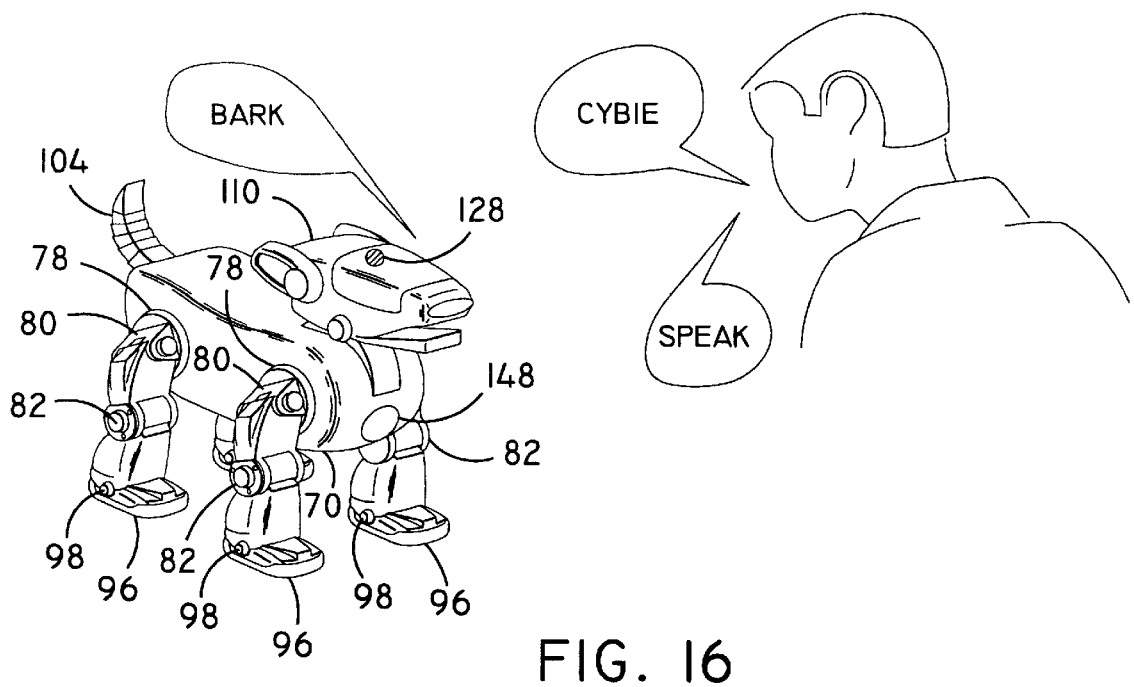
FIG. 16 is a perspective view of the apparatus interacting with a user using its voice recognition microphone.

The voice recognition microphone 128, as shown in FIG. 16, allows the user to give the apparatus commands in lieu of or in addition to other control means such as remote RF control using a joystick. For instance, the user can tell the apparatus to walk, bark, turn, stop, lie down, or sit down which will be picked up by the voice recognition microphone 128 which, in turn, sends a signal to the micro processor 120. Then the microprocessor 120 matches the signal sent by the voice recognition microphone 128 to the appropriate set of instructions that have been preprogrammed for that particular command. Those instructions are then sent by the microprocessor 120 to the necessary components of the apparatus such as the legs making the apparatus capable of obeying the command. In the alternative, the voice recognition microphone 128 can be used to detect loud sounds in the apparatus' environment engendering a typical canine response such as hostility or fear using the same technique. It is preferable that the components that make up the voice recognition microphone 128 enable it to pickup sounds originating as close as six inches and as far as five feet from the apparatus with an accuracy of ninety-five percent or better to make sure the apparatus can adequately mimic the acute hearing of a canine.

Figure 17:
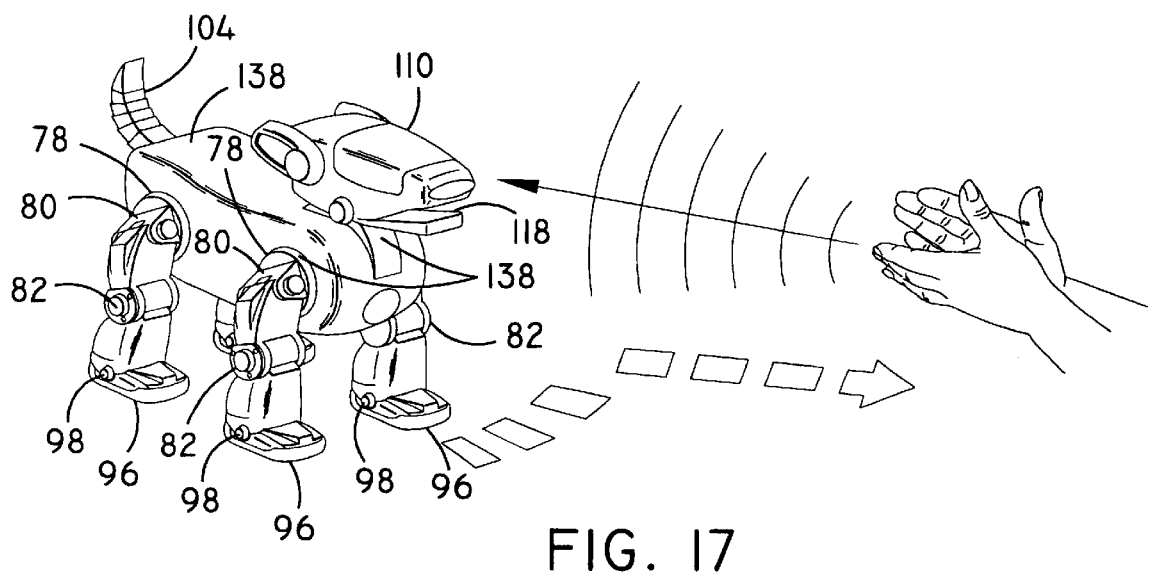
FIG. 17 is a perspective view of the apparatus using its triangulation microphones to find the origin of a sound.

The triangulation microphones 138, as shown in FIG. 17, allow the apparatus to determine the origin of sounds by timing the differential of when the different microphones pick up the sound. This feature is particularly advantageous in those situations where the apparatus is not facing the origin of the sound so that the other sensors of the apparatus such as the multiplexed IR sensor 148 and the passive light/motion sensor 132 are not able to detect the origin. As a result of having the triangulation microphones 138, the apparatus can determine the vector of the origin and turn its head 110 or body until it faces the source when it can then decide whether to pursue the origin of the sound. Accordingly, it is preferable that this apparatus can determine the direction of sounds with an accuracy of plus or minus five degrees at a range of ten feet, rendering the apparatus more canine like than prior art devices.

Figure 18A:
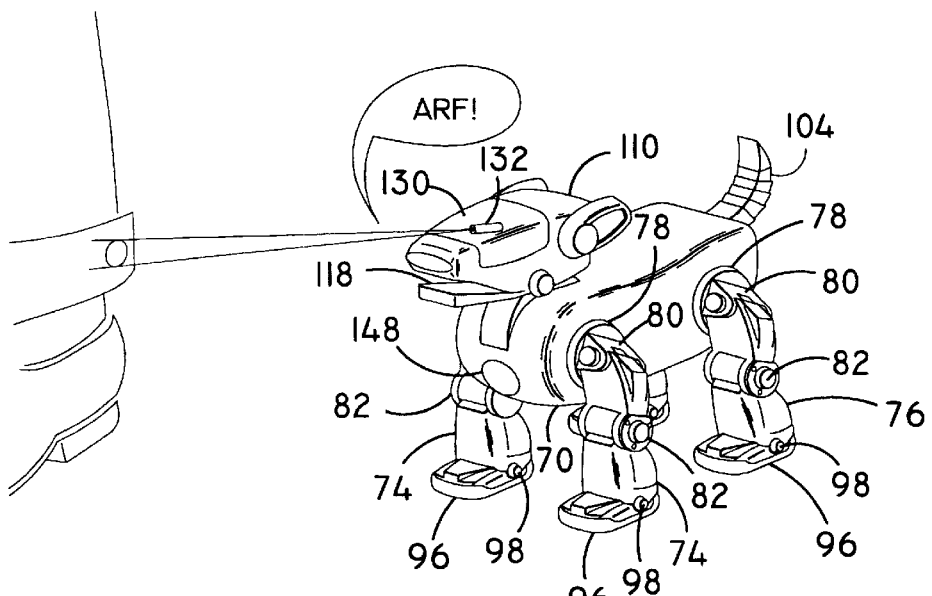
FIGS. 18A–18B are perspective views of the apparatus using its passive light/motion sensor.
Figure 18B:
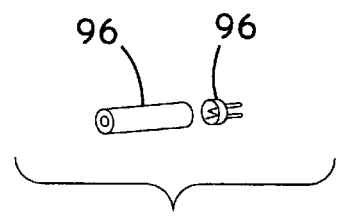
Figure 19A:
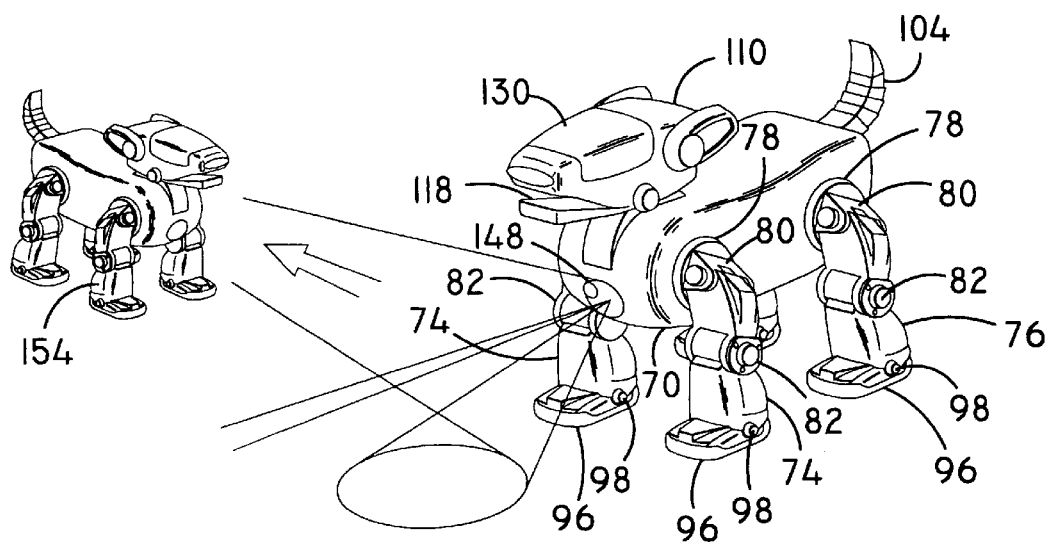
FIGS. 19A–19D show the apparatus locating and walking toward an active target.
Figure 19B:
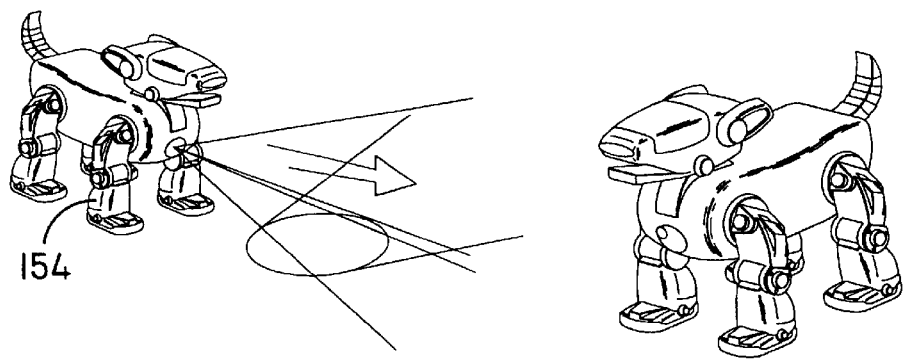
Figure 19C:
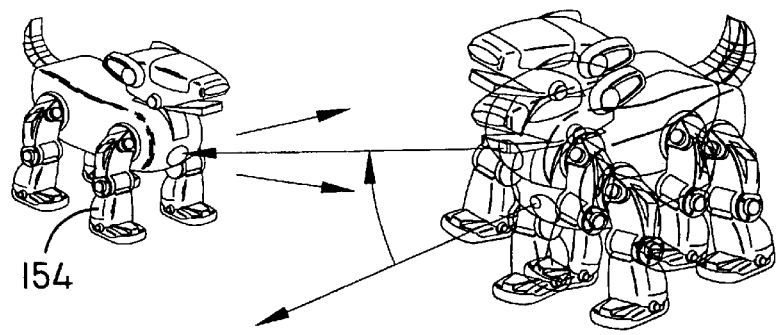
Figure 19D:
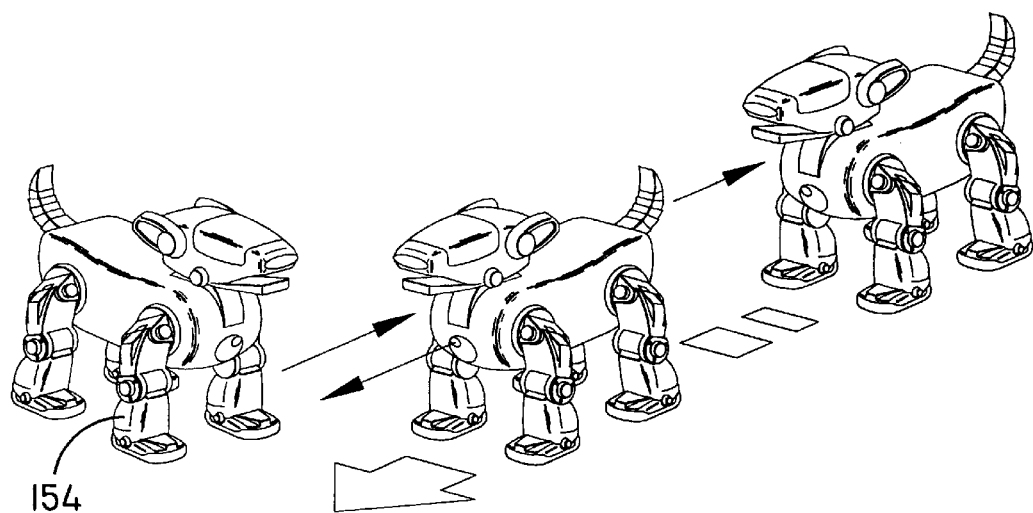
Figure 20A:
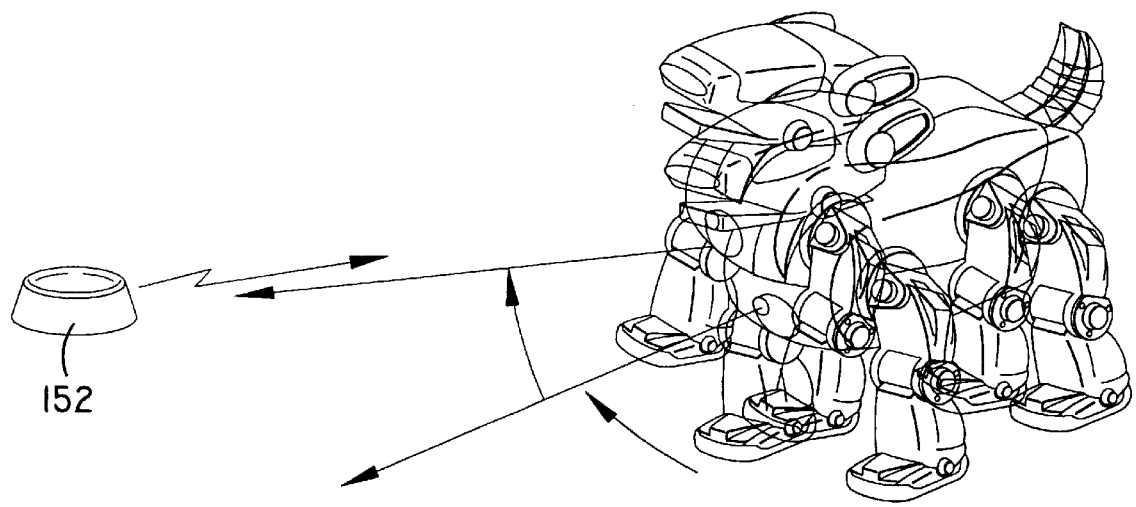
FIGS. 20A–20B show the apparatus locating and walking toward a passive object.
Figure 20B:
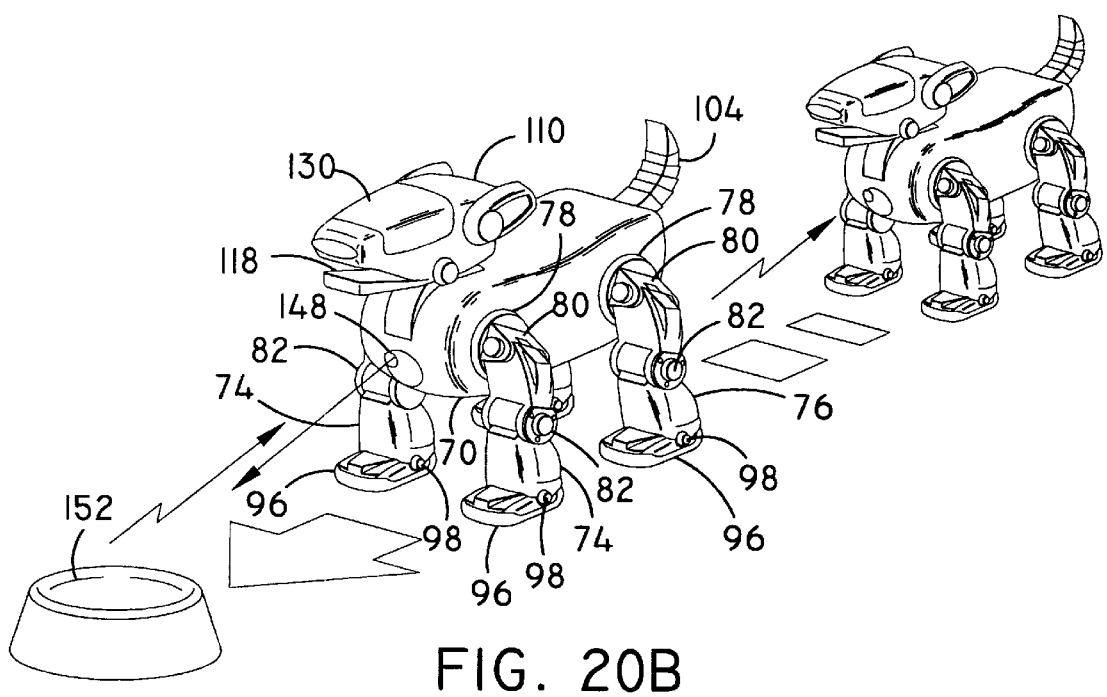
Figure 21:
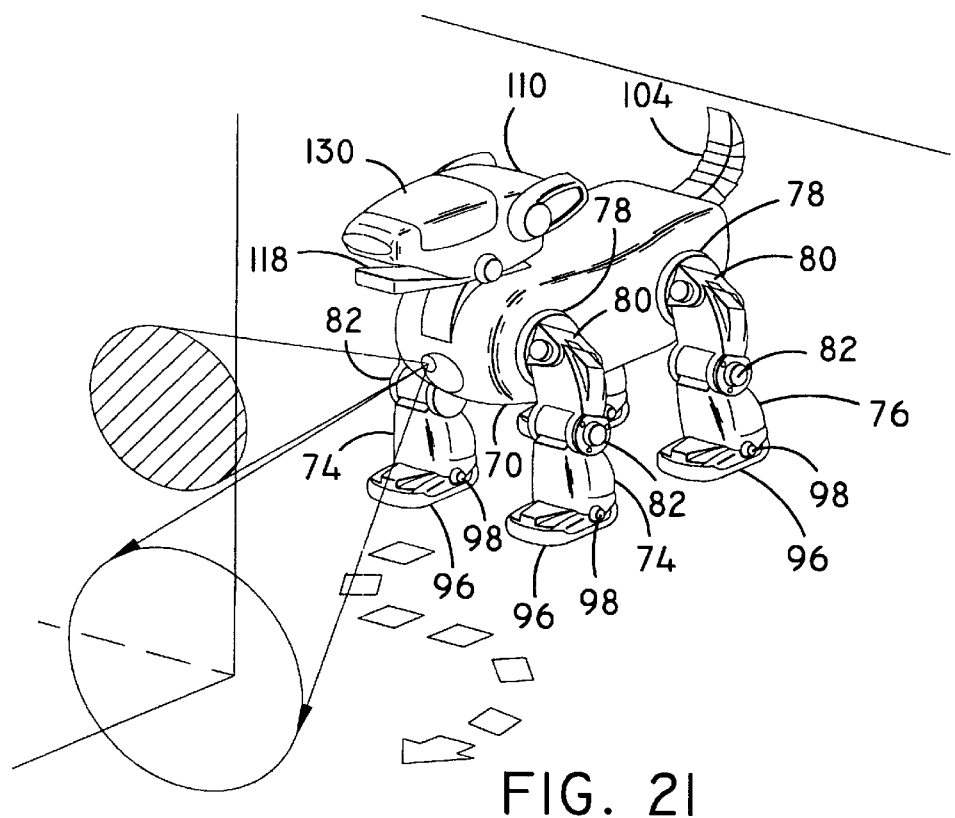
FIG. 21 is a perspective view of the apparatus using its wall detectors.
Figure 22:
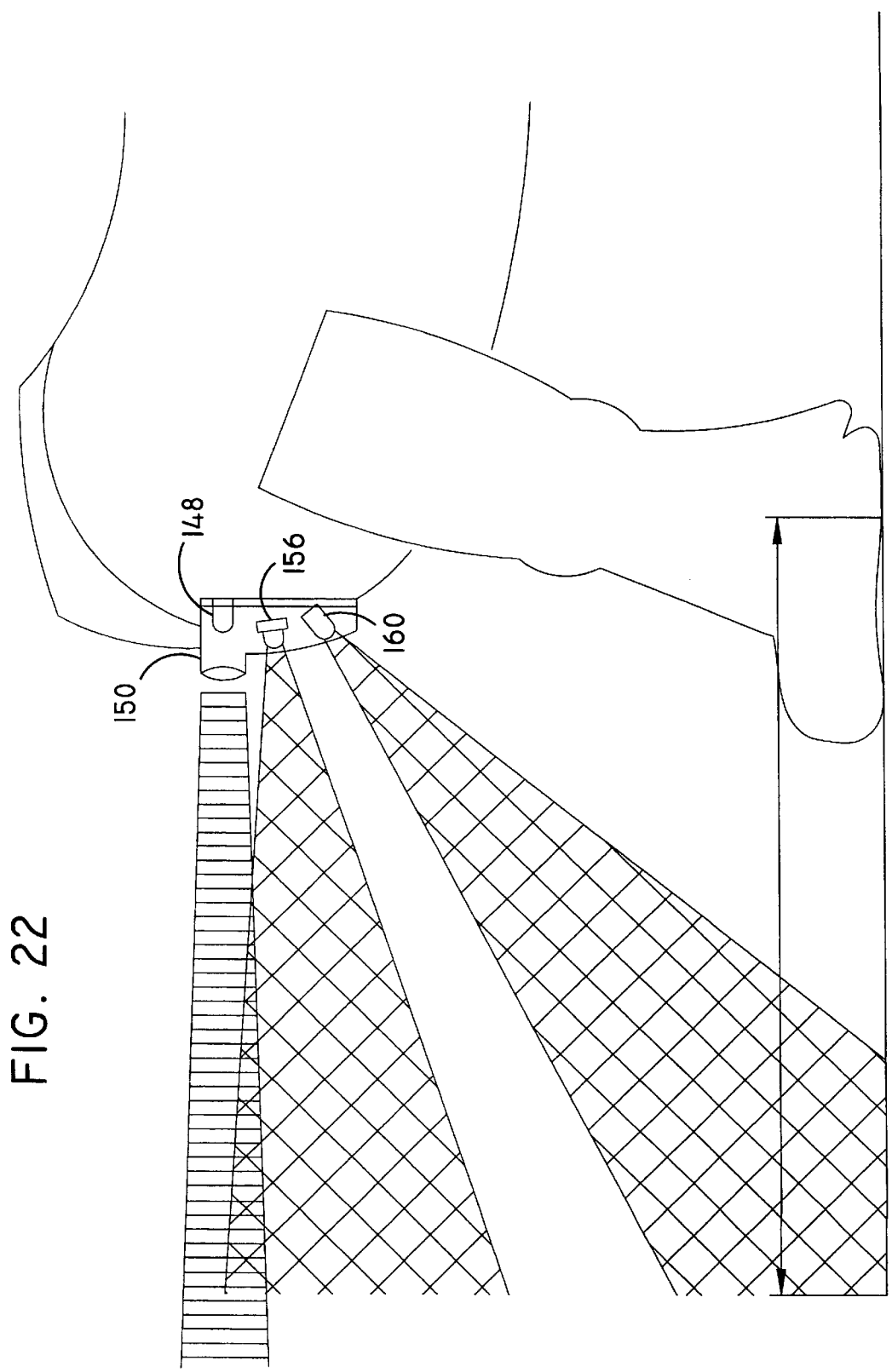
FIG. 22 is a left side elevational view of the beam patterns of the apparatus.
Figure 24:
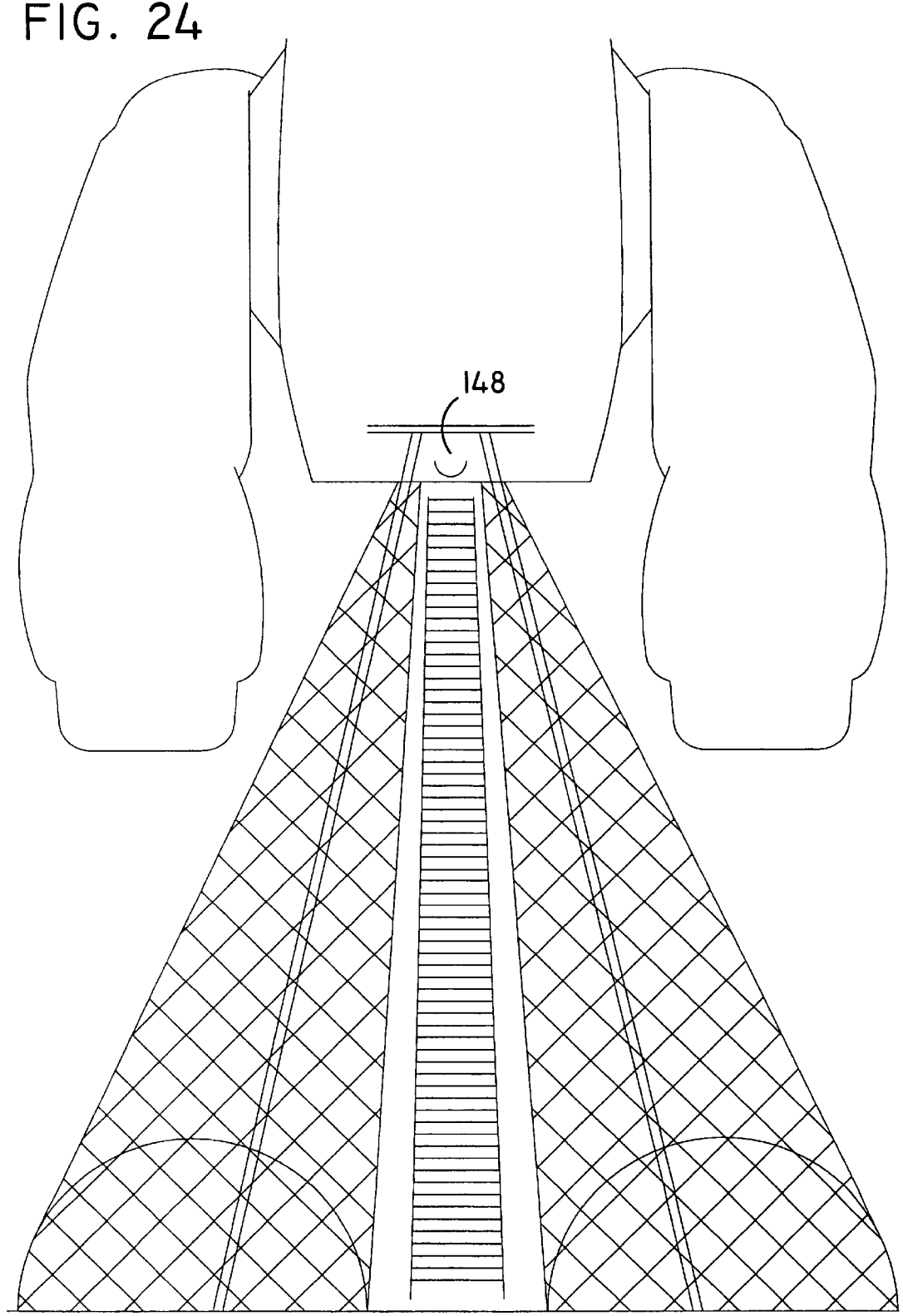
FIG. 24 is a top elevational view of the beam patterns of the apparatus.
Figure 25:
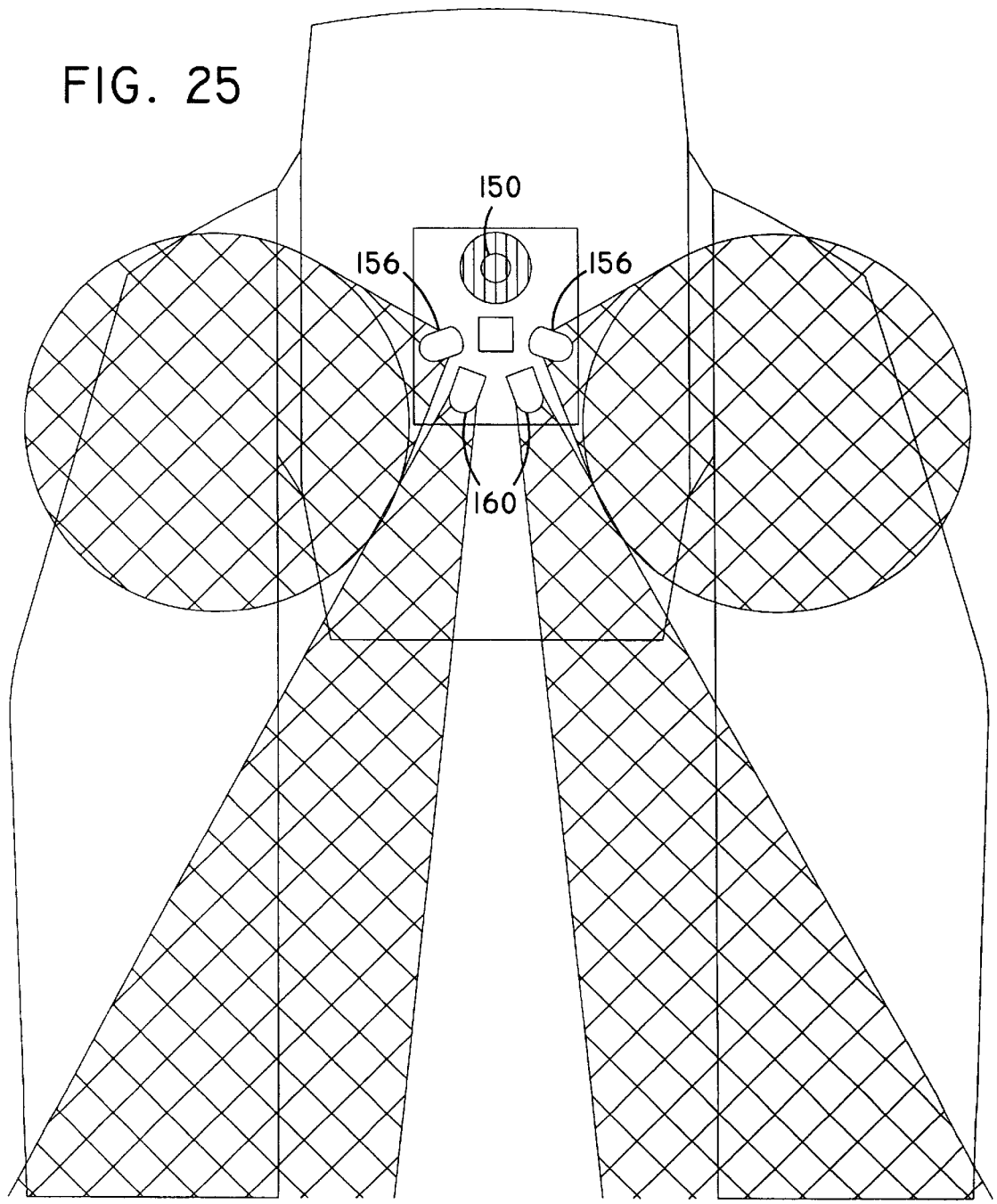
FIG. 25 is a front elevational view of the beam patterns of the apparatus.

The passive light/motion sensor 132, as shown in FIGS. 18A–18B, and multiplexed IR sensor 148, as shown in FIG. 15, work together to allow the apparatus to obtain a visual bearing on in its environment. In particular, the passive light/motion sensor 148 can detect whether it is day or night which, if the apparatus is properly programmed, may alter the way the apparatus behaves. For instance, the apparatus may sleep during the night and be more active during the day. In addition, the passive light/motion sensor 132 can also determine if something is moving within a narrow zone. If so, the apparatus can turn until the beam emitted from the seeking portion 150 of the multiplexed IR sensor 148 hits the object and is detected by the multiplex IR sensor 148. Then the apparatus can effectively pursue the object regardless of whether the object is a passive object 152 or active object 154 (see FIGS. 19A–19D and 20A–20B). In like fashion, two wall LEDs 156, one facing to the left and the other facing to the right of the apparatus, send out beams such that if a wall 158 is present the beam will be reflected and detected by the multiplexed IR sensor 148 (see FIGS. 21 and 22). Consequently, the apparatus can detect walls 158 and other tall obstructions and walk around them. Finally, the multiplexed sensor 148 also includes two floor LEDs 160, one facing down and to the left and the other facing down and to the right of the apparatus, send out beams such that if there is no floor 162 there will be no reflection (see FIGS. 23, 24, and 25). Hence, the apparatus may detect chasms and avoid them. It is preferable that the wall beams and the floor beams be directed in a direction that is ten degrees to the left and right of the plane of symmetry of the apparatus while the floor beams are also directed at an angle that is thirty-two degrees below horizontal. It is also preferable that the footprint of the floor beams from left to right be at least as wide as the walking footprint of the apparatus and that it be located approximately six inches from the front of the apparatus. These specifications ensure that there are no blind spots that are missed by the external sensors of the apparatus and therefore provide for the best operating embodiment that has been contemplated.

Figure 27:
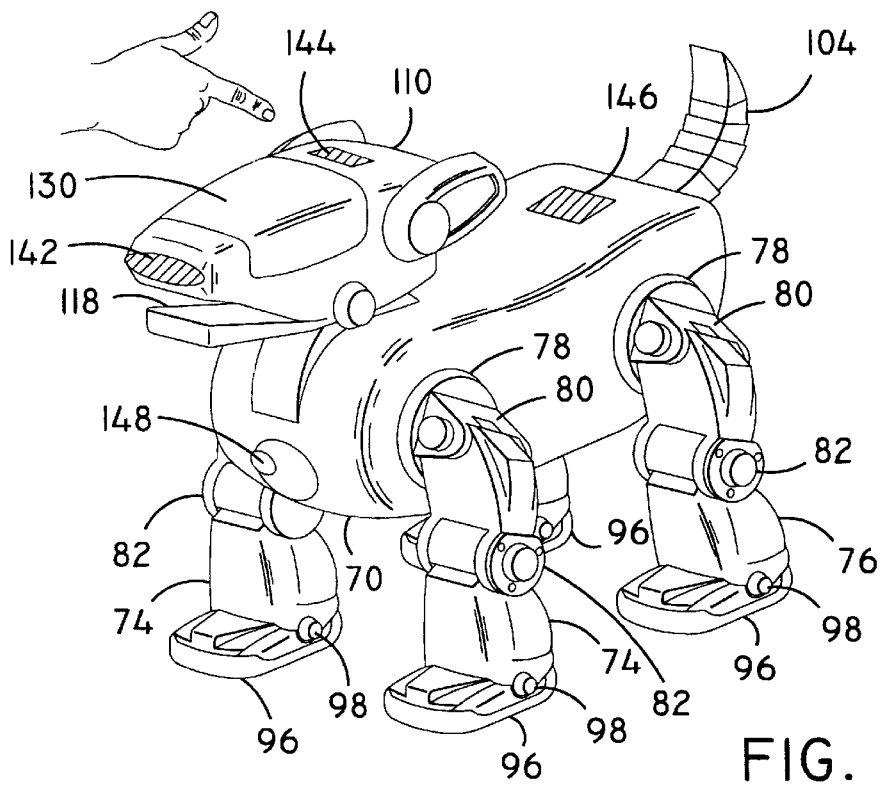
FIG. 27 shows how the nose touch switch, the head touch switch, and the rump touch switch work.

Turning to the petting CDS 140, nose touch switch 142, head touch switch 144, and rump touch switch 146, it can be seen that these sensors allow the user to interact with the apparatus in a more intimate way than the previously discussed sensors do (see FIGS. 26 and 27). The petting CDS 140 comprises a CDS cell 136 that is capable of monitoring ambient light variations and patterns such that as the user strokes or pets the apparatus the sensor will detect the change of light as the user's hand blocks out light intermittently with each petting motion. In like fashion, the nose touch switch 142, the head touch switch 144, and the rump touch switch 146 allow the user to directly influence the behavior of the apparatus. For example, the apparatus may be programmed such that these switches act as a keyboard giving the apparatus instructions to sleep, sit, or play games depending upon the number and order of switches pushed. Therefore, these features enhance the preferred embodiment's ability to act like a canine and interact with the user just like a real family pet does. Of course, it is possible that the type of switches can be changed to all CDS style or all electro-mechanical depending on what type of application the apparatus is designed to satisfy.

Figure 28:
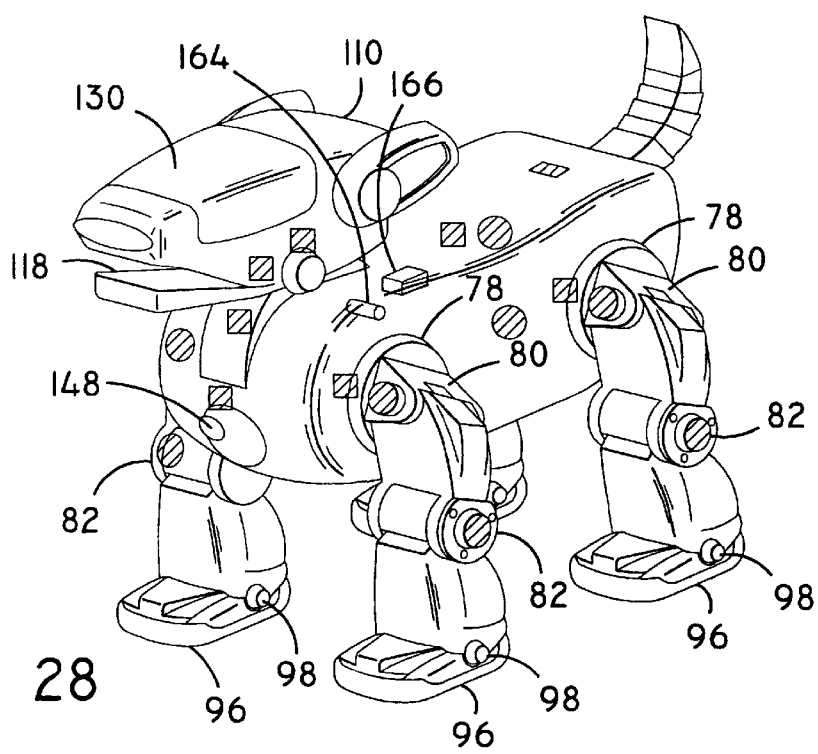
FIG. 28 is a perspective view of the internal sensors of the apparatus.
Figure 29A:
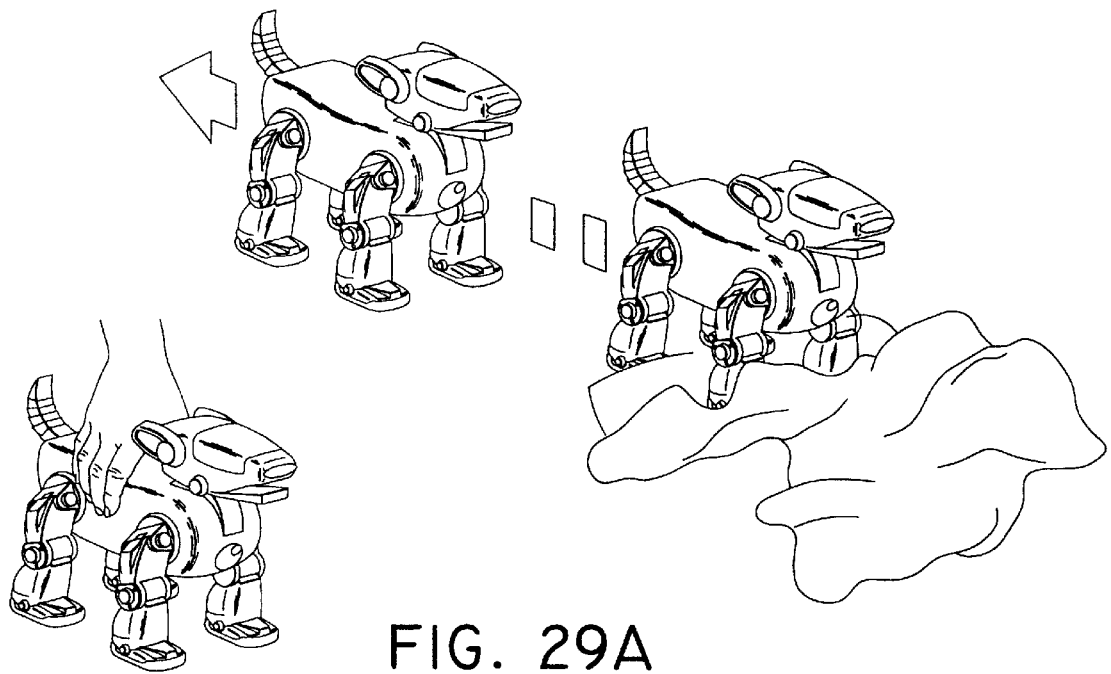
FIGS. 29A–29B show the purpose of the tilt and current sensors of the apparatus.
Figure 29B:
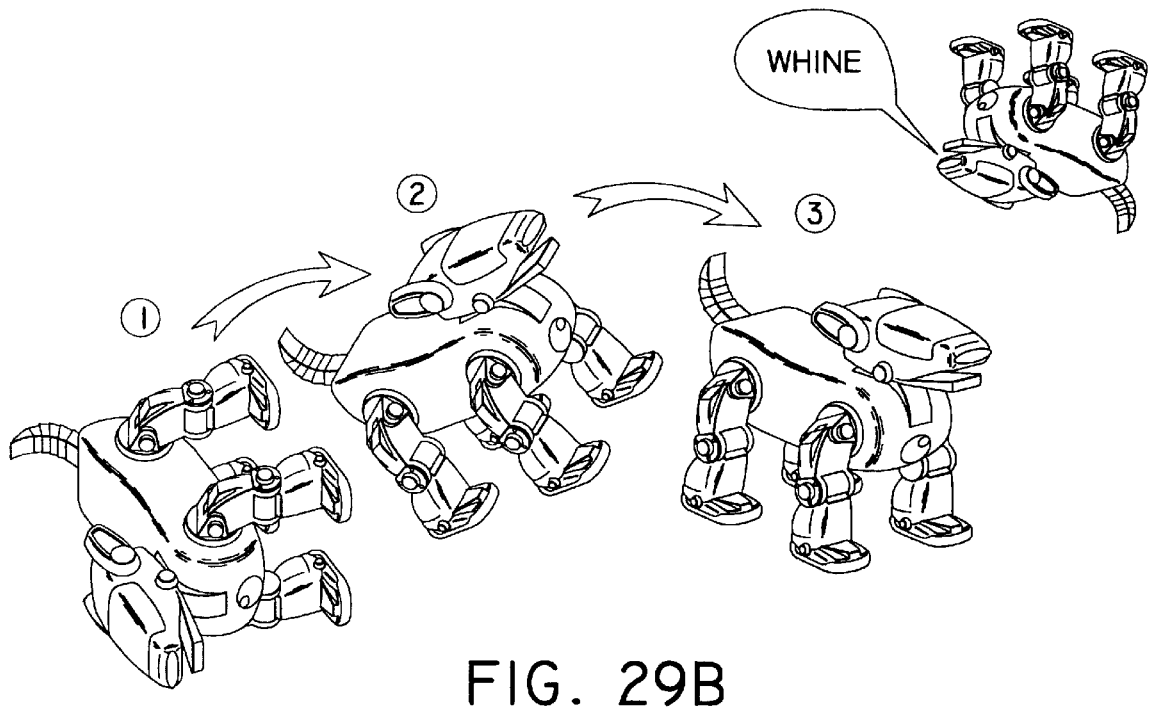

FIGS. 28 and 29A–29B also show additional internal sensors of the apparatus other than the encoders and their uses. One such internal sensor, which is located within the mid-region of the body shell 70 of the apparatus, is the current sensor 164. This sensor is capable of detecting when the apparatus becomes stuck or entangled with something in its environment such that the apparatus can no longer make forward progress. Once this problem arises, the current sensor sends a signal to the microprocessor 120 which, in turn, instructs the apparatus to reverse its direction until it is no longer entangled. The preferred embodiment of the current sensor 164 comprises the microprocessor 120 monitoring the pulses of power exerted by the servomotors which are attached to the different joint of the limbs. Pulses that consist of one hundred percent duty cycle and last for long periods of time indicate that apparatus is stuck. Many pulses that consist of twenty percent of duty cycle, on the other hand, indicate that the apparatus is not touching the ground. This is the preferred embodiment of the current sensor 164 simply because it requires no extra components. In the alternative, an ampere meter can be used to measure how much current the motors are drawing from the battery. A high level of current would indicate that the apparatus is stuck while a low level would indicate that the apparatus is not touching the ground.

Figure 30:
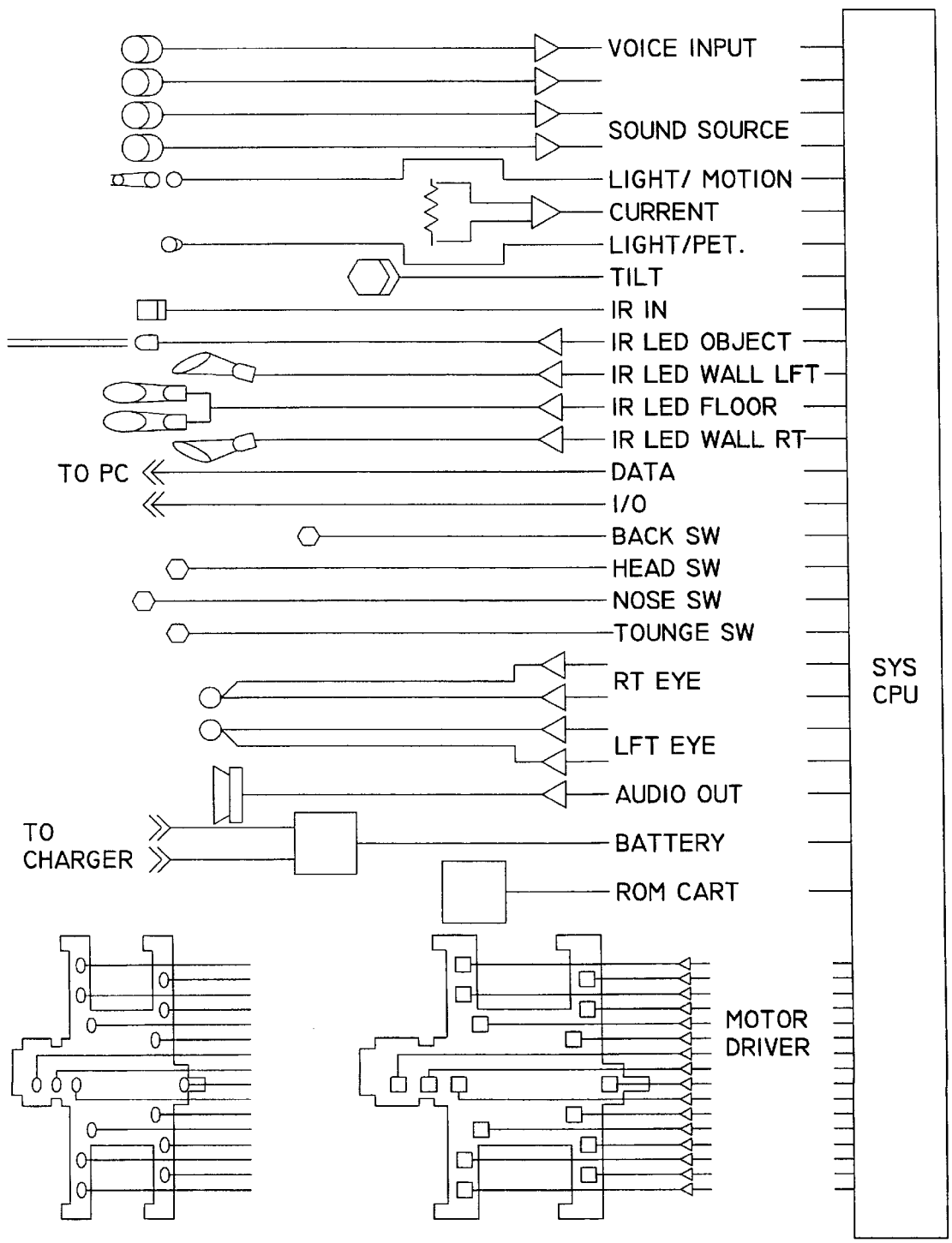
FIG. 30 is a system layout of the apparatus.

Another internal sensor, which is located within the mid-region of the body shell 70 of the apparatus, is the tilt sensor 166 which is capable of detecting when the apparatus is laying on its side. The preferred embodiment of the tilt sensor 166 comprises a ball bearing that contacts certain posts once the apparatus is on its side, thereby sending a signal to the microprocessor 120. When this happens, the microprocessor 120 then causes the speaker 116 of the apparatus to emanate a crying sound in an attempt to coax the user into righting the apparatus. If after a specified time the user does not right the apparatus, the apparatus will begin a self-righting action by rotating the two legs nearest the ground in a direction that is parallel to the ground and away from the body. This motion will cause the apparatus to stand upright again. As can be seen, these internal sensors make the apparatus more self sufficient and more canine like than other prior art devices. See FIG. 30 for a layout of the different sensors and their connection to the microprocessor 120.

Figure 31A:
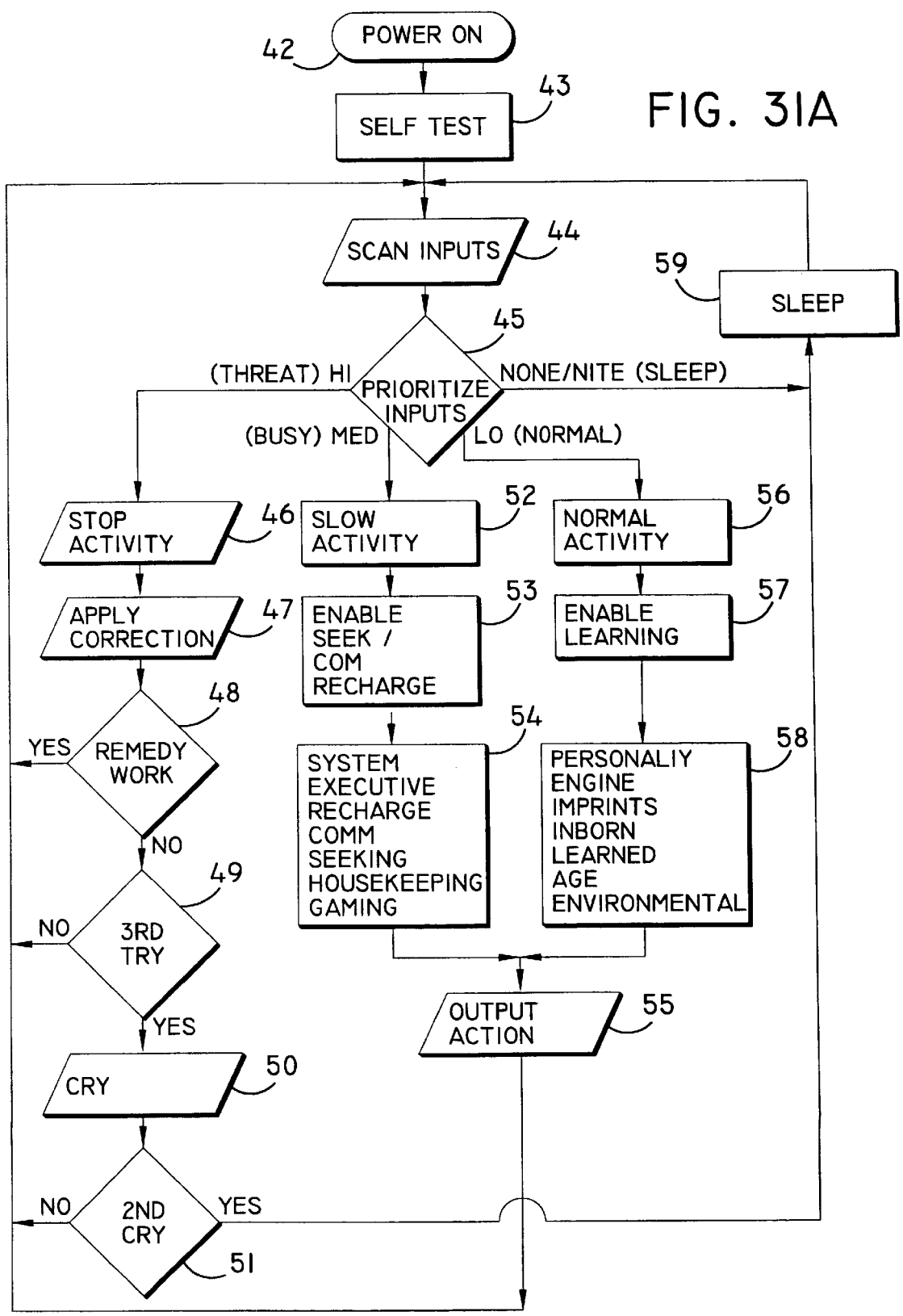

Referring to FIGS. 31A–31B, this embodiment of the invention is capable of simulating different canine behaviors depending upon the stimuli found in its environment. This figure shows the top level flow chart for the apparatus. The first step shown is the power on step. Next, the apparatus performs a self test. Then the microprocessor 120 scans for the inputs mentioned above including the owner's voice, other sound sources, current, limb position, tilt, and reflections of infrared rays that have been bounced off objects in its environment such as the floor 162 or walls 158. Other types of input include signals generated by the nose touch switch 142, petting CDS 140, head touch switch 144 and rump touch switch 146 all of which are locate along the back of the apparatus (see FIGS. 26 and 27). The microprocessor 120 prioritizes the data to determine what level of behavior is appropriate.

If there is no input, then the apparatus will simulate a sleep mode where there is no output. If the input level is low, then the apparatus exhibits a normal mode of behavior where it will seek, sit, wag its tail 104, speak and look around like a dog normally does. If the input level is medium, then the apparatus will imitate a busy level of behavior where it is more active in the level of output it generates. However, if the input is high then the apparatus begins to behave in a manner that is consistent with the way a dog does when it is threatened. The apparatus then stops its normal activity and applies an iterative process where it tries to apply some corrective action to remedy the problem. The problem could take the form of being confined in a tight area or being pinned down and unable to move. In such situations, the dog may even cry if it is unable to solve the problem. As a result of this interaction between inputs, software, and outputs of the apparatus, it can behave more like a canine than prior art devices.

Figures 32, 33:
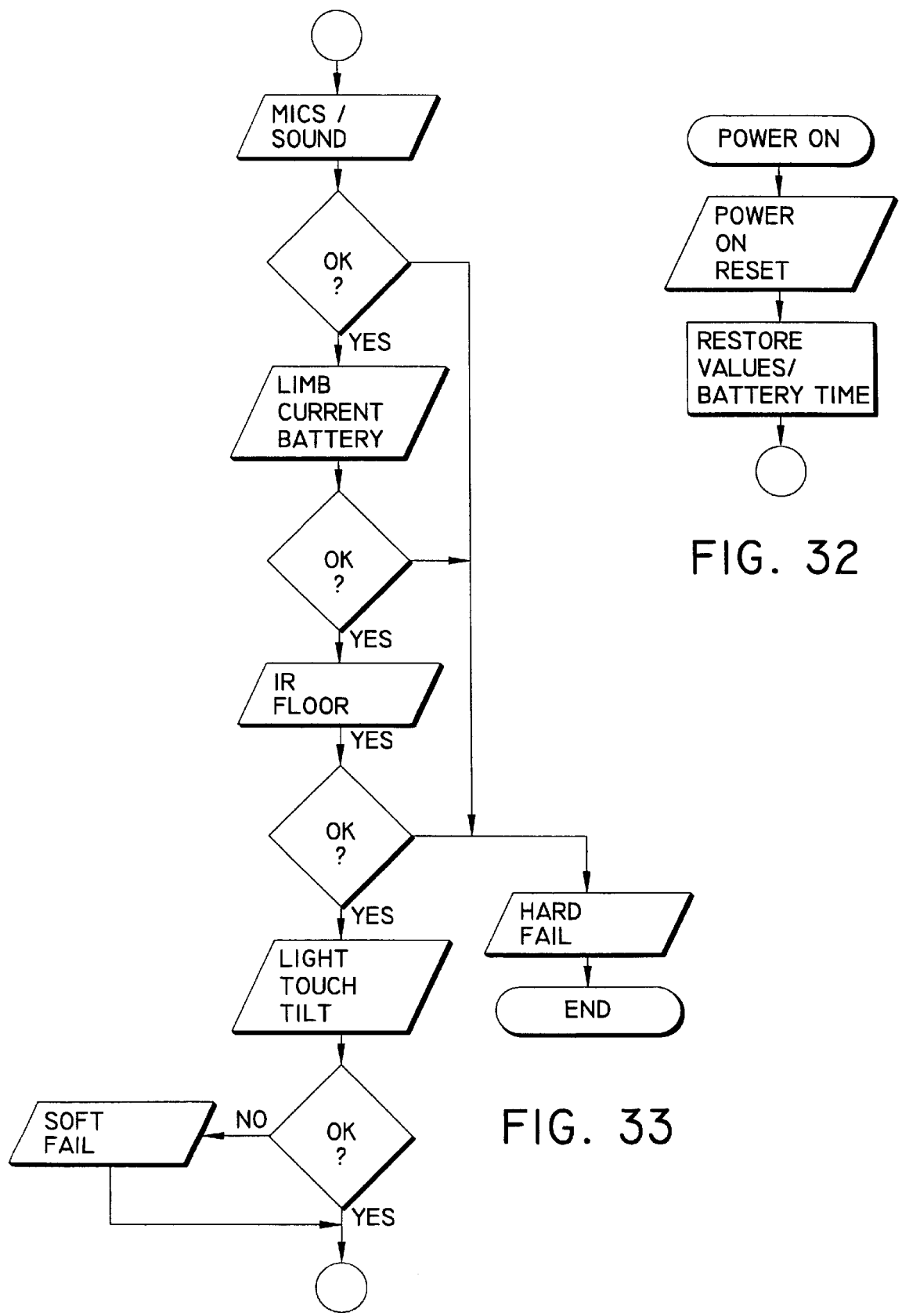
FIG. 32 is the power on step of the top level flowchart for the apparatus.
FIG. 33 is the self test phase of the top level flowchart for the apparatus.

FIG. 32 shows in more detail the steps contained within the power on step of the high level flowchart. The first step is power activation that is initiated either by the user or some type of timer whether internal or external with respect to the apparatus. Next, the apparatus resets all settings to their proper original values and begins to keep track of the battery time left before the apparatus needs to be recharged.

FIG. 33 shows the details of what the apparatus does during the self-test portion of the top level flow chart. During this step, the microprocessor 120 systematically checks the voice recognition microphone 128, the triangulation microphones 138, limbs, current sensor 164, battery level, IR floor sensors 168, tilt sensor 166, etc. to make sure that all systems are functioning properly. If not, the apparatus indicates a soft fail until the problem is rectified.

FIG. 34 shows a logical sequence for scanning the inputs of the apparatus. First, the apparatus ascertains whether motors are turning. If not, the apparatus must determine what motion is appropriate and in what direction. This achieved by scanning for voice input, other sound input, or light input. Once the microprocessor has assimilated this information, it causes the apparatus to move. At this time, the microprocessor 120 begins to scan other sensor inputs such as the floor sensors 168, the wall sensors 170, the battery charge timer, tilt sensor 166, seeker 150, etc. to make sure that it can reach its objective whether it be an active object 154 or passive object 152 without becoming stymied by an obstruction or chasm.

Once the inputs have been obtained, FIG. 35 shows how the apparatus prioritizes these inputs and determines what level of behavior is appropriate. The first three inputs that are considered is whether the apparatus is under current, tilted, or is blocked by a wall 158. If so, the apparatus chooses a high level of activity similar to how a canine behaves when it is frightened or threatened. If there are no positive indication concerning current, tilt, and wall 158 presence, then the apparatus determines whether a floor 162 is present or if the limbs of the apparatus are working properly. If either condition is negative, then the apparatus will exhibit a high level of activity. If both conditions are positive, then the apparatus further considers whether there is any other stimuli in its environment such as a voice, other sound, or light variations. If any of these are present, then the apparatus exhibits a low level of activity. If none are present, then the apparatus will fall asleep. In this way, the preferred embodiment of the present invention is capable of varying its behavior like a canine does in a realistic manner.

In determining the appropriate behavior to exhibit, the preferred embodiment of the present invention uses a stimuli accumulator that works as follows. Stimuli inputs such as voice, pet, touch, and motion input are quantified by accumulating the number of occurrences of these inputs over a five minute period during which they occur. These inputs are termed interaction parameters and are assigned "A" as a variable, the value of which is the number as determined above. Similarly, the environment parameters include sound inputs and light inputs and are assigned a variable "B", the value of which is calculated in a similar way as done for the interaction variables. Finally, the terrain parameters include floor, wall, tilt, and limb inputs and are assigned a variable "C", the value of which is calculated in the same way as mentioned for both the environment and interaction parameters. Once the microprocessor 120 has determined these variables, it compares their values once a minute as shown in Table 1 to decode what state the apparatus should exhibit whether it be sad, happy, sick, sleepy, etc. It should be noted that since there are more inputs being measured for variables "A" and "C" that this comparison is weighted, thus the apparatus is more likely to exhibit states such as happy and hyper than sleepy or sick just like a real canine.

TABLE 1

MOOD DECODER TABLE

| STATES | DECODE |
|---|---|
| A = B + A = C | SAD |
| A = B + A > C | HAPPY |
| A = B + A < C | HYPER |
| A > B + A = C | HAPPY |
| A > B + A > C | HAPPY |
| A > B + A < C | HYPER |
| A < B + A = C | SAD |
| A < B + A > C | SLEEPY |
| A < B + A < C | SICK |

TABLE 2

TYPES OF ACTIVITIES

| OBEY | WAIT | EXPLORE | TALK |
|---|---|---|---|
| Response to User Input | Lower Power Activities | Walk/Turn | Make Noise |
| Tricks Interaction | Static Pose | Locomotion | Moods Status |
| Some Moods | Dynamic Pose | Some Moods | Annunciation of Moods |
| Annunciation (Yes/No) | (Display Mood) | Seeking/Searching | |

TABLE 3

PASSIVE STATE (NO USER INTERACTION)
ACTIVITIES PERCENTAGE
(user interaction by pressing the head switches for 5 sec forces obey mode for any mood, listening for obey will occur after the completion of the current activity)
IF THE USER SAYS "STAY" EXPLORE AND WALKING MODES ARE CANCELLED "COME" RESTORES EXPLORE

| | OBEY | WAIT | EXPLORE | TALK |
|---|---|---|---|---|
| HYPER | 10% | 50% | 30% | 10% |
| HAPPY | 50% | 30% | 10% | 10% |
| SAD | 10% | 70% | 5% | 15% |
| SLEEPY | 10% | 70% | 5% | 15% |
| SICK | 5% | 80% | 1% | 14% |

Table 2 shows how these states of the apparatus correspond to the output behavior of the apparatus whether it be to obey, wait, explore, or talk. The apparatus executes a program depending on what state it is in. For example, the apparatus will wag its tail whenever it is hyper or happy. All non-ambulatory movements of the apparatus are controlled in this way. Table 3 shows how the apparatus apportions its behavior depending on the state of the apparatus when there is no user interaction. This is done based on a percentage of time displaying that type of behavior. For instance, if the apparatus is determined to be sick under Table 1 and there is no user interaction, the apparatus will display a waiting type of behavior eighty percent of the time. Through this type of programming, the apparatus can effectively implement the high level flow chart as shown in FIGS. 31A–31B.

Figure 36:
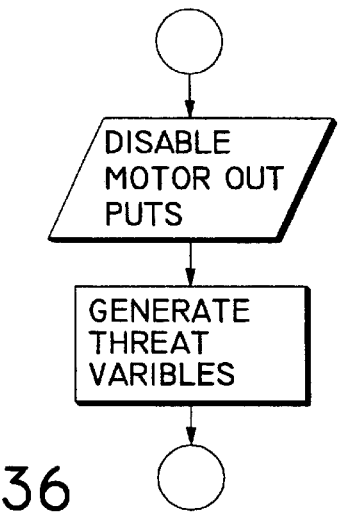
FIG. 36 is the stop activity phase of the top level flowchart for the apparatus.
Figure 38:
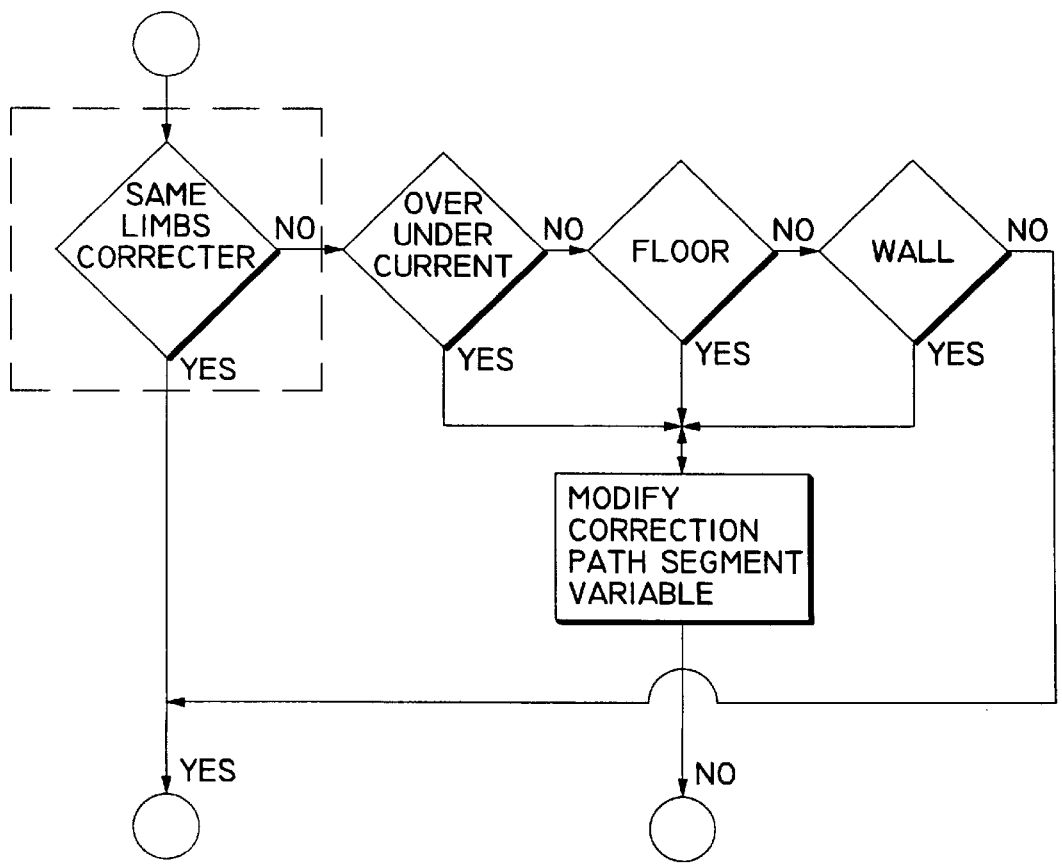
FIG. 38 is the inquiry phase where the apparatus checks to see if the remedy worked.
Figure 37:
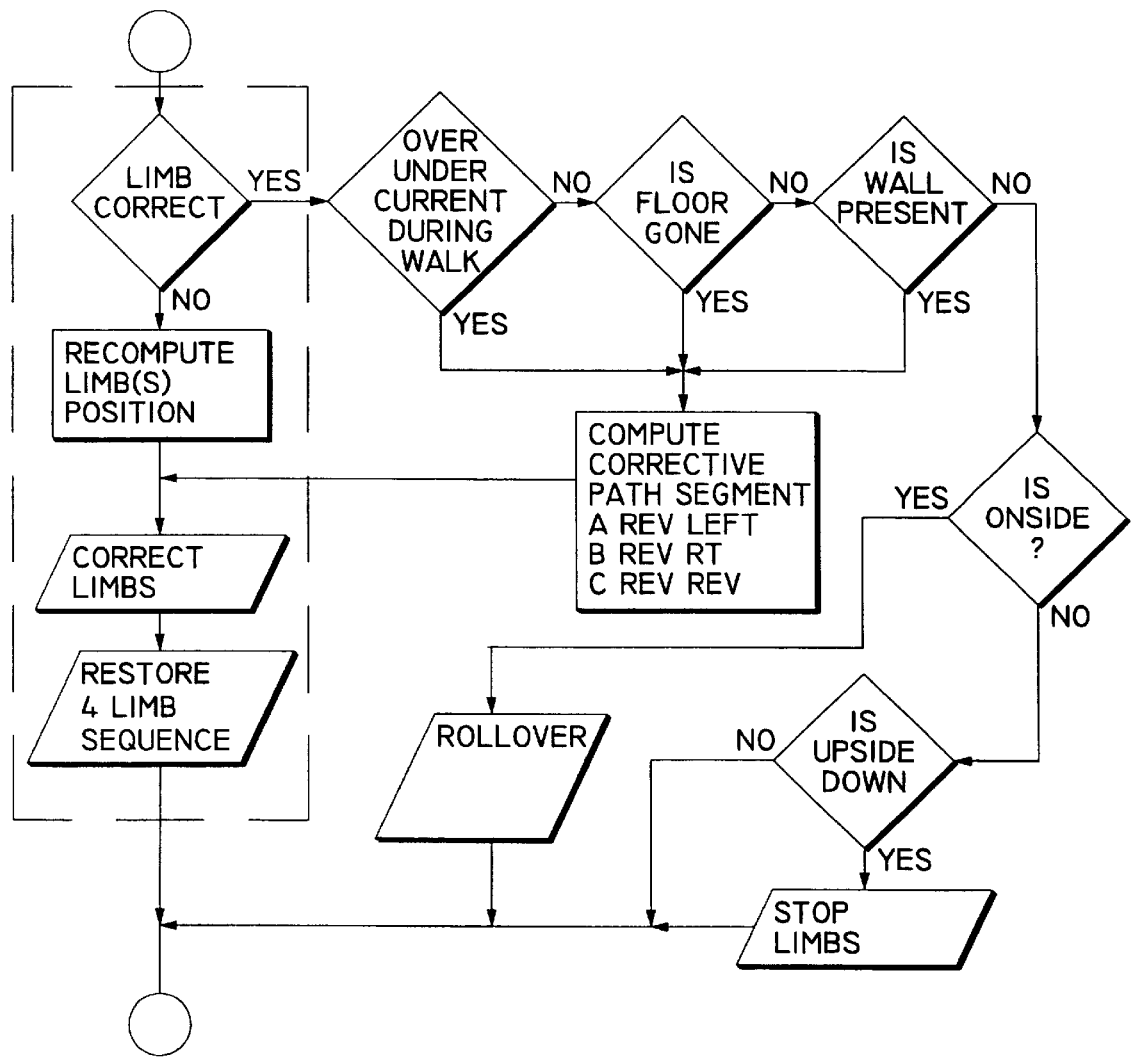
FIG. 37 is the apply correction step of the top level flowchart for the apparatus.
Figure 39:
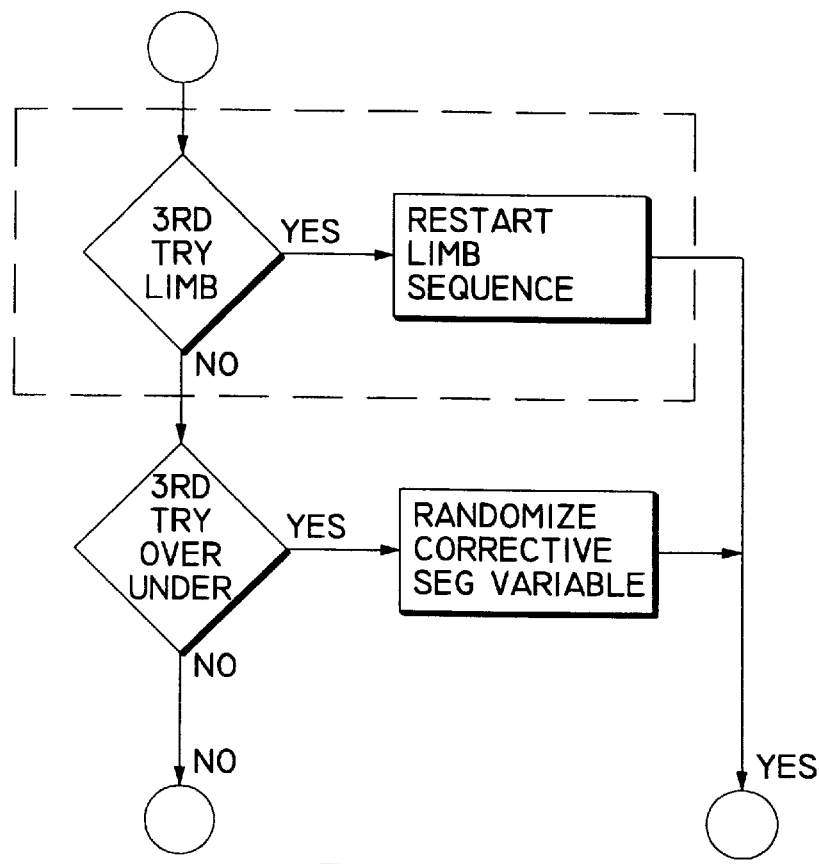
FIG. 39 is the repeat step of the inquiry phase.
Figure 40:
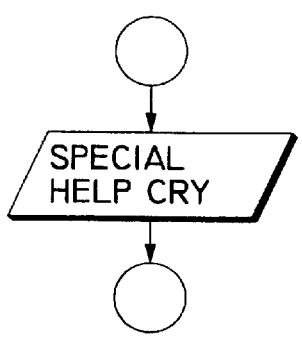
FIG. 40 is the special cry phase of the top level flowchart for the apparatus.
Figure 41:
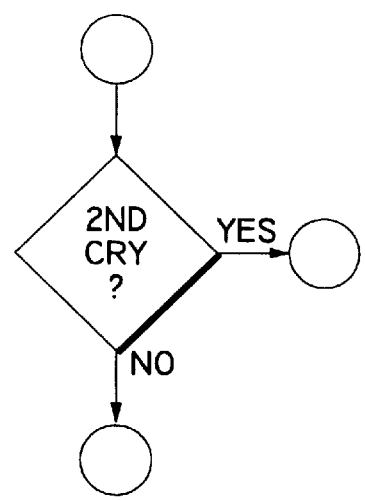
FIG. 41 is the repeat of the cry if the user does not assist the apparatus.

When the apparatus decides that the appropriate response to stimuli in its environment is to exhibit high level activity, the first step is to stop behavior as depicted in FIG. 36. This includes disabling any motor outputs and generating the correct threat variables to be portrayed by the apparatus. Now that the apparatus has encountered a problem, it must solve that problem in a systematic way as shown in FIG. 37. First, the apparatus determines whether its limbs are in the correct position. If not, the apparatus must re-compute the position of its limbs, correct their position, and restore the proper limb walking sequence. If the limbs are in their proper position, the apparatus decides whether it is under current, whether there is no floor 162, or whether there is a wall 158 present. If so, the apparatus takes corrective action such as reversing its movement. If none of these problems are present, then the apparatus checks to see if it is on its side or upside down. If it is on its side, then it initiates the self-righting action mentioned previously. If it is upside down, then all it can do is stop its limbs from moving. FIGS. 38 and 39 show that the apparatus then checks to see if the remedy worked and repeats this corrective action process while modifying the remedy each time for a total of six times or until the remedy works. If the problem still exists, the apparatus makes a special cry for help that is produced by its speaker 116 which is then repeated if the user has not assisted the apparatus in resolving this issue (see FIGS. 40 and 41).

Figure 42:
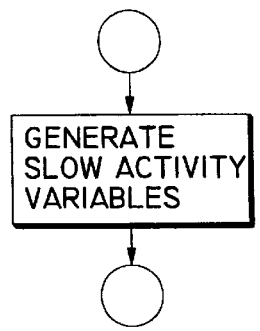
FIG. 42 is the slow activity step of the top level flowchart for the apparatus.
Figure 43:
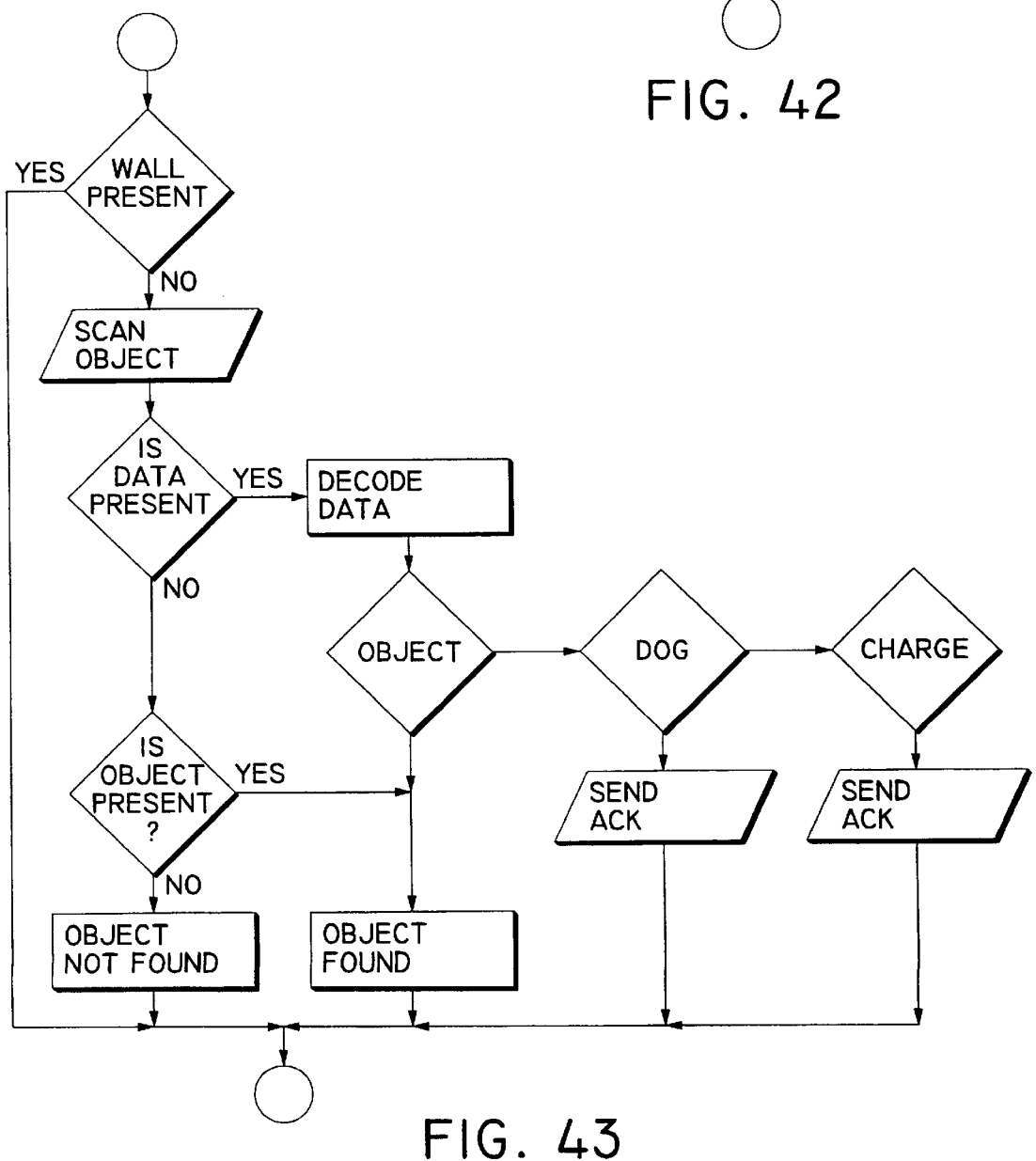
FIG. 43 is the seeking communications and recharge phase of the top level flowchart for the apparatus.

On the other hand, when the apparatus decides based upon the inputs it receives from its environment that it is necessary to exhibit medium level activity, it will engage in the process of seeking an object or charger station 172 as shown in FIGS. 42 and 43. If the apparatus encounters a wall 158, then this step is terminated. If the object is something other than a wall 158, then the apparatus scans the object to determine if there is data present. If there is no data present, then the apparatus concludes that it has found a passive object 152. If data is present, then the apparatus proceeds to decode the data. If there is an active object 154 such as another dog, then the apparatus sends acknowledgment to that dog. Finally, if the object is a charger station 172, then the apparatus sends acknowledgment to that station.

Figure 44:
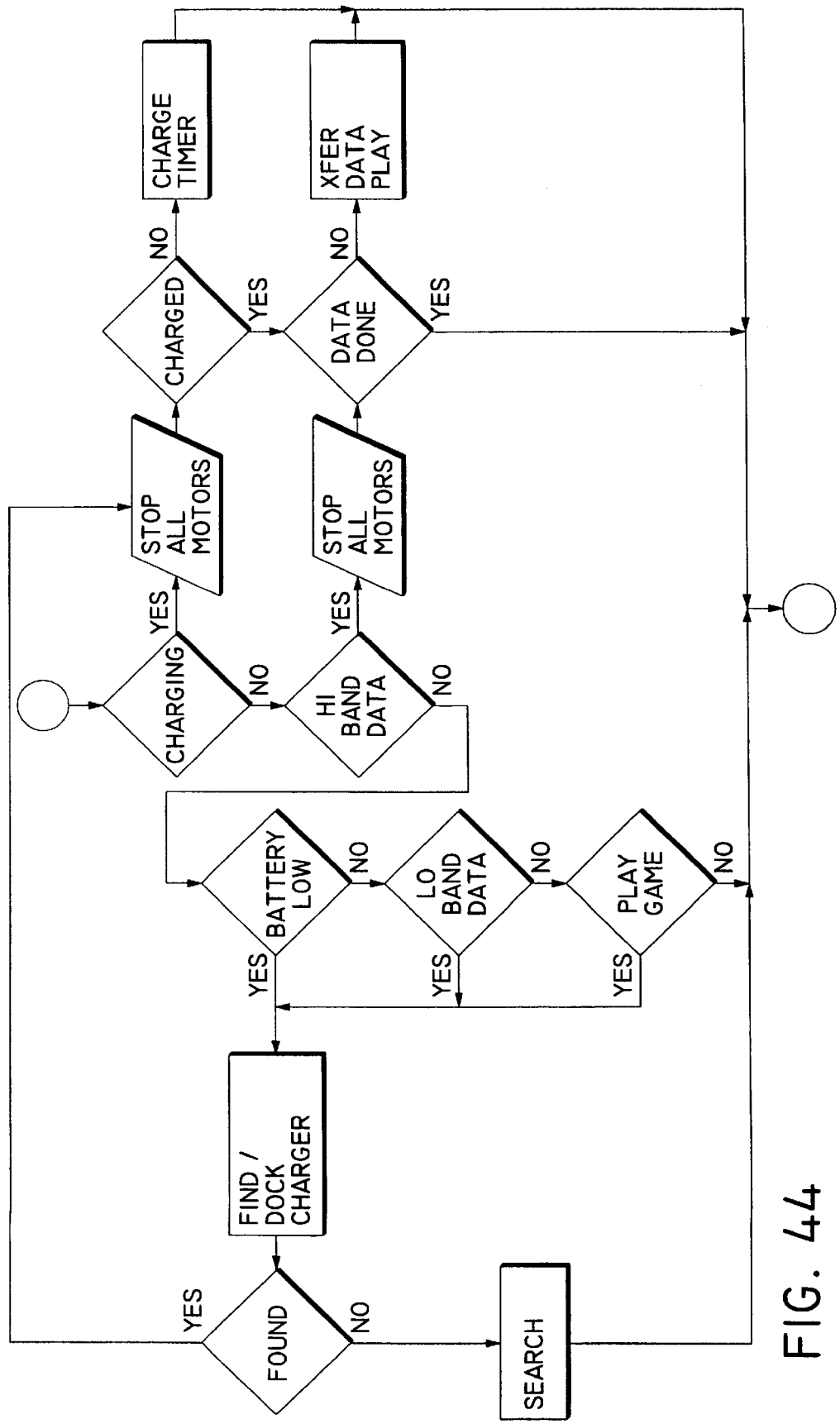
FIG. 44 is the system executive step of the top level flowchart for the apparatus.
Figure 45:
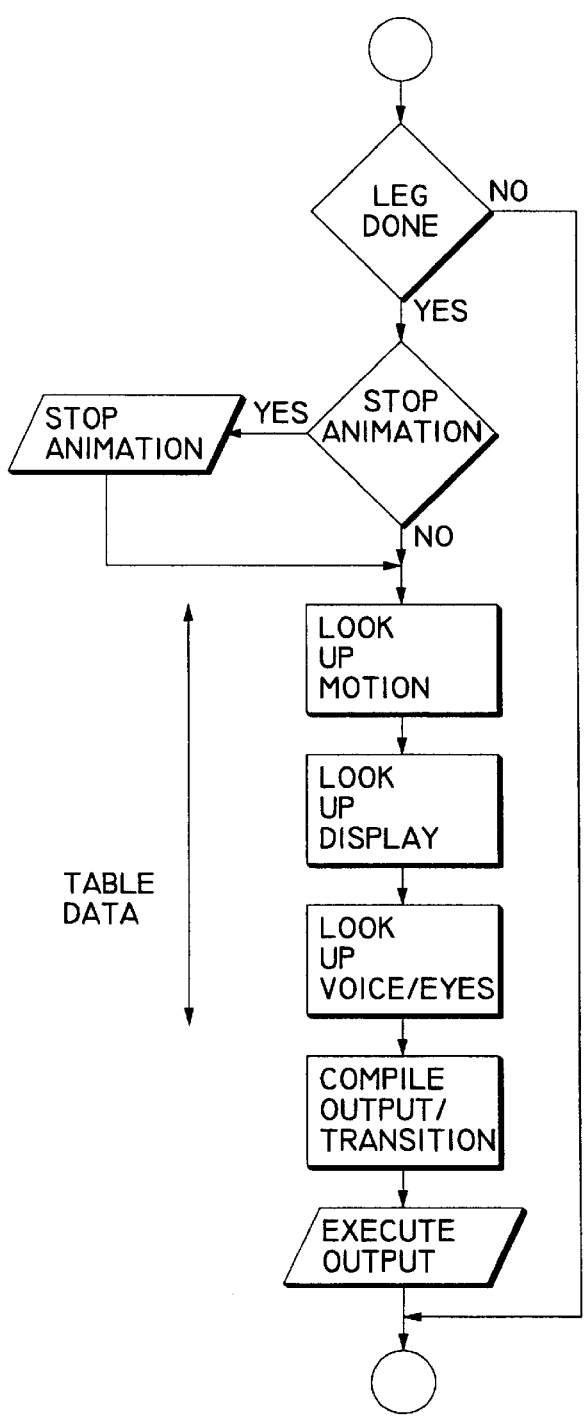
FIG. 45 is the output action phase of the top level flowchart for the apparatus.

Next, the apparatus undergoes the system executive phase of the medium activity level process as shown in FIG. 44. The apparatus proceeds to shut down all motors and charge its battery pack 122 and download data as both are available. Details on how the apparatus finds and mates with the charger station 172 as well as how it receives new programming will be discussed later. Finally, the apparatus begins to exhibit new behavior and animation that is in accord with the information that has been downloaded. FIG. 45 shows the steps the apparatus makes during this process.

Figure 46:
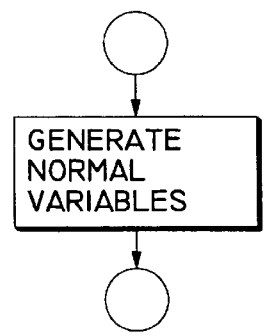
FIG. 46 is the normal activity step of the top level flowchart for the apparatus.
Figure 47:
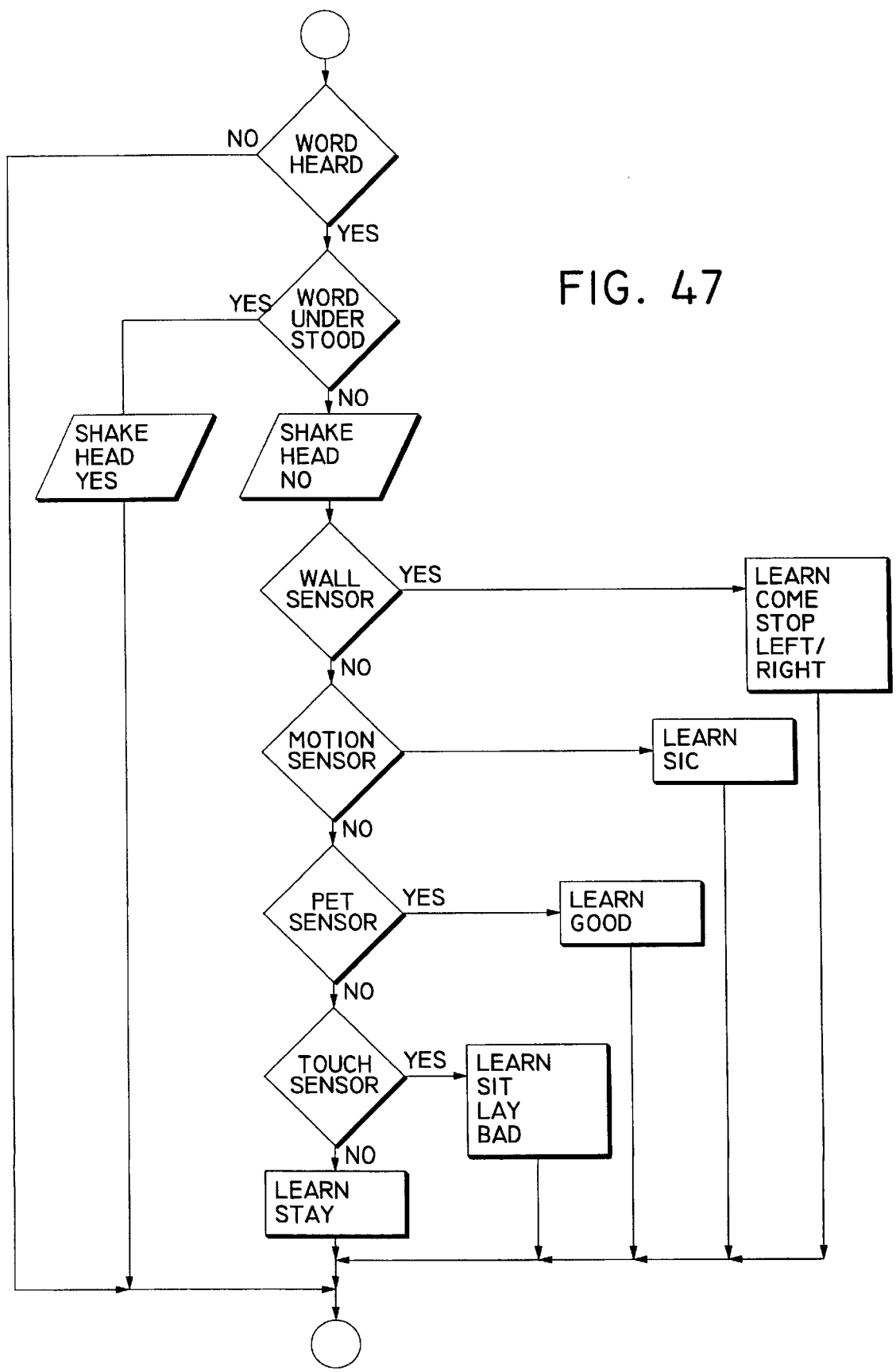
FIG. 47 is the enable learning phase of the top level flowchart for the apparatus.
Figure 48:
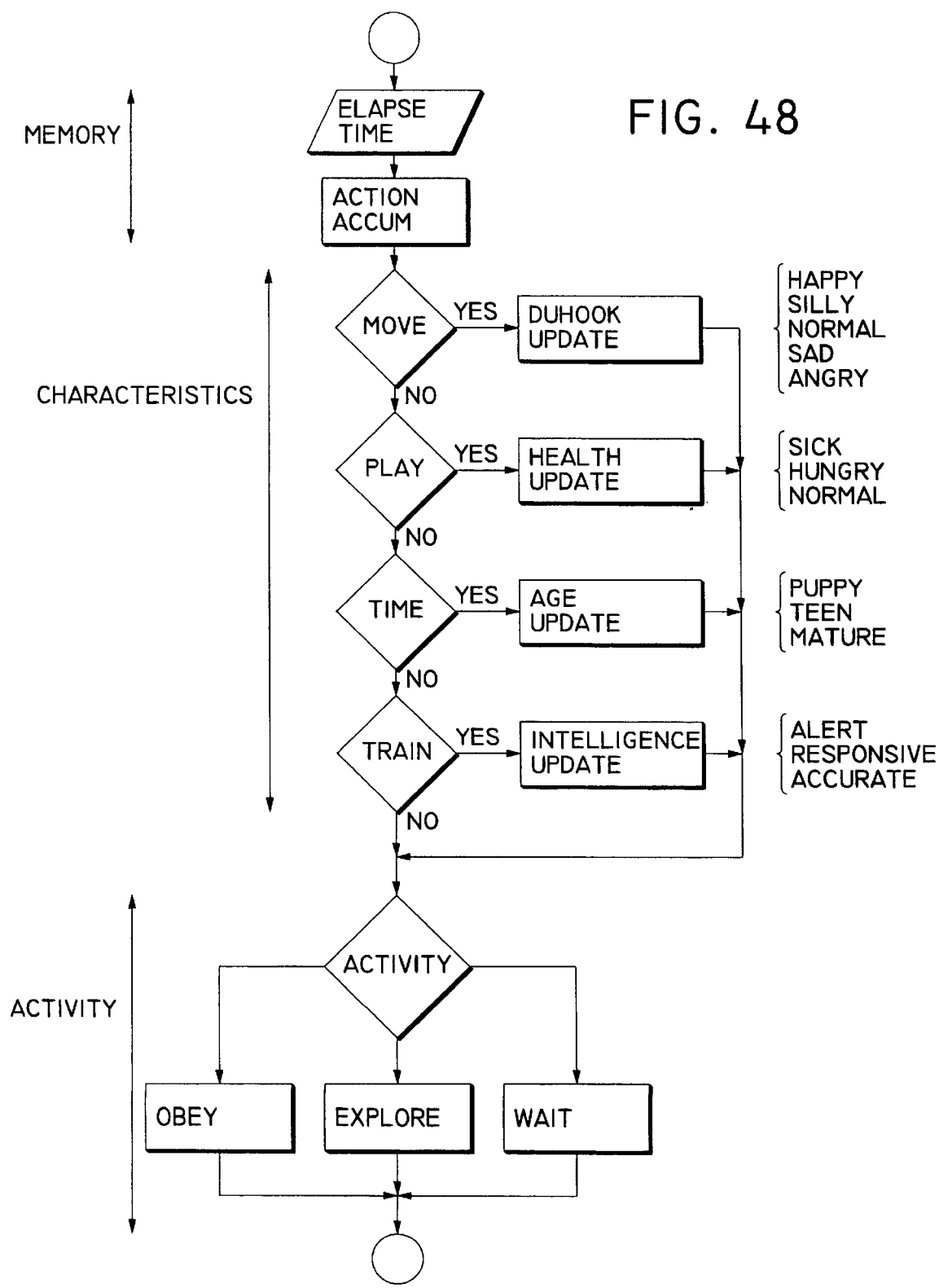
FIG. 48 is the personality engine step of the top level flowchart for the apparatus.

In certain situations, the inputs the apparatus receives may be low, indicating that the apparatus should exhibit a normal level of activity. FIGS. 46 and 47 show that the apparatus will go into an enabled learning mode that includes processing different types of communication as given by the user including verbal instructions and touching the different petting sensors. From these signals, the apparatus will display different sets of behavior such as good, bad, and protective. The apparatus also has a personality engine as shown in FIG. 48 where the apparatus' actions are controlled by variables such as mood, health, age, and intelligence. As a consequence of these programs, the apparatus will behave less statically than prior art devices and will act more like a real canine whose behavior changes as a result of life experience.

Figure 49:
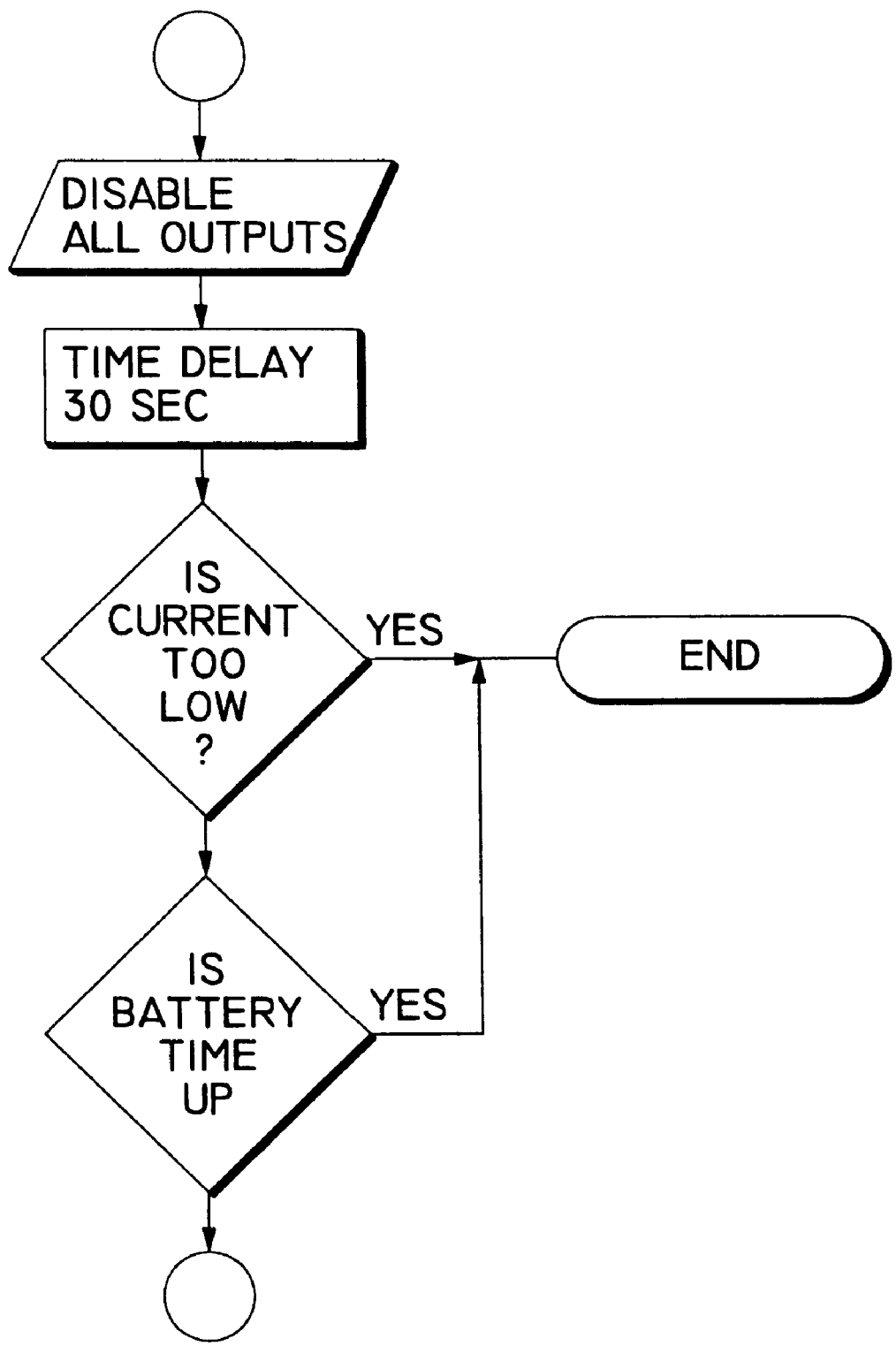
FIG. 49 is the sleep phase of the top level flowchart for the apparatus.

The last mode of behavior that the apparatus is capable of is the sleep mode. FIG. 49 shows that in this mode, which is brought about by a total lack of external stimuli, the apparatus disables all outputs with a delay period of thirty seconds. Then the apparatus checks to see if its current is running low or if the battery charge timer has expired. If the answer is yes to either question, the apparatus puts high current drawing devices to sleep and the apparatus keeps quiet during the night time.

Figure 50:
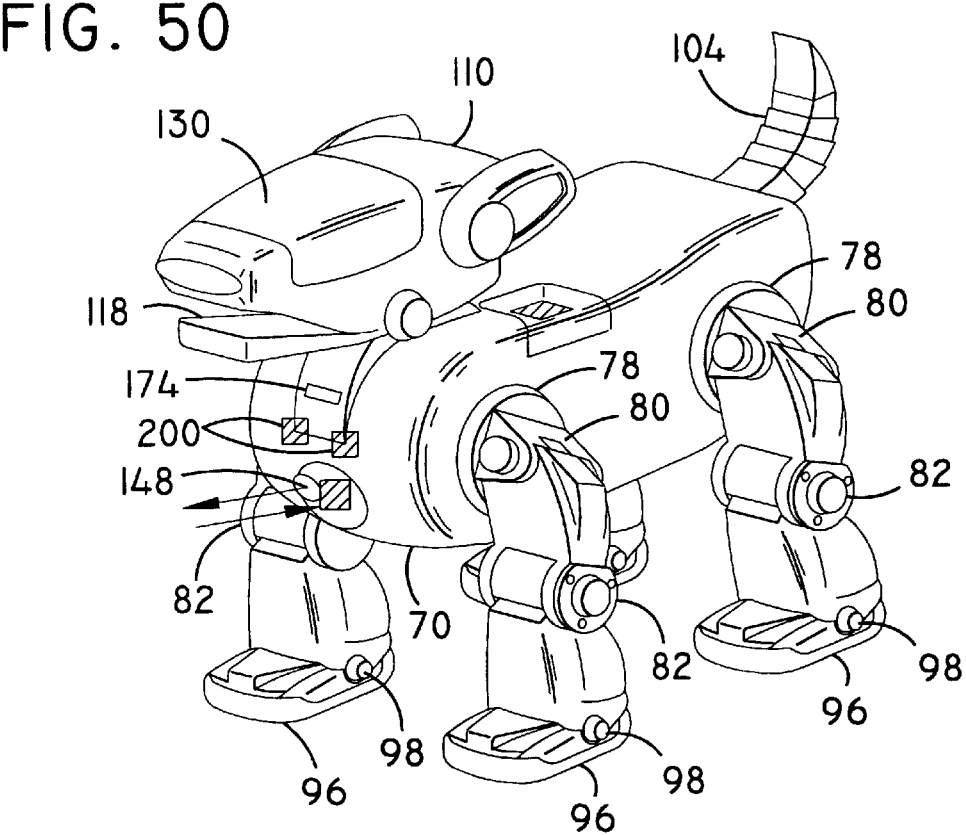
FIG. 50 is a perspective view of the apparatus showing its cartridge slot as well as its power connector.
Figure 51A:
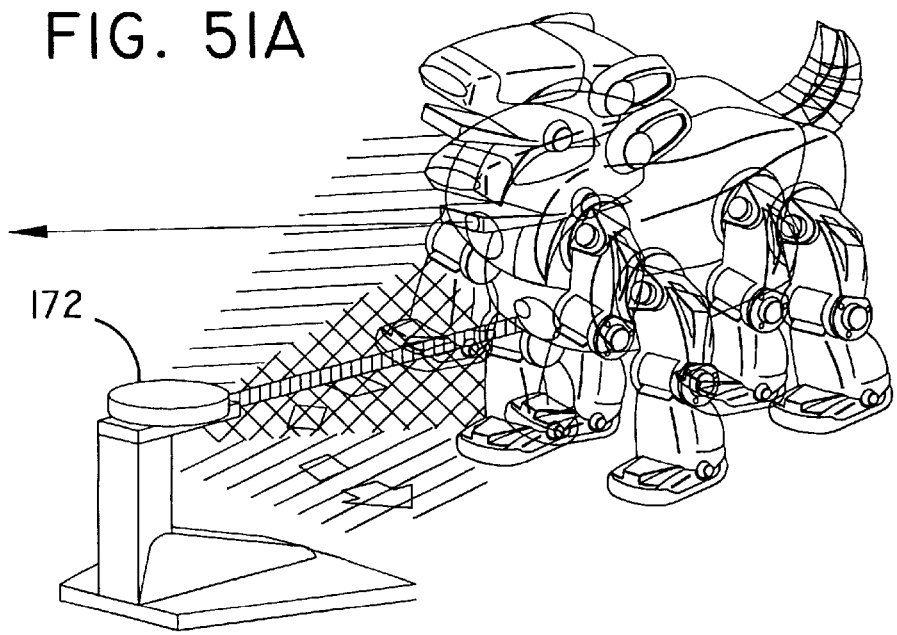
Figure 52:
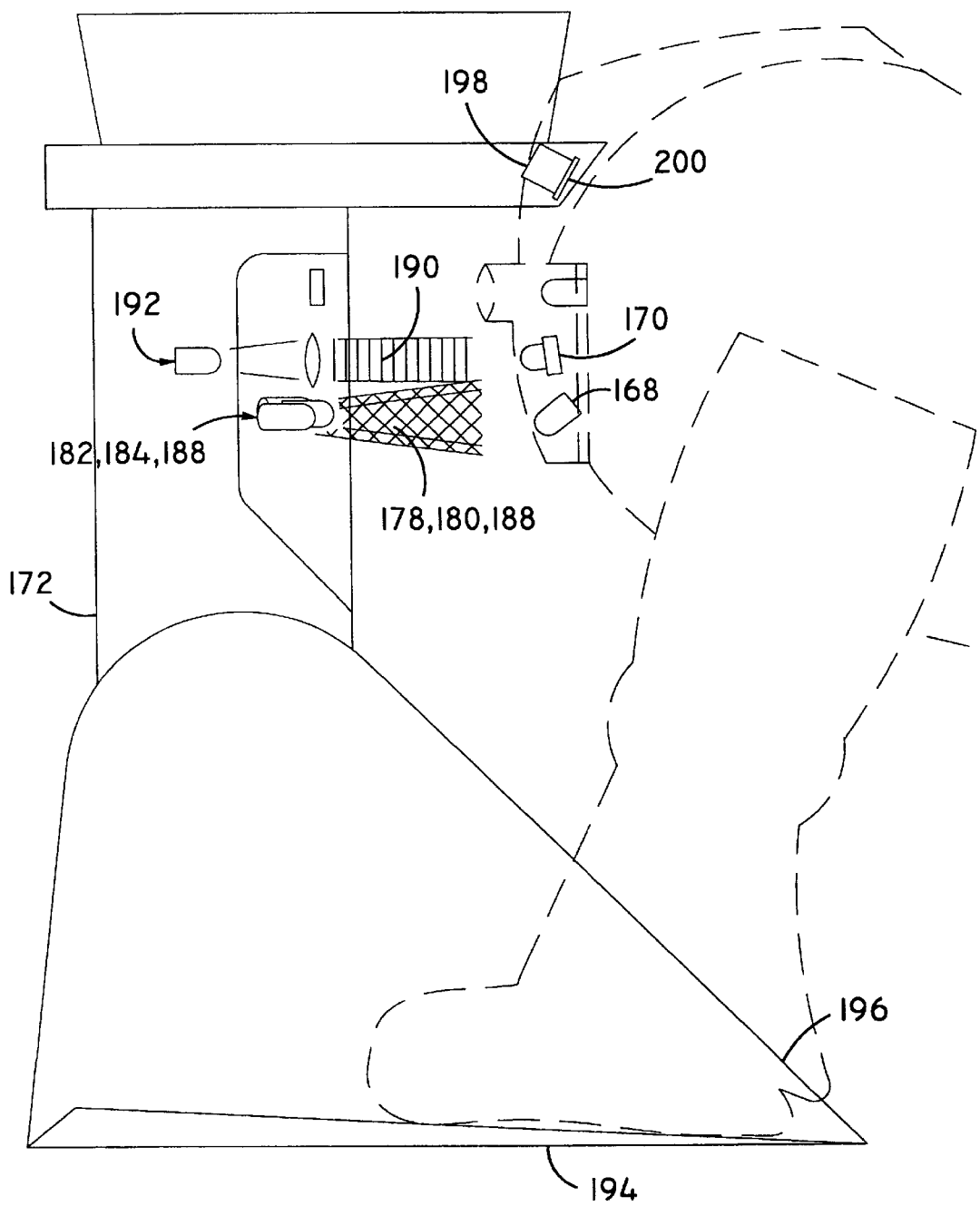
FIG. 52 is a left side elevational view of the apparatus as it is docked with the charger station.
Figure 53:
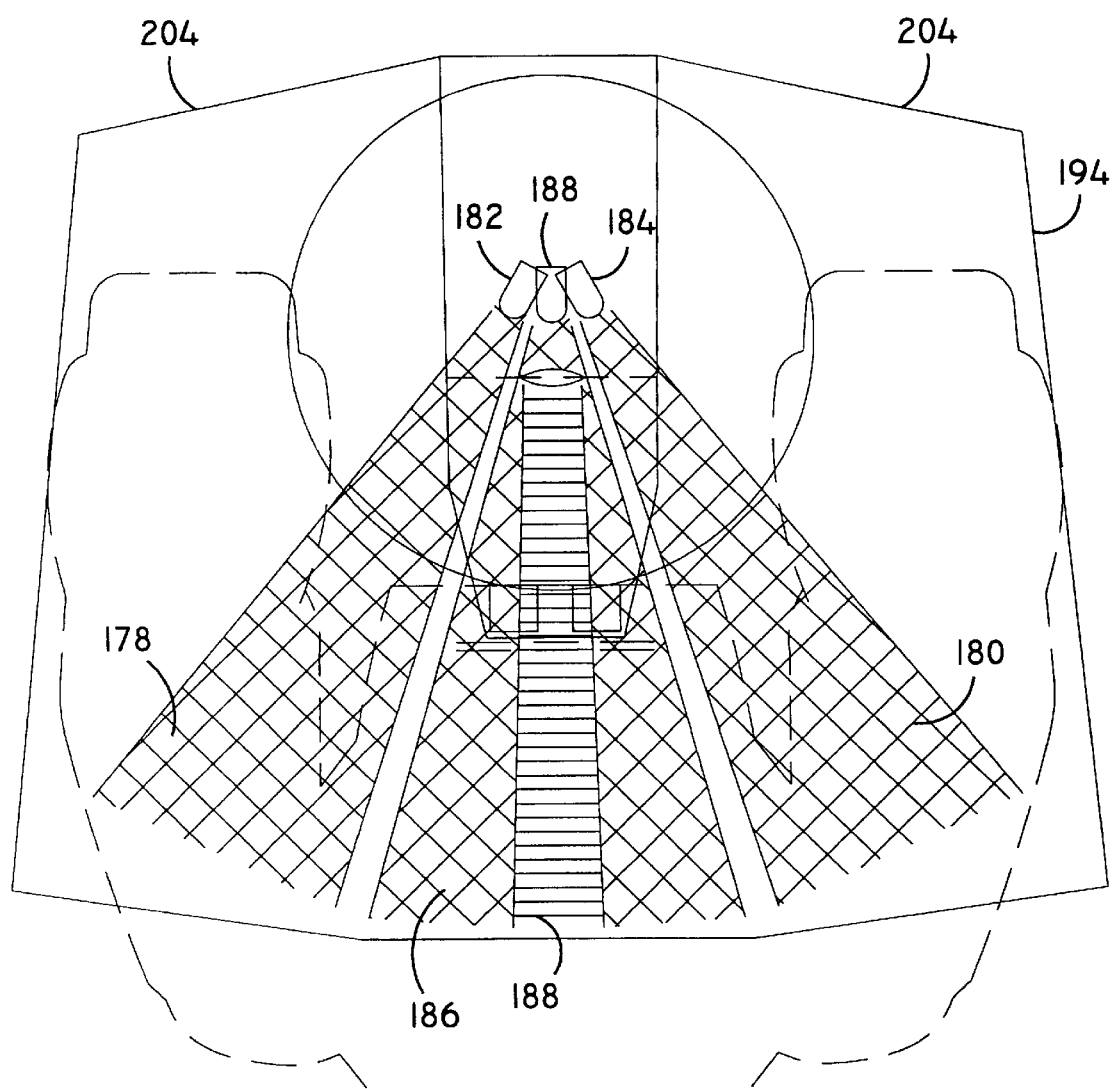
FIG. 53 is a top elevation view of the apparatus as it is docked with the charger station.
Figure 54:
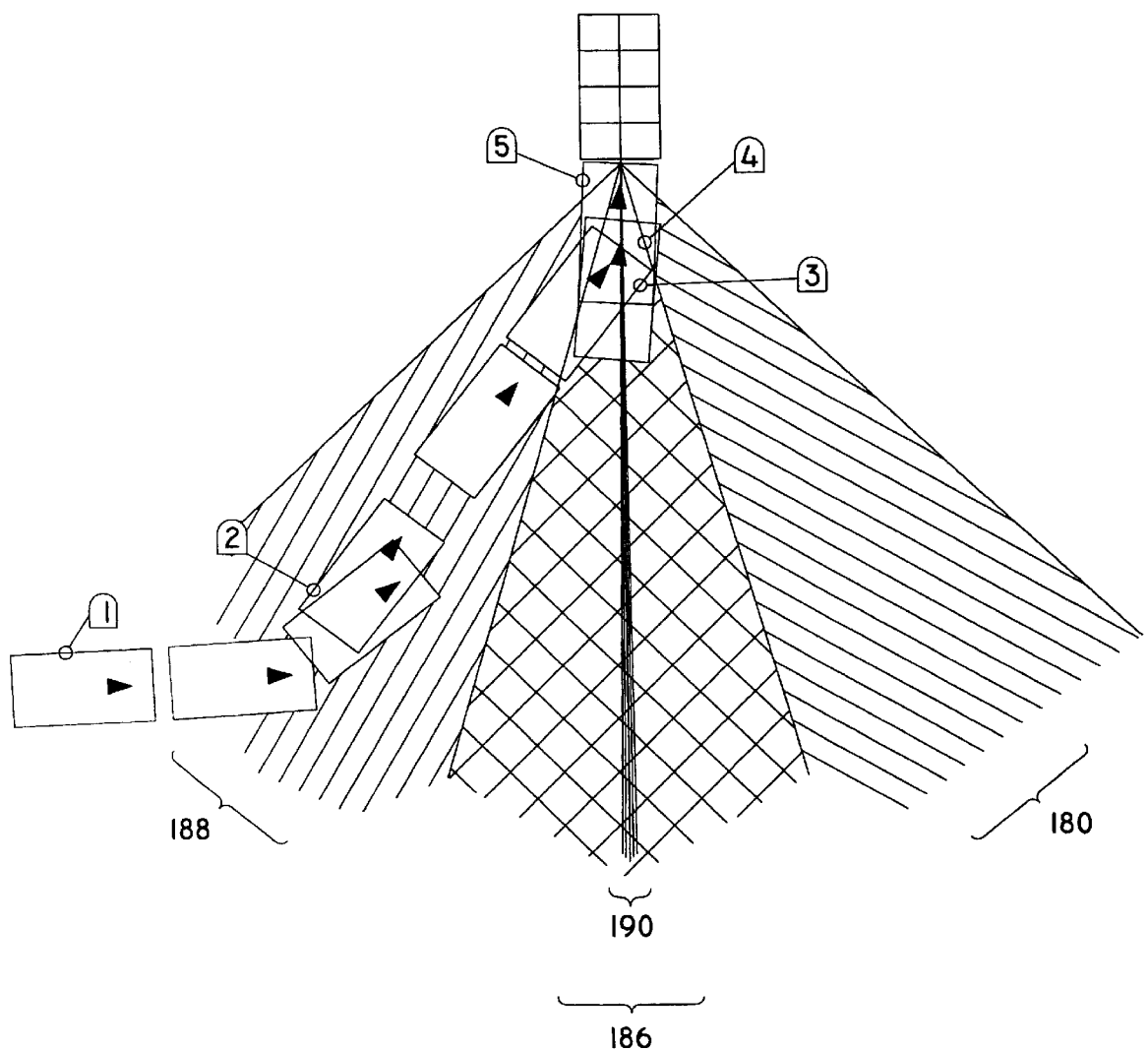
FIG. 54 is a top elevation view of the beams emitted by the charger station.

Another highly advantageous feature of the preferred embodiment is that it can be reprogrammed. This is accomplished by way of an intermediate flash cartridge that can be inserted into the apparatus as shown by FIG. 50. It is preferable that this cartridge slot 174 be fifty-six K modem compatible or higher so that the user can download programs at a very high rate. This feature is useful in those applications where the user does not want to wait or cannot wait for a lengthy program to be downloaded before being able to use the apparatus again. This reprogramming may also be easily accomplished when the apparatus needs to be recharged and is already docked with the charger station 172 since it takes four to six hours to charge the apparatus because the charger supplies only ten volts and fifty milli-amps of trickle charge.

FIGS. 51A–51B, 52, 53, and 54 show the details on how the preferred embodiment is capable of recharging itself. First, the microprocessor 120 senses that the apparatus is low on power. Then the apparatus begins a search pattern that initially entails rotating on axis for one hundred and eighty degrees while interrogating the surroundings for the charger station 172. If the apparatus fails to find the charger station 172 at this point, the apparatus begins a spiral search pattern to try to get within communication range of the charger station 172. Eventually the apparatus detects either a left beam 178 or right beam 180 that is emitted by the left LED 182 or right LED 184 of the charger station 172. It then turns on its axis until it faces the charger station 172 and begins to move in that direction. Next, the apparatus detects the center zone beam 186 that is emitted by the center LED 188 of the charger station 172 and turns on its axis until it is square with the charger station 172. The apparatus then follows the precision beam 190 that is emitted by the precision LED 192 of the charger station 172 until it draws near to the charger station 172. At this point the mat 194 of the charger station 172 provides some mechanical passive guidance in the form of a funnel 196 to assure the successful, complete, and safe docking of the apparatus. The neck 108 of the apparatus then engages a neck gate 198 that ensures that the apparatus is correctly aligned with the charger station 172 during the terminal phase of docking.

Figure 55:
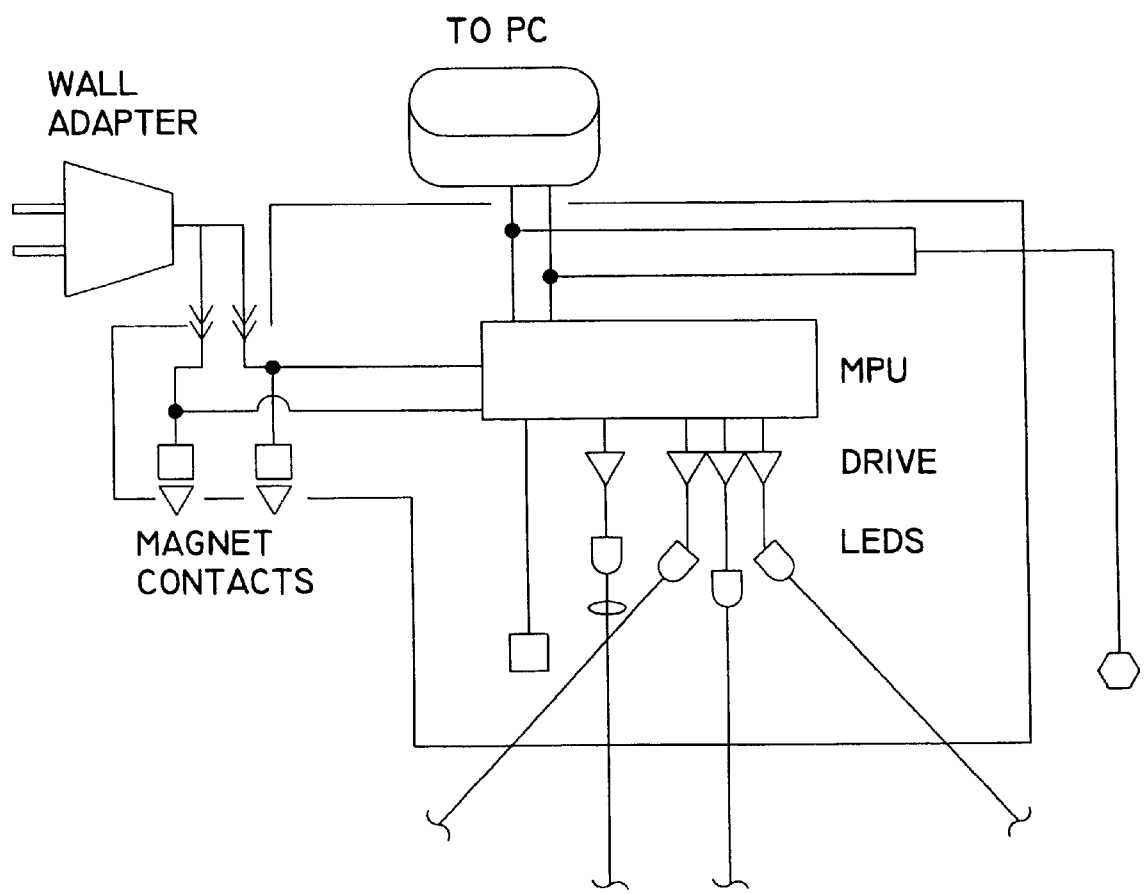
FIG. 55 is a wiring schematic of the interface between the apparatus and the charger station.

The final phase of docking is completed when the pivoting electrodes 198 of the charger station 172 make connection with the magnetic contacts 200 of the apparatus, thereby ensuring that the apparatus is capable of recharging. At the same time the user may insert an intermediate flash cartridge into the cartridge slot 174 so that as the apparatus is being recharged it may also be reprogrammed. See FIG. 55 for a schematic of the wiring by which this is accomplished. Once the apparatus has been recharged and reprogrammed, the apparatus reverses out of the charger station 172 and goes about its normal activities.

The data that is downloaded to the apparatus can take a variety of forms as shown in FIGS. 56A–56C. For instance, the apparatus can download games such that the user can play against the apparatus. Another possibility is that the apparatus can receive programming that simulates food, medical care, or other bodily nourishing items. Furthermore, the apparatus can download or upload "DNA" information to facilitate the apparatus' ability to procreate or clone itself. The apparatus may also receive a completely new personality such that the apparatus' behavior resembles that of another animal such as a cat or the apparatus may learn a new trick. Additionally, the apparatus can be diagnosed and debugged for any malfunctions that might occur and can download the appropriate fixes.

Figure 57A:
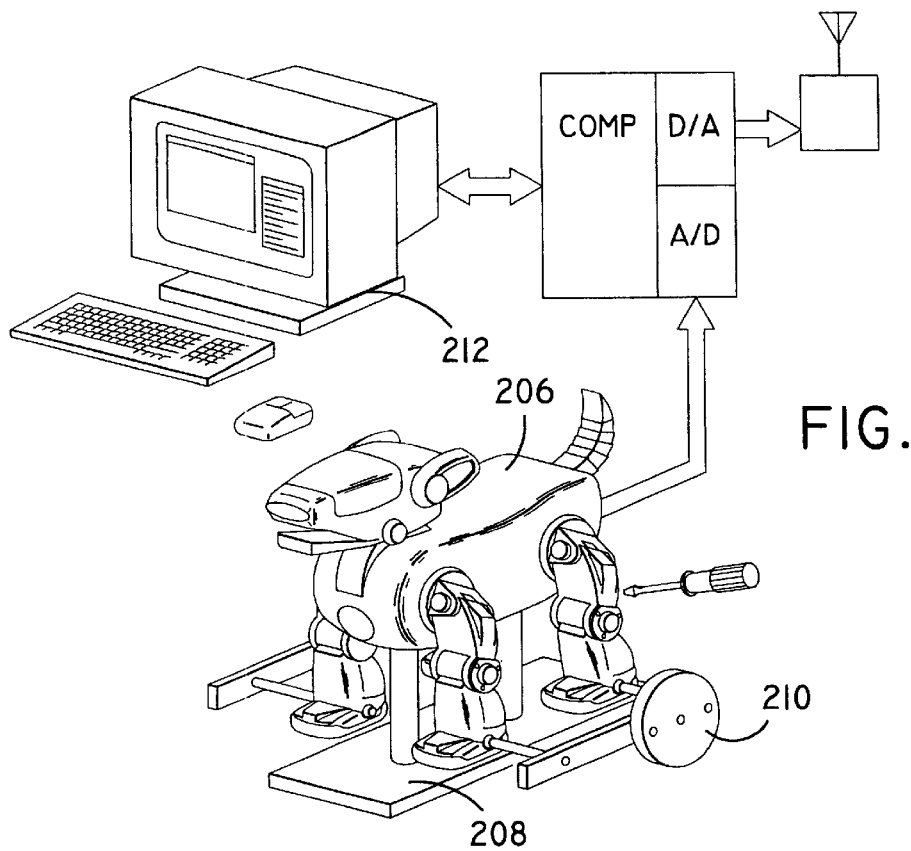
FIGS. 57A–57B are perspective views of a puppeteering scheme that can be computer edited.
Figure 57B:
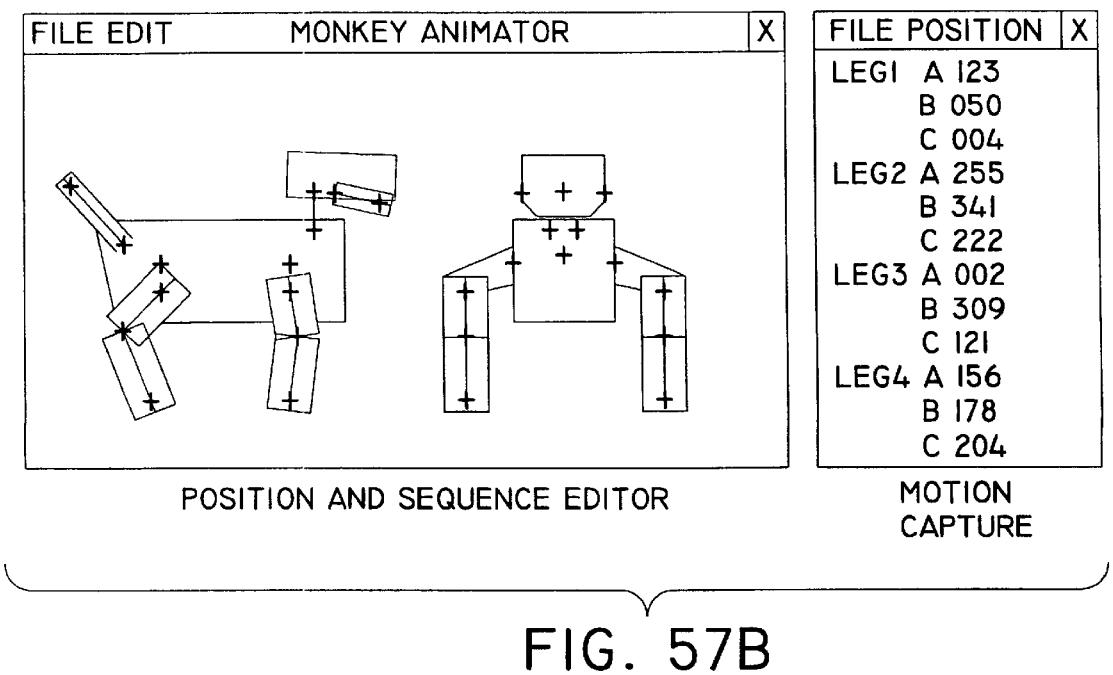

A particularly advantageous feature of the preferred embodiment is that it can also download a program that was created using a puppeteering technique. FIGS. 57A–57B shows how this works. It begins with an input apparatus 206 that is supported by a stand 208 such that its limbs are off the ground. This allows the puppeteer to manipulate the movement of the apparatus without interference from the ground or other objects surrounding the input apparatus 206. The limbs may also be attached to a mechanical motion controller 210 so that the user can cause the apparatus to make a walking or turning motion. These movements are then recorded by a computer 212 which is hard wired to the input apparatus 204. Once the motions have been recorded, the puppeteer can then edit the position and sequence of these movements. The end result can then be downloaded to the apparatus through a intermediate flash cartridge that has been inserted into the cartridge slot 174 of the apparatus. The apparatus can then act as an output apparatus 214 as it repeats the three dimensional movements, walking, and turning as contained in the program.

Figure 58A:
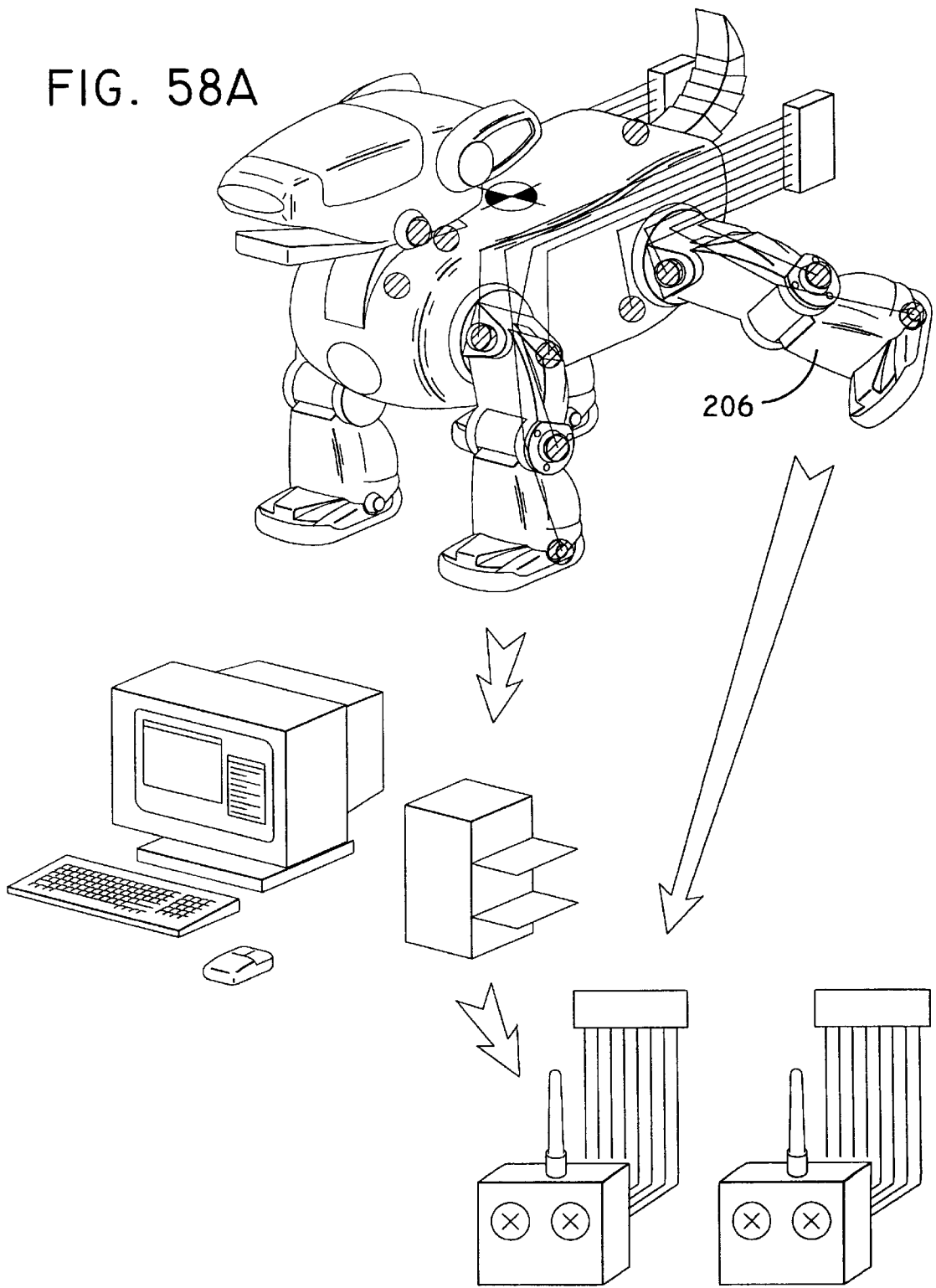

Another possible variation of using the puppeteering technique in conjunction with the preferred embodiment is shown in FIGS. 58A–58B. In this version, the input apparatus 206 is manipulated in a desired fashion by the puppeteer. The encoders of the input apparatus 206 record the position and sequence of the legs, head, and tail which is then transmitted by 16 channels of radio frequency transmission to the output apparatus 214 in real time. This results in the output apparatus 214 duplicating the movement of the input apparatus 206 at substantially the same time that the input apparatus 206 is moving. This method of control provides a better method of recreating precise three dimensional movements than a typical joystick control.

As can be seen, the present invention fulfills the need for a self-phase synchronized walking and turning quadruped apparatus that can respond to stimuli in its environment in a canine way. It is also readily apparent to those skilled in the art that the features of the present invention are capable of being applied to devices with less and more than four legs as well. While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A walking apparatus that is capable of achieving self-stabilization comprising:

at least one motor within the apparatus having a drive shaft extending therefrom;

two front legs and a pair of weights attached to said front legs whereby the center of balance of said apparatus is moved toward the front of said apparatus;

two rear legs;

at least one encoder that monitors the position of at least part of one leg; and an information processor that is in communication with said encoder thereby ensuring that the center of balance of said apparatus does not move outside the stability envelope of said apparatus.

2. The apparatus of claim 1 which further comprises an enlarged head positioned toward the front of said apparatus, thereby further moving the center of balance of said apparatus toward the front of said apparatus by providing counter balancing moment.

3. The apparatus of claim 2 wherein each of said legs comprise three joints including a hip joint, an upper leg joint, and a knee joint.

4. The apparatus of claim 3 wherein said motor and said encoder are attached to one of said joints of one of said legs and which further comprises:

multiple motors each of which are separately attached to the remaining joints; and multiple encoders that separately monitor the movement of the remaining joints.

5. The apparatus of claim 4 wherein the movement of said apparatus is monitored and controlled by a single information processor.

6. The apparatus of claim 5 wherein said motors are servomotors allowing said single information processor to monitor and control said motors virtually simultaneously using a multiplexer.

7. The apparatus of claim 6 which further comprises a cartridge slot and a power connector whereby said apparatus is capable of docking into a charger station where said battery can be recharged and said apparatus can receive new programming after the user has inserted an intermediate flash cartridge into said cartridge slot.

8. The apparatus of claim 7 which further comprises an animation motor, said animation motor being capable of causing said apparatus to perform non-ambulatory movements.

9. The apparatus of claim 8 which further comprises a tilt sensor whereby a ball bearing contacts a post when said apparatus is tipped over thereby sending a signal to said information processor which in turn causes said apparatus to commence self-righting action by rotating two of said legs.

10. The apparatus of claim 9 which further comprises a fixed ankle joint whereby said apparatus can step over objects in the path of said apparatus.

11. The apparatus of claim 10 which further comprises a current sensor whereby said apparatus can detect an increase or a decrease of power to said motors indicating that said apparatus is stuck or is not touching the ground thereby allowing said apparatus to commence a remedy such as reversing its direction or stopping said legs from moving.

12. The apparatus of claim 11 wherein said current sensor comprises:

said information processor; and said servomotors, whereby said information processor monitors the power of the duty cycle and the duration thereof as exerted and indicated by said servomotors, thereby determining whether said apparatus is stuck or not touching the ground.

13. The apparatus of claim 12 wherein said apparatus responds to stimuli in its environment by learning and changing the level of its activity between different levels that include sleeping and normal activity.

14. The apparatus of claim 13 wherein said apparatus further comprises a receiver for voice input and output computer control, thereby allowing the user to tell said apparatus to walk, turn, stop, and bark.

15. The apparatus of claim 13 which uses an infrared sensor and emitter to detect objects in its environment and move toward them or to detect obstructions in its environment and avoid them.

16. The apparatus of claim 13 further comprises means for controlling said apparatus by manipulating a similar apparatus thereby generating a RF signal which is transmitted to said apparatus in real time.

17. The apparatus of claim 16 wherein said apparatus further comprises an information processor for controlling said apparatus by downloading data that has been generated by manipulating a similar apparatus and editing that data using a computer.

18. The apparatus of claim 17 wherein said information processor consists of a microprocessor.

19. The apparatus of claim 18 wherein said power connector comprises a magnetic contact.

* * * * *